United States Patent
Hiroyasu et al.

(10) Patent No.: US 7,884,970 B2
(45) Date of Patent: Feb. 8, 2011

(54) INFORMATION PROCESSING APPARATUS AND METHOD, RECORDING MEDIUM AND PROGRAM

(75) Inventors: Shoko Hiroyasu, Tokyo (JP); Hideki Hiraoka, Kanagawa (JP); Tomotaka Yamazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1129 days.

(21) Appl. No.: 10/382,793

(22) Filed: Mar. 6, 2003

(65) Prior Publication Data
US 2003/0210440 A1 Nov. 13, 2003

(30) Foreign Application Priority Data
Mar. 8, 2002 (JP) ............................ 2002-064386

(51) Int. Cl.
*H04N 1/23* (2006.01)
(52) U.S. Cl. ..................... 358/296; 358/523; 358/451; 358/444; 358/449; 358/1.18; 358/1.13; 358/1.14; 382/264; 382/282; 382/298; 382/284; 382/299; 345/566; 345/1.2; 345/3.3; 345/629; 345/666; 348/373; 348/584; 348/96; 348/333.12
(58) Field of Classification Search ................. 358/451, 358/523; 382/298, 305
See application file for complete search history.

(56) References Cited

U.S. PATENT DOCUMENTS

| | | | | |
|---|---|---|---|---|
| 5,138,672 A | * | 8/1992 | Hirabayashi et al. | 382/264 |
| 5,204,759 A | * | 4/1993 | Sakai et al. | 358/444 |
| 5,758,043 A | * | 5/1998 | Takizawa et al. | 358/1.16 |
| 5,867,282 A | * | 2/1999 | Fredlund et al. | 358/450 |
| 6,035,074 A | * | 3/2000 | Fujimoto et al. | 382/282 |
| 6,246,796 B1 | * | 6/2001 | Horikoshi et al. | 382/232 |
| 6,285,461 B1 | * | 9/2001 | Fujii et al. | 358/1.18 |
| 6,332,038 B1 | * | 12/2001 | Funayama et al. | 382/190 |
| 6,333,758 B1 | * | 12/2001 | Suzuki et al. | 348/96 |
| 6,556,724 B1 | * | 4/2003 | Chang et al. | 382/299 |
| 6,621,524 B1 | * | 9/2003 | Iijima et al. | 348/584 |
| 6,791,709 B1 | * | 9/2004 | Nakamura et al. | 358/1.18 |

(Continued)

FOREIGN PATENT DOCUMENTS

JP 4-233872 8/1992

(Continued)

*Primary Examiner*—Edward L Coles
*Assistant Examiner*—Pawandeep S Dhingra
(74) *Attorney, Agent, or Firm*—Oblon, Spivak, McClelland, Maier & Neustadt, L.L.P.

(57) ABSTRACT

Disclosed are an information processing apparatus and method, a recording medium and a program, by which an image can be fetched in a size appropriate to a user. An image of a subject picked up by a camera is displayed in a predetermined first range corresponding to a size designated in advance within a predetermined display region of an LCD unit which corresponds to an image pickup range of the camera, but the image of the subject picked up by the camera is not displayed in a surrounding range of the predetermined display region around the first range. If a shutter button is depressed in this state, then the image displayed in the first range is stored in the designated size into a memory. The present invention can be applied typically to a PDA, a mobile terminal, a portable telephone set, a desk-top personal computer or the like which has a function as a digital camera.

6 Claims, 54 Drawing Sheets

U.S. PATENT DOCUMENTS

| | | | |
|---|---|---|---|
| 6,804,418 B1 * | 10/2004 | Yu et al. | 382/299 |
| 6,871,009 B1 * | 3/2005 | Suzuki | 386/95 |
| 6,940,526 B2 * | 9/2005 | Noda et al. | 345/629 |
| 6,952,272 B1 * | 10/2005 | Sasaki | 358/1.1 |
| 6,958,820 B1 * | 10/2005 | Takenaka et al. | 358/1.12 |
| 6,980,700 B2 * | 12/2005 | Endo et al. | 382/284 |
| 7,010,176 B2 * | 3/2006 | Kusunoki | 382/299 |
| 7,034,881 B1 * | 4/2006 | Hyodo et al. | 348/333.12 |
| 7,046,862 B2 * | 5/2006 | Ishizaka et al. | 382/298 |
| 7,065,716 B1 * | 6/2006 | Rzepkowski et al. | 715/839 |
| 7,072,526 B2 * | 7/2006 | Sakuramoto | 382/282 |
| 7,110,040 B1 * | 9/2006 | Misawa | 348/373 |
| 7,142,225 B1 * | 11/2006 | Boler et al. | 345/619 |
| 2001/0030706 A1 * | 10/2001 | Miller et al. | 348/333.05 |
| 2002/0015190 A1 * | 2/2002 | Mochizuki | 358/451 |
| 2002/0085771 A1 * | 7/2002 | Sakuramoto | 382/282 |
| 2002/0171746 A1 * | 11/2002 | Stephany et al. | 348/239 |
| 2003/0058260 A1 * | 3/2003 | Ohshima et al. | 345/666 |

FOREIGN PATENT DOCUMENTS

| | | |
|---|---|---|
| JP | 8-220603 | 8/1996 |
| JP | 2000-39651 | 2/2000 |
| JP | 2001-8040 | 1/2001 |
| JP | 2001-268484 | 9/2001 |

* cited by examiner

1 PDA

FIG. 3

F I G. 4
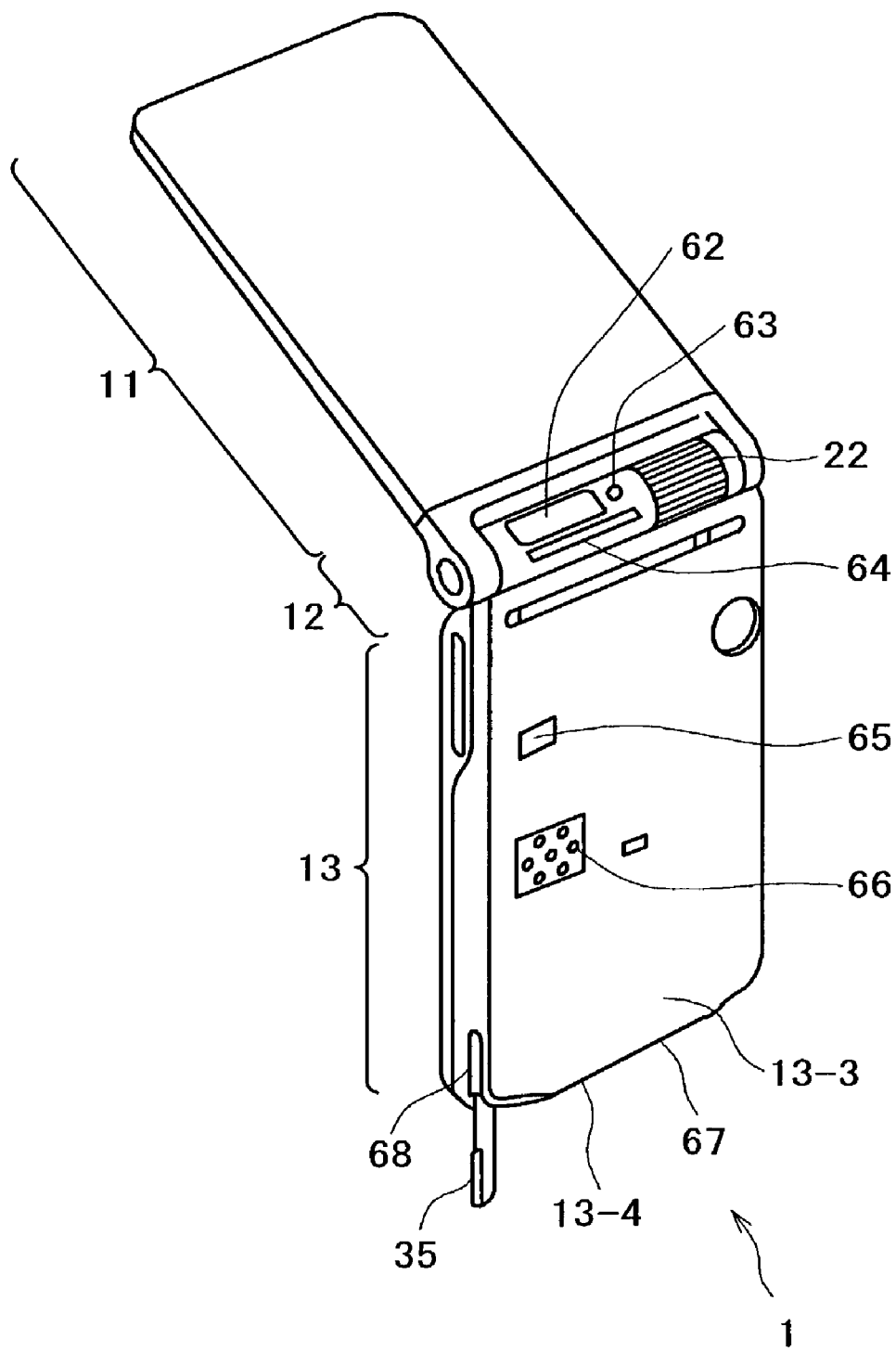

F I G. 3 2
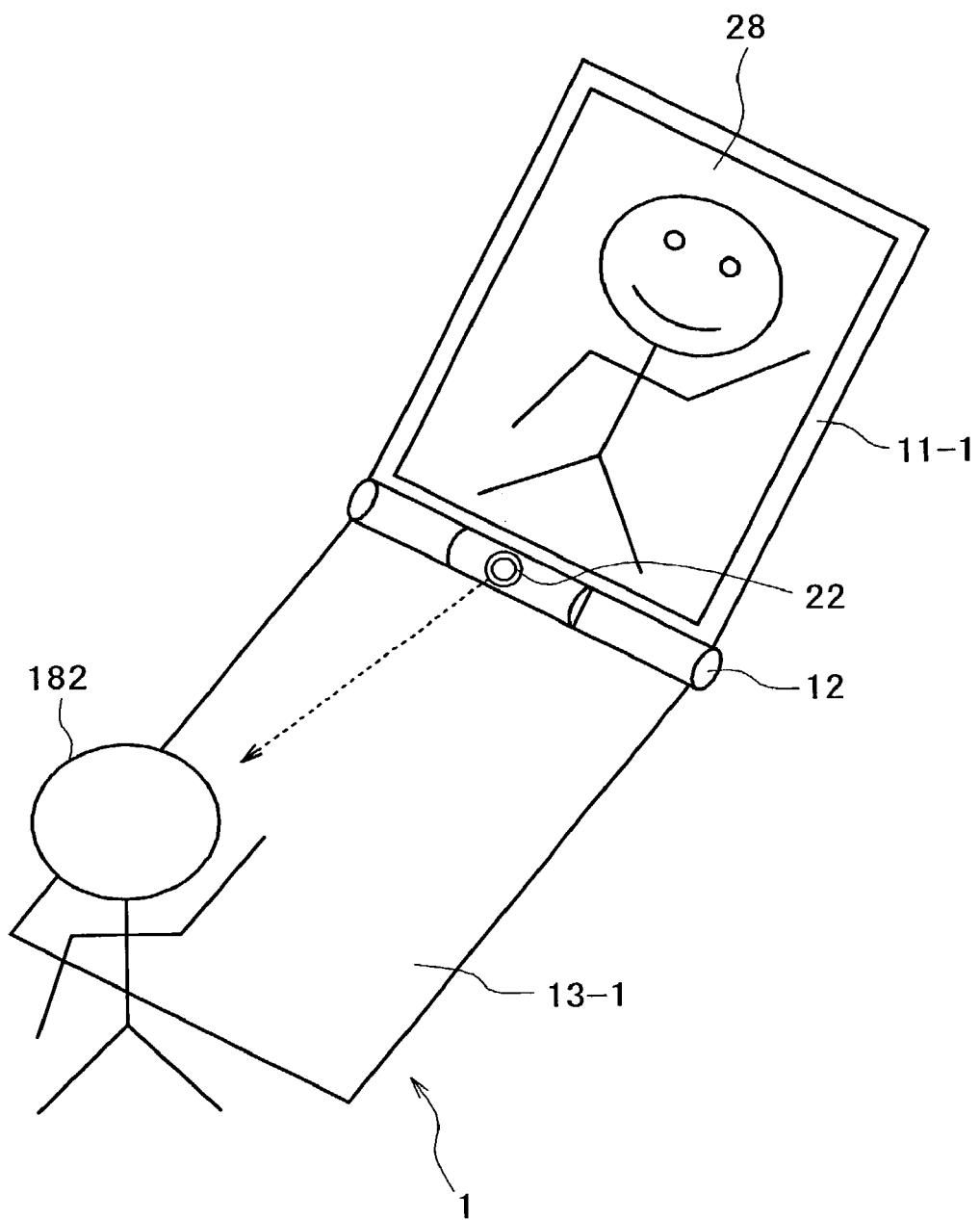

F I G. 3 4
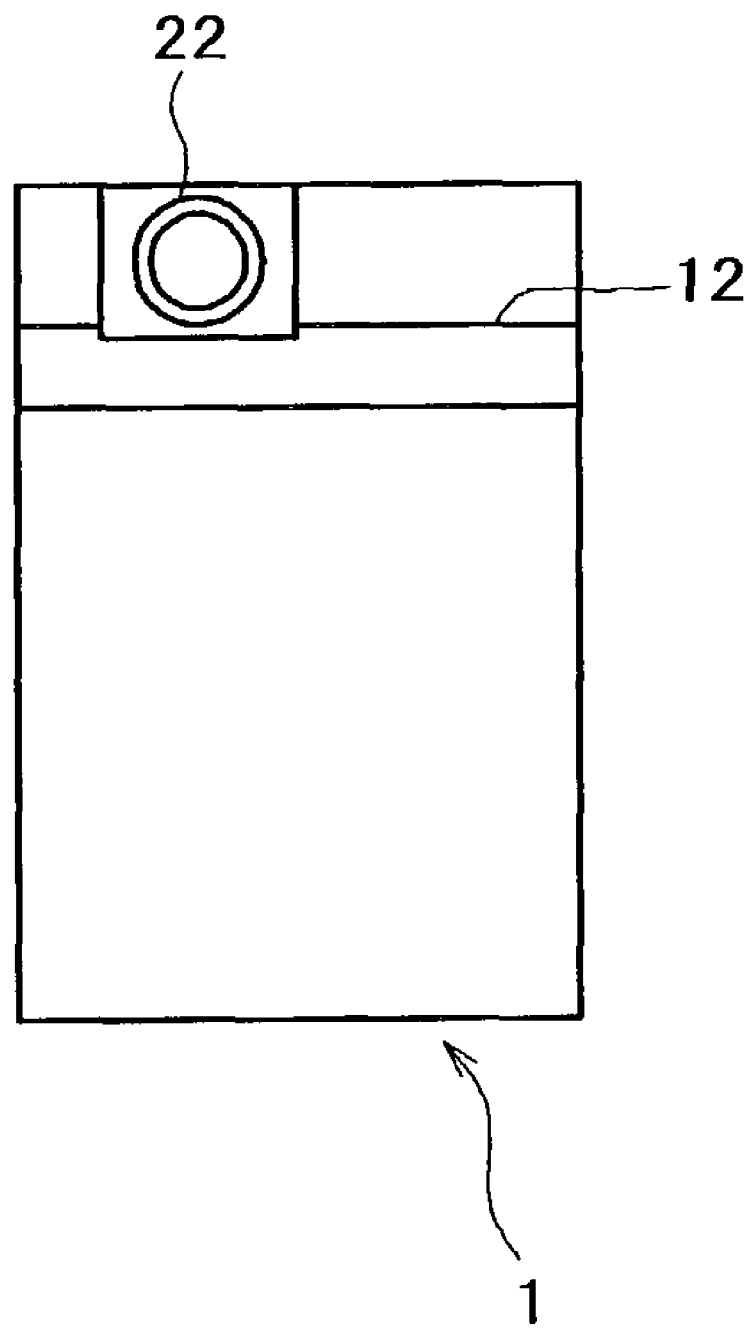

F I G. 4 8
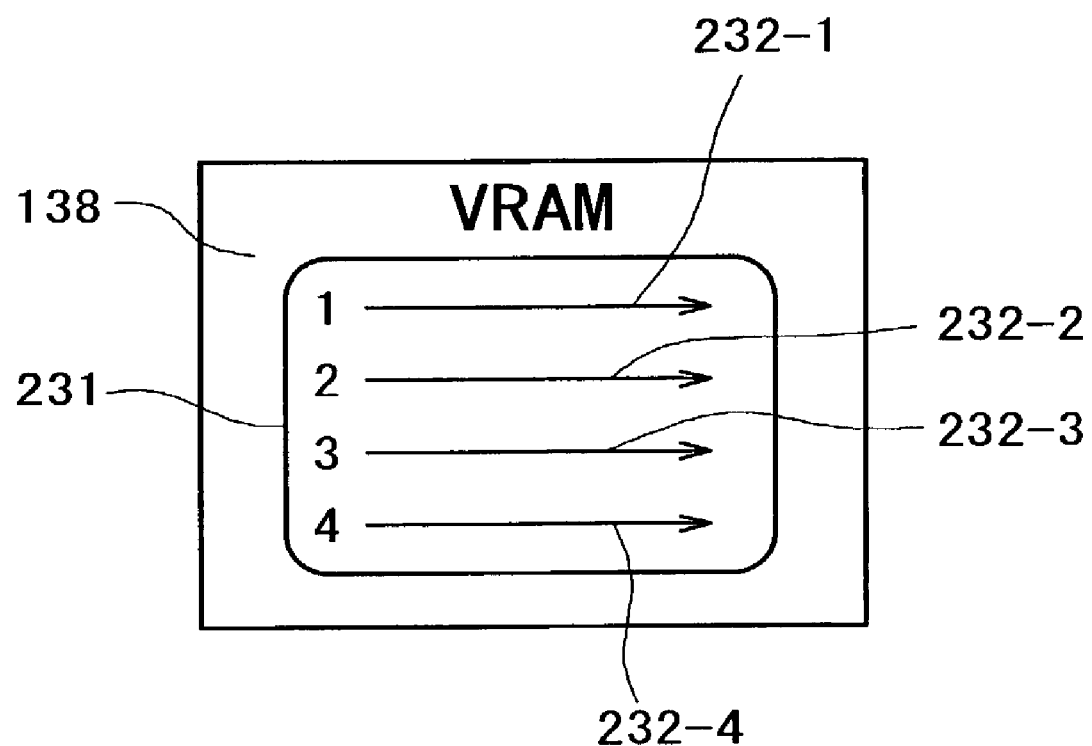

ant at the designation step, and a storage control step of controlling the storage means under the control of the process at the display control step to store the image displayed on the display means in the size designated by the process at the designation step.

INFORMATION PROCESSING APPARATUS AND METHOD, RECORDING MEDIUM AND PROGRAM

BACKGROUND OF THE INVENTION

This invention relates to an information processing apparatus and method, a recording medium and a program, and more particularly to an information processing apparatus and method, a recording medium and a program by which an image can be fetched with a size appropriate to a user.

In recent years, information processing apparatus have come into widespread use. A demand for a portable information processing apparatus that can be used by the user on the road has been intensified. Accordingly, a personal digital assistant (PDA) has come along to the market to satisfy the demand.

Known portable information processing apparatus includes a built-in camera type one which can be utilized as a digital camera. This type of the digital camera can output an image picked up thereby in various output sizes (sizes stored in the memory) which include a standard size and a predetermined size designated by the user.

If a size other than the standard size is designated, then the preview screen size, that is, the size of an image monitored by the digital camera and displayed on an LCD section of the digital camera before the shutter is depressed, becomes different from the thus set output size. As a result, contrary to the expectation of the user, an image which includes an image of surrounding subjects in addition to an intended image or which does not include an intended image of a target subject is likely to be recorded. Thus, the conventional digital camera is disadvantageous in that it is difficult to record an image in a size appropriate to the user.

SUMMARY OF THE INVENTION

It is an object of the present invention to provide an information processing apparatus and method, a recording medium and a program by which an image can be fetched in a size appropriate to a user.

In order to attain the object described above, according to a first aspect of the present invention, there is provided an information processing apparatus, comprising image pickup means for picking up an image of a subject, display means for displaying the image of the subject picked up by the image pickup means, storage means for storing the image of the subject picked up by the image pickup means, designation means for designating a size of the image to be stored into the storage means, display control means for controlling the display means to display the image of the subject picked up by the image pickup means in the size designated by the designation means, and storage control means for controlling the storage means under the control of the display control means to store the image displayed on the display means in the size designated by the designation means.

According to another aspect of the present invention, there is provided an image processing method for an image processing apparatus which includes image pickup means for picking up an image of a subject, display means for displaying the image of the subject picked up by the image pickup means, and storage means for storing the image of the subject picked up by the image pickup means, comprising a designation step of designating a size of the image to be stored into the storage means, a display control step of controlling the display means to display the image of the subject picked up by the image pickup means in the size designated by the process According to a further aspect of the present invention, there is provided a recording medium on which a computer-readable program for a computer for controlling an image processing apparatus, which includes image pickup means for picking up an image of a subject, display means for displaying the image of the subject picked up by the image pickup means, and storage means for storing the image of the subject picked up by the image pickup means, is recorded, the program comprising a designation step of designating a size of the image to be stored into the storage means, a display control step of controlling the display means to display the image of the subject picked up by the image pickup means in the size designated by the process at the designation step, and a storage control step of controlling the storage means under the control of the process at the display control step to store the image displayed on the display means in the size designated by the process at the designation step.

According to a still further aspect of the present invention, there is provided a program for causing a computer which controls an image processing apparatus, which includes image pickup means for picking up an image of a subject, display means for displaying the image of the subject picked up by the image pickup means, and storage means for storing the image of the subject picked up by the image pickup means, to execute a designation step of designating a size of the image to be stored into the storage means, a display control step of controlling the display means to display the image of the subject picked up by the image pickup means in the size designated by the process at the designation step, and a storage control step of controlling the storage means under the control of the process at the display control step to store the image displayed on the display means in the size designated by the process at the designation step.

With the information processing apparatus and method, recording medium and program, if a size when an image is to be stored into the storage means is designated, then an image of a subject picked up by the image pickup means is displayed in the designated size on the display means and stored in the designated size into the storage means.

Consequently, the picked up image of the subject can be stored in an arbitrary size into the storage means. Further, the user can affirm a range of the image to be stored actually so that the image can be fetched in a size appropriate to the user.

The information processing apparatus of the present invention may be an apparatus which merely displays a still picture or may be an apparatus which reproduces moving pictures including sound or an apparatus which performs a predetermined image process for a still picture or moving pictures.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a schematic view showing an example of an image displayed in a character input area of the LCD section of the PDA of FIG. 1;

FIG. 4 is a perspective view showing an example of a configuration of a rear portion of the PDA of FIG. 1;

FIGS. 29 to 38 are schematic views illustrating different states of use of the PDA of FIG. 1;

FIGS. 48 to 50 are schematic views illustrating a process when an image picked up by the camera of the PDA of FIG. 1 is turned by 90 degrees;

DESCRIPTION OF THE PREFERRED EMBODIMENT

Figure 1:
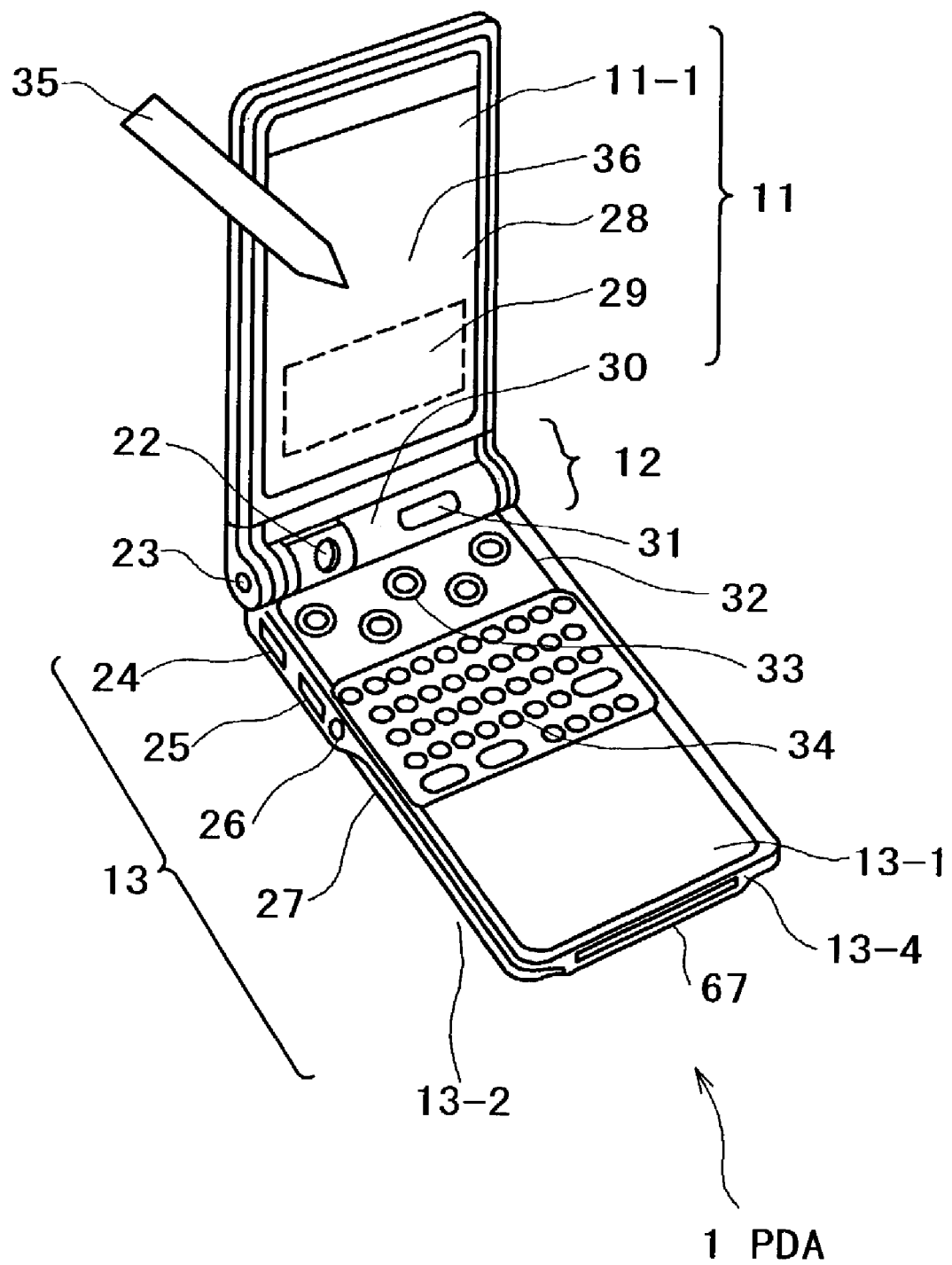
FIG. 1 is a perspective view showing an example of a configuration of a front portion of a PDA to which the present invention is applied.

Referring first to FIG. 1, there is shown an example of a configuration of the front of a PDA as a portable information processing apparatus to which the present invention is applied. The PDA is generally denoted at 1 and composed of a display section 11 and a body section 13 formed as different members from each other across a central hinge section 12 and connected for folding movement relative to each other by the hinge section 12.

Figure 6:
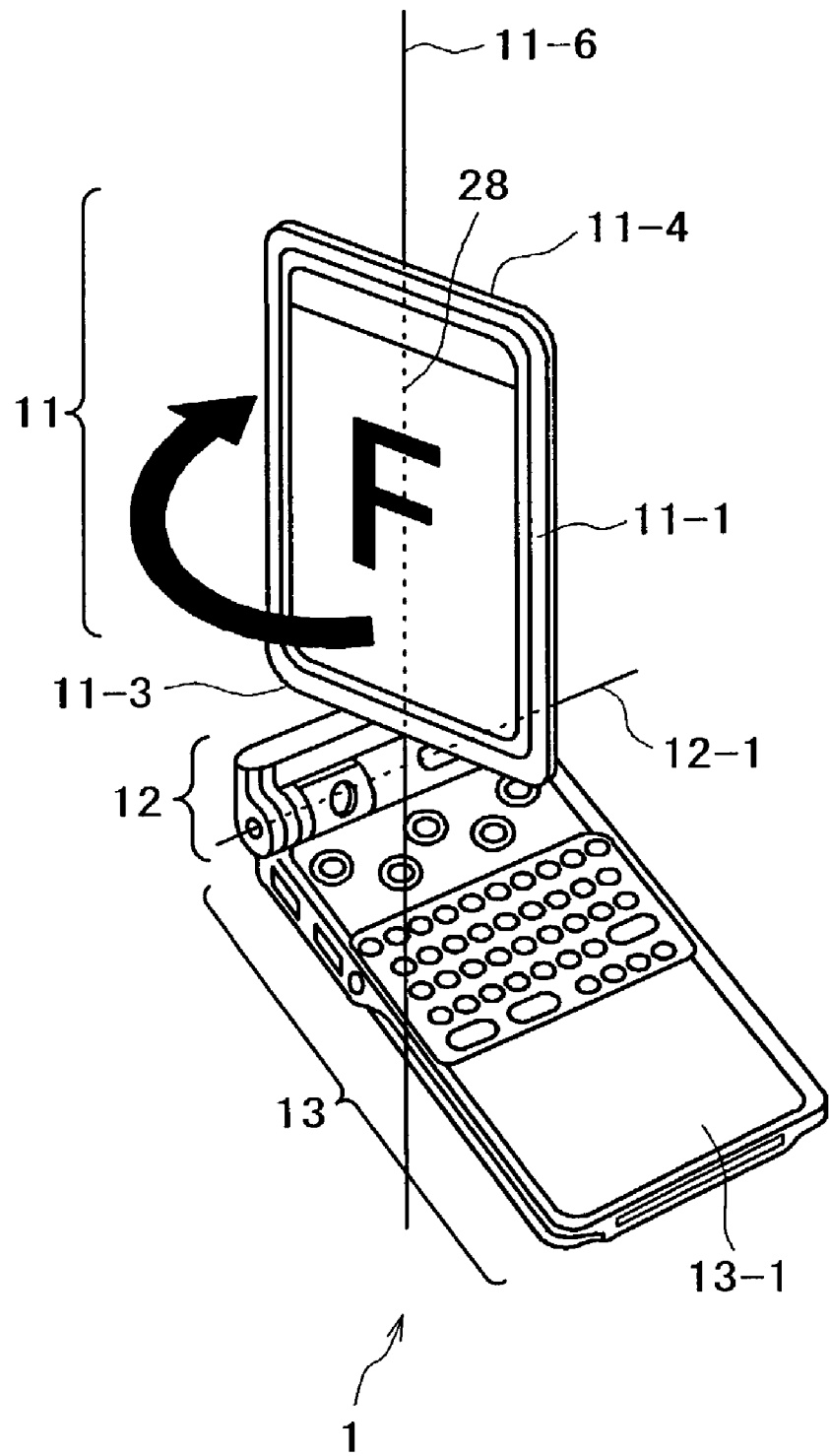
FIGS. 6, 7 and 8 are perspective views illustrating a pivotal movement and opening and closing movements of a display section of the PDA of FIG. 1.

In other words, the display section 11 is mounted for pivotal opening and closing motion around an axis 12-1 of the hinge section 12 with respect to the body section 13 as seen in FIG. 6. The display section 11 is mounted for further pivotal motion around an axis 11-6 substantially perpendicular to the axis 12-1 with respect to the body section 13. In other words, the display section 11 is supported for pivotal motion in parallel to a face 11-3, (a face shown at a lower portion of FIG. 6 which is perpendicular to a face 11-1 on which an LCD unit 28 is provided), opposed to the hinge section 12.

Referring back to FIG. 1, an LCD (Liquid Crystal Display) unit 28 is provided over a substantially overall area of the face 11-1 of the display section 11, and a transparent touch panel 36 is layered on the surface of the LCD unit 28. Thus, if a touch pen 35 touches with an arbitrary position on the LCD unit 28, then the coordinates of the position are detected by the touch panel 36 and a predetermined process corresponding to the detected coordinates is performed.

Figure 2:
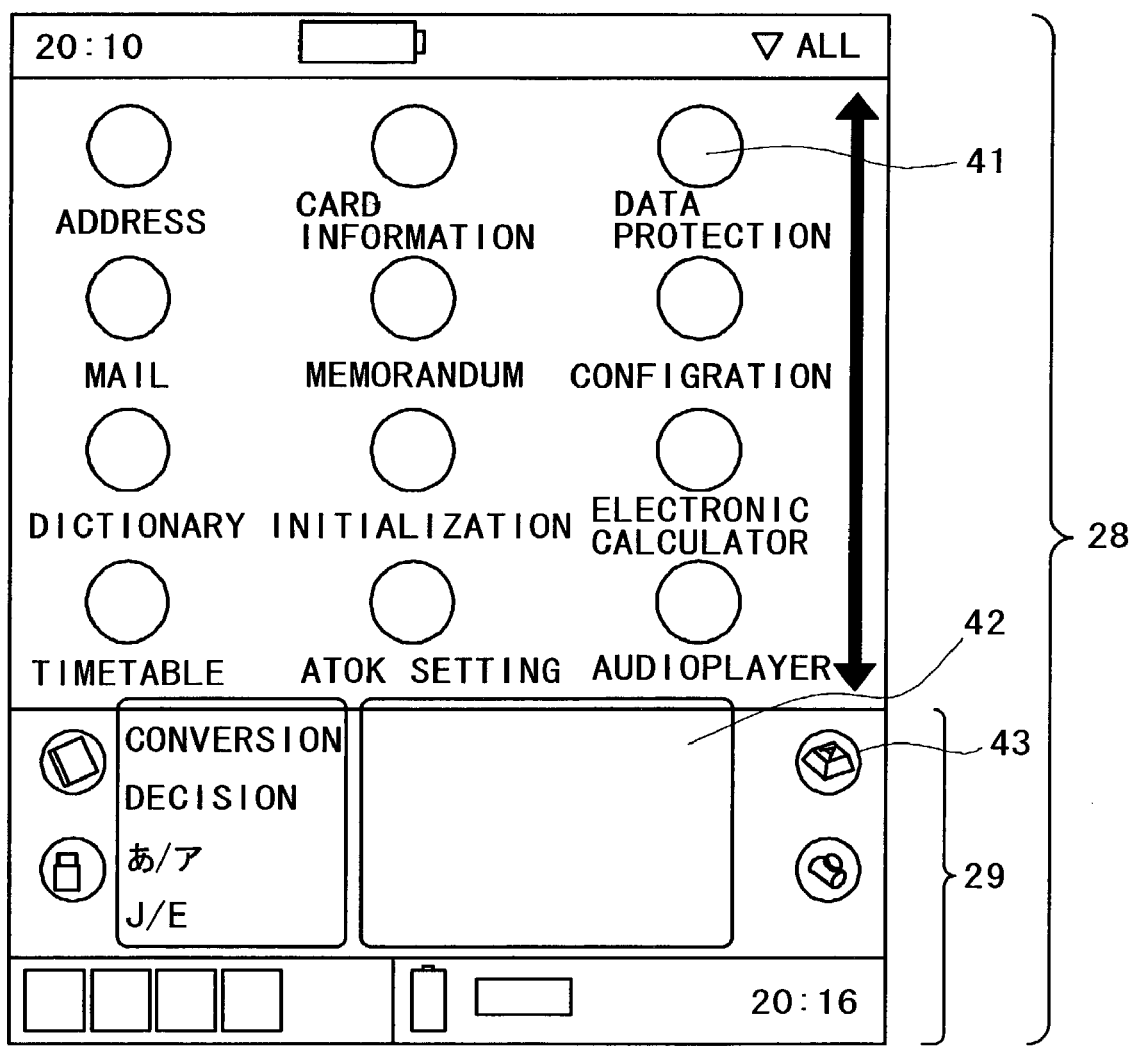
FIG. 2 is a schematic view showing a first example of an image displayed on an LCD section of the PDA of FIG. 1.

For example, if it is assumed that such an image as shown in FIG. 2 is displayed on the LCD unit 28, then if the user operates the touch pen 35 to depress one of software buttons 41, that is, touches with one of the software buttons 41 using the touch pen 35, then application software allocated to the software button 41 is started up.

A character input area 29 for inputting characters is provided in a predetermined region of the touch panel 36 (in the example of FIG. 1, a region of the LCD unit 28 at a lower portion in FIG. 1), and various software buttons including, for example, a software button 43 for selecting a software keyboard which is hereinafter described and a special character input area 42 as a region for inputting special characters prescribed in a predetermined rule (for example, a character of a predetermined shape with regard to which the start point of writing and the writing order are designated and which can be written with a single stroke) as shown in FIG. 2 are displayed in the character input area 29. If the user operates the touch pen 35 to draw one of such special characters in the special character input area 42, then the special character is inputted. In other words, the path along which the touch pen 35 moves is detected by the touch panel 36, and a character corresponding to the path is inputted.

Figure 3:
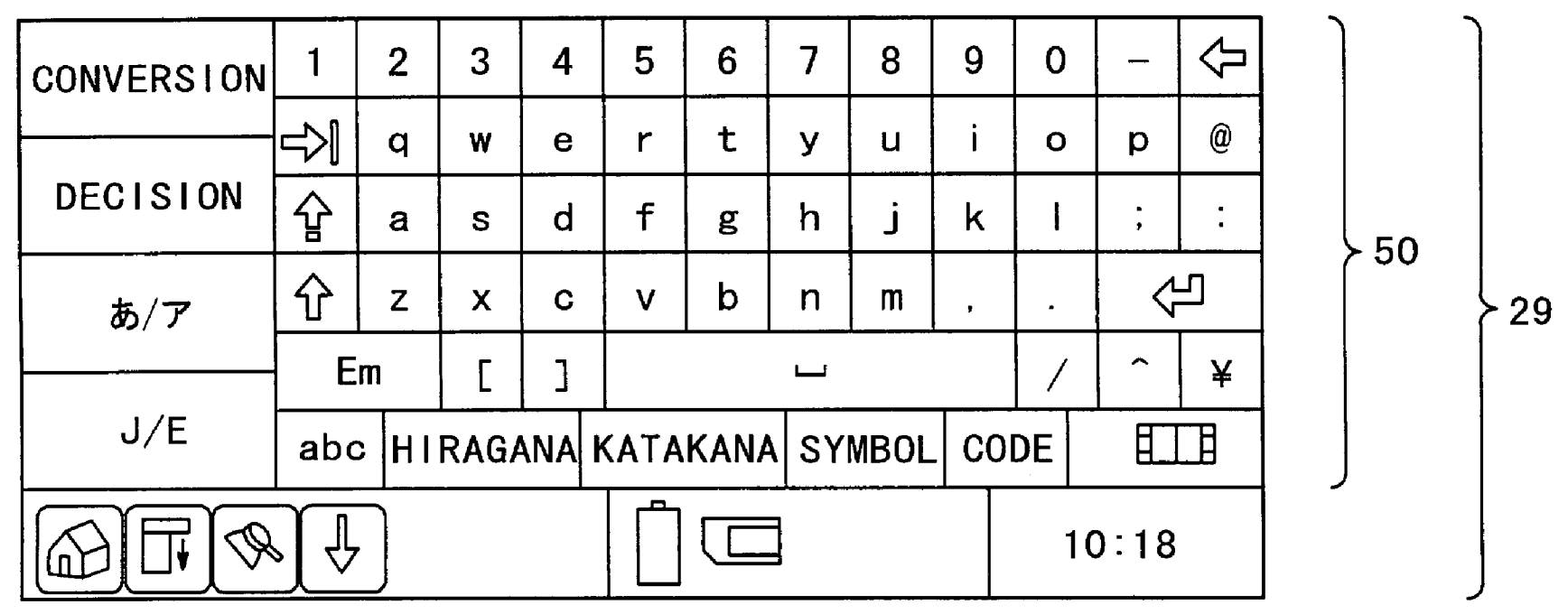

Further, if the user operates the touch pen 35 to depress the software button 43, then a software keyboard 50 shown in FIG. 3 is displayed in the character input area 29. If the user operates the touch pen 35 to depress an arbitrary one of keys of the software keyboard 50, then a character (or a symbol or the like) corresponding to the depressed key is inputted. In particular, the coordinates at which the touch pen 35 is positioned are detected by the touch panel 36 and a key corresponding to the coordinates is recognized, and a character (or a symbol or the like) allocated to the recognized key is inputted.

In this manner, the user can utilize the touch pen 35 and the character input area 29 as software to input a character readily and rapidly. It is to be noted that, since the touch panel 36 is layered over the overall area of the display face of the LCD unit 28, the position of the character input area 29 with respect to the LCD unit 28 is not limited to the position shown in FIG. 1. For example, if the image shown in FIG. 2 is reversed in the vertical and horizontal directions, then the character input area 29 is disposed at an upper position in FIG. 1 and displayed in the vertically reversed state as hereinafter described. Also in this instance, the user can input a character in a similar manner as in the example described above.

Referring back to FIG. 1, a power supply button 31 for switching the power supply to the PDA 1 on and off is provided at a right portion of the hinge section 12 in FIG. 1. A light emitting diode (LED) 30 which is lit when a battery (not shown) built in the PDA 1 is being charged but is unlit when the charging is completed is provided leftwardly of the power supply button 31 on the hinge section 12. Further, a camera 22 formed from a CMOS (Complementary Metal Oxide Semiconductor) sensor is disposed for turning motion at a position of the hinge section 12 leftwardly of the LED 30. Furthermore, a capture button 23 which is operated in order to pick up an image of a subject by means of the camera 22 is provided at the left end of the hinge section 12.

When the user intends to pick up an image of a subject, he/she will depress the capture button 23 once to start up application software having a camera function (a function of picking up an image of a subject by means of the camera 22 and recording the picked up image of the subject) and then turn the camera 22 so that the image pickup direction of the camera 22 may be directed to the subject. At this time, since an image of the subject picked up by the camera 22 is displayed on the LCD unit 28 as hereinafter described, the user will check the LCD unit 28 and decide the position of the camera 22 and then again depress the capture button 23, which functions as a shutter button. Consequently, the image picked up by the camera 22 at the point of time when the capture button 23 is depressed is stored into a memory (for example, a RAM 133 of FIG. 22 hereinafter described) of the PDA 1.

In FIG. 1, at an upper portion on a face 13-1 of the body section 13, which opposes to the display section 11 when the display section 11 is folded, a plurality of buttons 32 are provided on each of which a symbol representative of one of different pieces of software applications installed in the PDA 1 is printed such that, if the user depresses one of the buttons 32 with his/her finger, then a corresponding one of the pieces of application software is started up. In other words, the buttons 32 are buttons as hardware which correspond to the software buttons 41 described hereinabove with reference to FIG. 2.

Further, a scroll button 33 for scrolling an image displayed on the LCD unit 28 is provided at a central location in the region of the face 13-1 in which the buttons 32 are disposed.

Furthermore, a keyboard 34 for inputting characters including symbols and so forth is provided at a location of the face 13-1 below the buttons 32 in FIG. 1. The keyboard 34 is a keyboard as hardware corresponding to the software keyboard 50 of FIG. 3 described hereinabove.

In FIG. 1, at an upper portion of a side face 13-2 of the body section 13 perpendicular to the face 13-1, a headphone jack 24 to be connected to a remote controller 101 of FIG. 19 hereinafter described or to an external headphone to output sound is provided. A jog dial 25 is provided for depressing and turning operations at a portion of the face 13-2 below the headphone jack 24 in FIG. 1 and projects a little outwardly from the face 13-2. A back button 26 for canceling an immediately preceding operation is provided at a portion of the face 13-2 below the jog dial 25, and a hold switch 27 for inhibiting, when some other button is depressed in error, execution of a function corresponding to the depressed button is provided at a portion of the face 13-2 below the back button 26.

Figure 18:
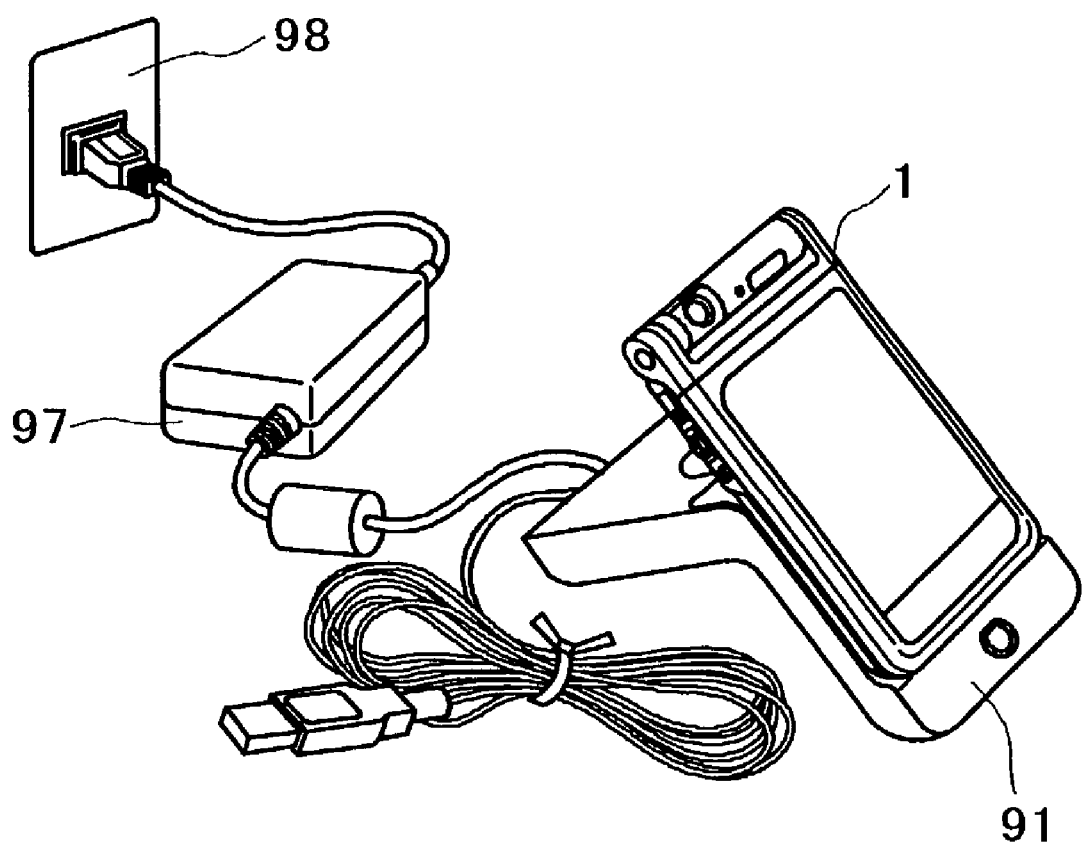
FIG. 18 is a perspective view showing an example of a configuration where the PDA of FIG. 1 is mounted on the cradle of FIG. 17.

A connector 67 for connecting an attachment apparatus such as, for example, a cradle 91 shown in FIG. 18 is provided at a central portion of an end face 13-4 on the lower side in FIG. 1 of the body section 13 perpendicular to the faces 13-1 and 13-3.

Figure 20:
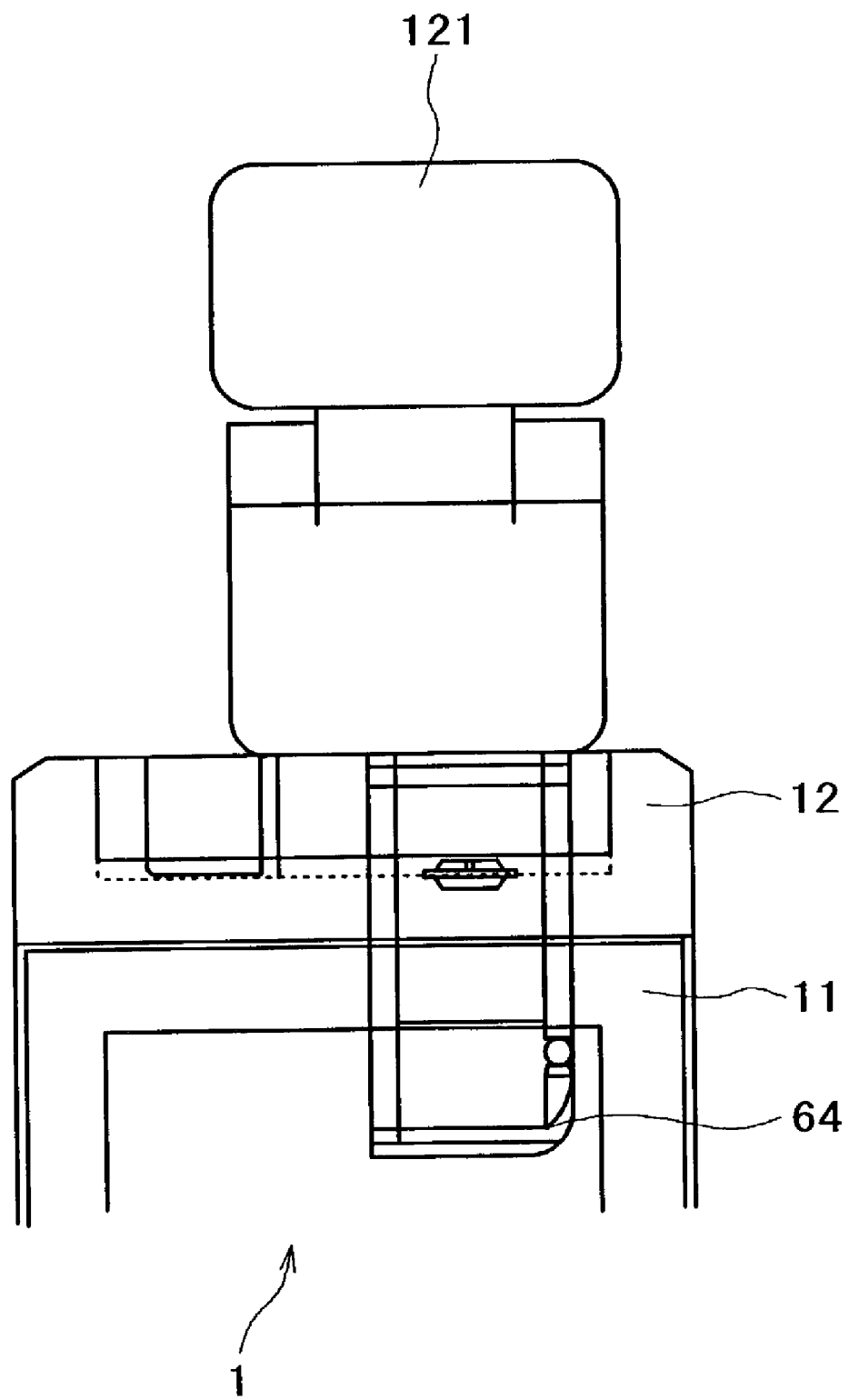
FIG. 20 is a front elevational view showing an example of a configuration of a function expansion module provided for the PDA of FIG. 1.
Figure 21:
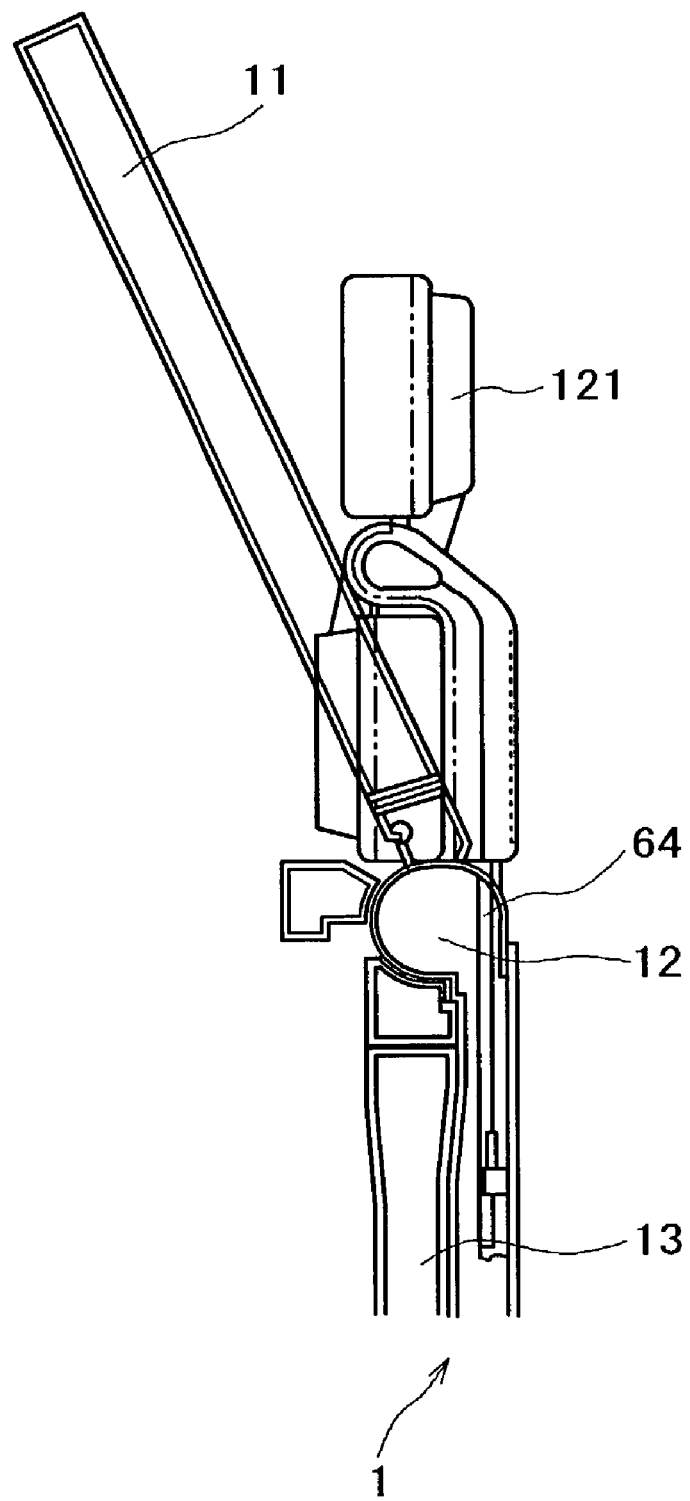
FIG. 21 is a right side elevational view showing an example of a configuration of the function expansion module provided for the PDA of FIG. 1.

FIG. 4 shows an example of a configuration of the rear face of the PDA 1. Referring to FIG. 4, a slot 64 into which a removable Memory Stick (trademark) or a function expansion module 121 hereinafter described with reference to FIGS. 20 and 21 is loaded, a lamp 63 which is lit when data in the Memory Stick are being read or written, and an infrared port 62 for communicating with another apparatus using infrared rays are provided at a left side upper portion of the hinge section 12 in FIG. 4.

The Memory Stick, developed by Sony Corporation which is the applicant of the present invention, is a flash memory device which is a kind of an EEPROM (Electrically Erasable and Programmable Read Only Memory) which is an electrically rewritable and erasable nonvolatile memory and is accommodated in a plastic case of a small and thin configuration. The Memory Stick allows writing thereinto and readout therefrom of various kinds of information (data) such as an image, sound, music and so forth.

Further, the Memory Stick adopts a unique serial protocol by which, even if the specifications of the built-in flash memory change in order to increase the memory capacity or the like, the compatibility can be secured with an apparatus on which the Memory Stick is used, and achieves a high speed performance of the maximum writing rate of 1.5 MB/s and the maximum readout rate of 2.45 MB/s. Further, the Memory Stick includes an erroneous erasure preventing switch to secure a high degree of reliability.

Since the PDA 1 allows loading therein of such a Memory Stick as described above, common use of data can be achieved with a different apparatus through the Memory Stick.

A reset button 65 for resetting the PDA 1 is provided at a left central portion of a face 13-3 of the body section 13 opposite to the face 13-1 in FIG. 4, and a speaker 66 for outputting sound is provided at a portion of the face 13-3 below the reset button 65 in FIG. 4.

As described hereinabove, in FIG. 4, the connector 67 is provided at a central portion of the end face 13-4 on the lower side of the body section 13 perpendicular to the faces 13-1 and 13-3, and an accommodation opening 68 for accommodating the touch pen 35 therein is provided at a portion of the face 13-4 leftwardly of the connector 67.

Figure 5:
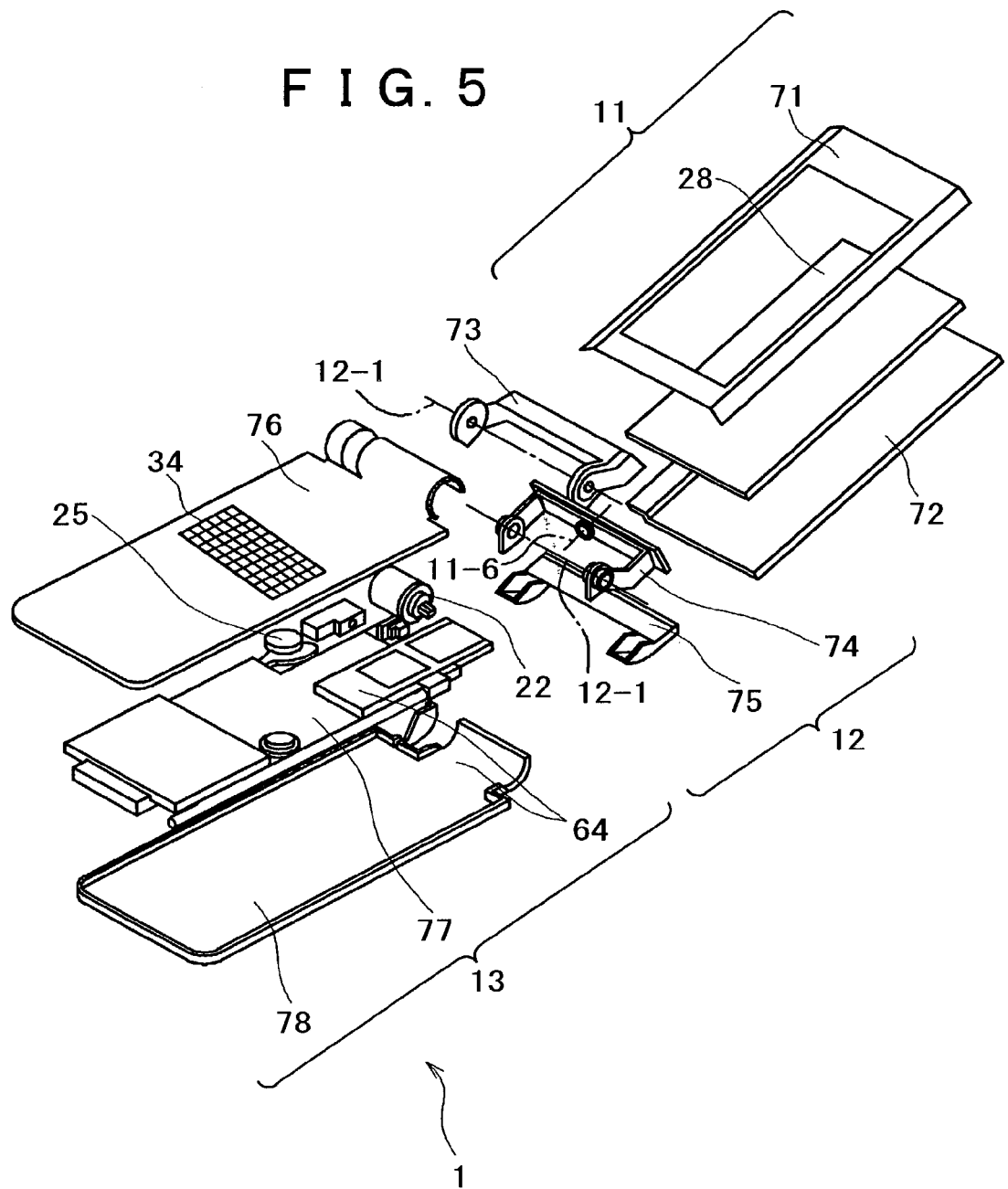
FIG. 5 is an exploded perspective view showing an example of an internal configuration of the PDA of FIG. 1.

FIG. 5 shows an example of an internal configuration of the PDA 1. Referring to FIG. 5, the display section 11 has the above-described LCD unit 28 on the inner side of a pair of cabinets or housings 71 and 72 which serve as an outer surface of the display section 11.

The hinge section 12 has a pair of supporting members 73 and 75 for supporting the display section 11 and the body section 13 such that the display section 11 is pivoted around the axis 12-1 for opening and closing movement with respect to the body section 13 as described hereinabove and a supporting element 74 for supporting the display section 11 and the body section 13 such that the display section 11 can be pivoted with respect to the body section 13 around the axis 11-6 perpendicular to the axis 12-1.

A circuit board 77 on which various electronic parts for controlling operation of the PDA 1 and so forth are mounted is provided in the inside of a pair of cabinets 76 and 78 which form an outer surface of the body section 13.

The keyboard 34 described hereinabove and so forth are disposed on the cabinet 76 while the camera 22, slot 64, jog dial 25 and so forth described hereinabove are disposed on the circuit board 77.

Now, opening/closing and pivoting movements of the display section 11 are described in detail with reference to the drawings.

Figure 7:
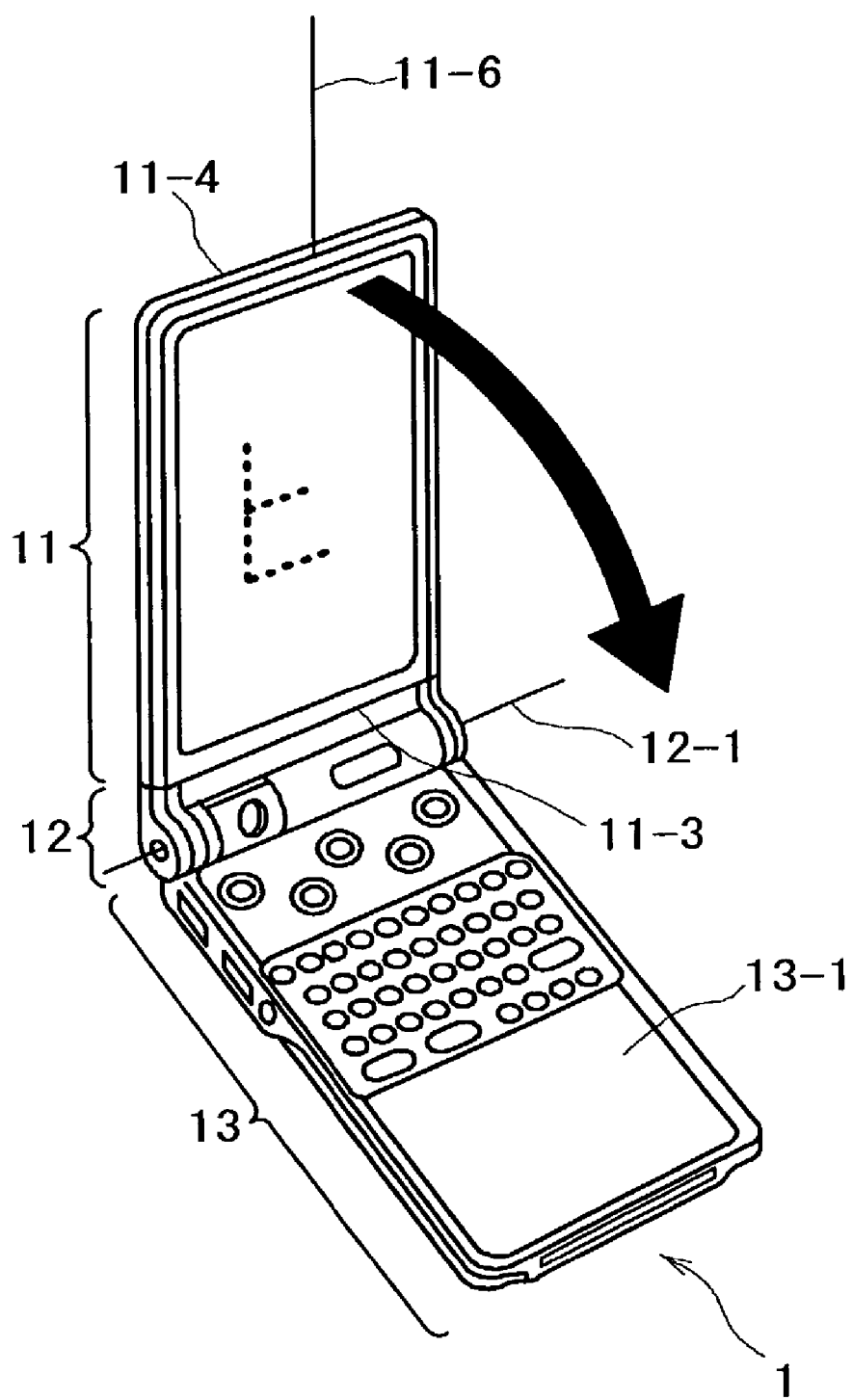
Figure 8:
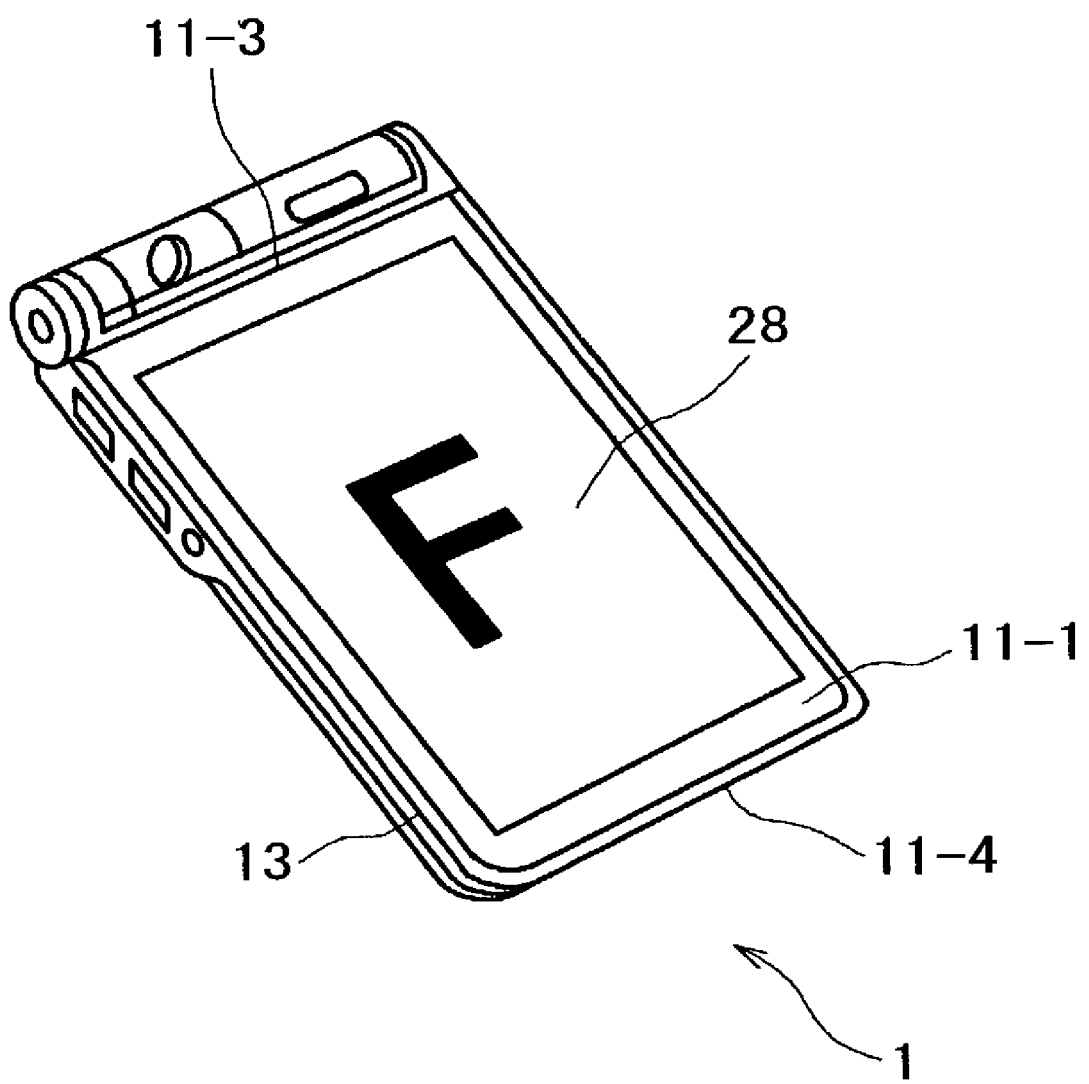

The user can pivot the display section 11 around the axis 11-6 as seen in FIG. 6. Further, the user can first pivot the display section 11 by substantially 180 degrees around the axis 11-6 and then pivot the display section 11 around the axis 12-1 as seen in FIG. 7 so that it is closed with respect to the body section 13 as seen in FIG. 8. In other words, the user can use the PDA 1 not only in such a state as seen in FIG. 1 but also in such a state as seen in FIG. 8.

Figure 9:
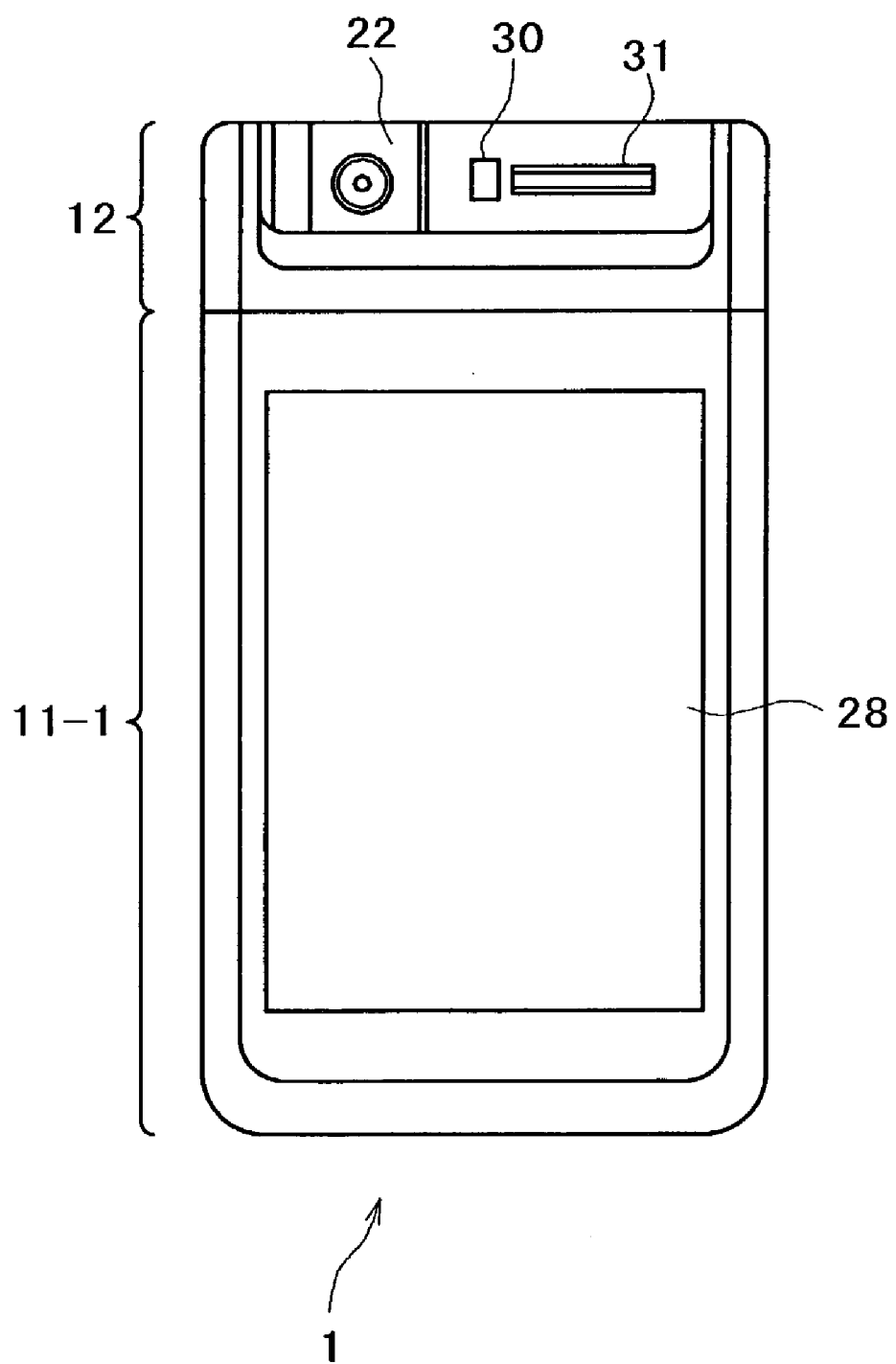
FIG. 9 is a front elevational view showing an example of the configuration of the PDA in the state of FIG. 8.
Figure 10:
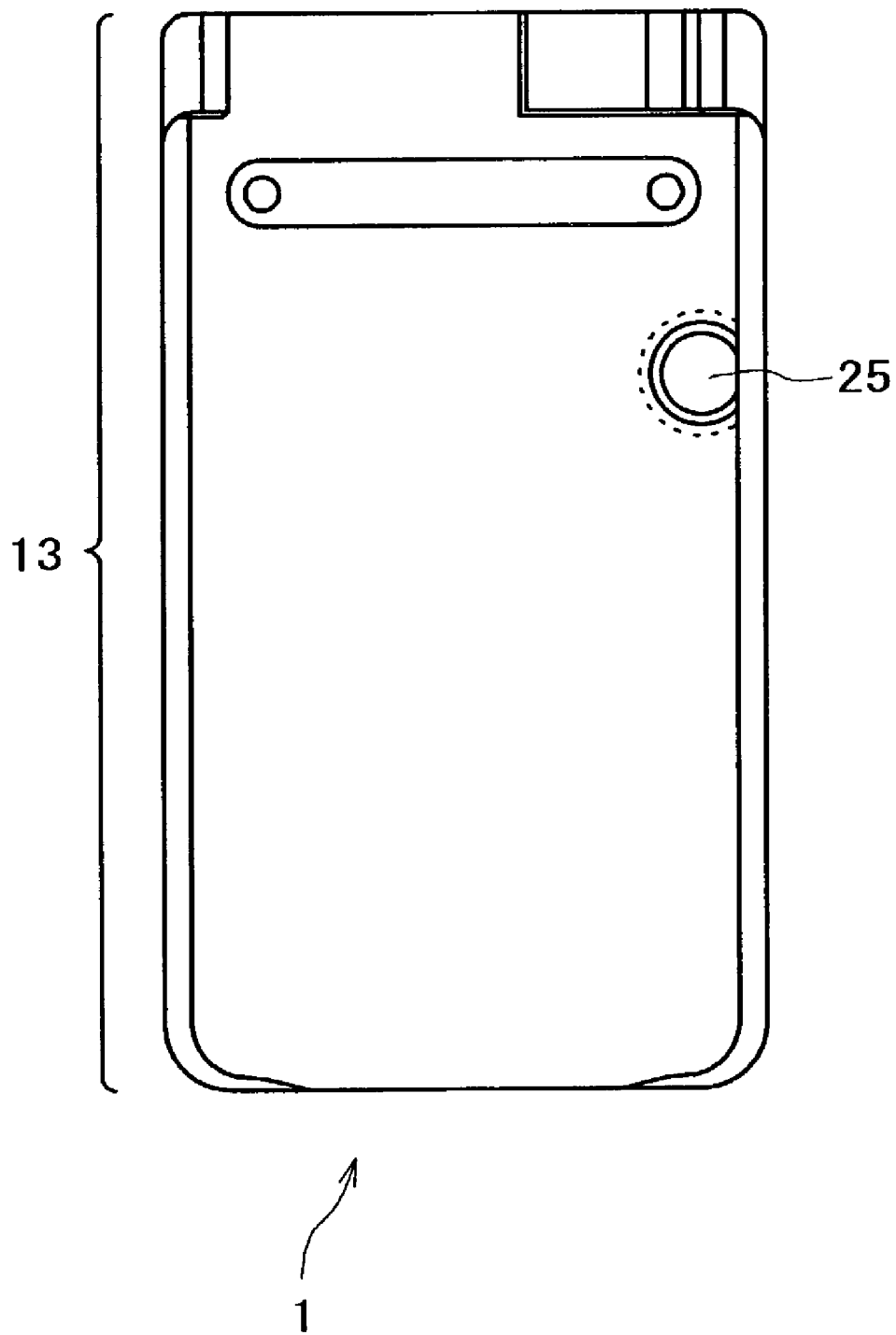
FIG. 10 is a rear elevational view showing an example of the configuration of the PDA in the state of FIG. 8.
Figure 11:
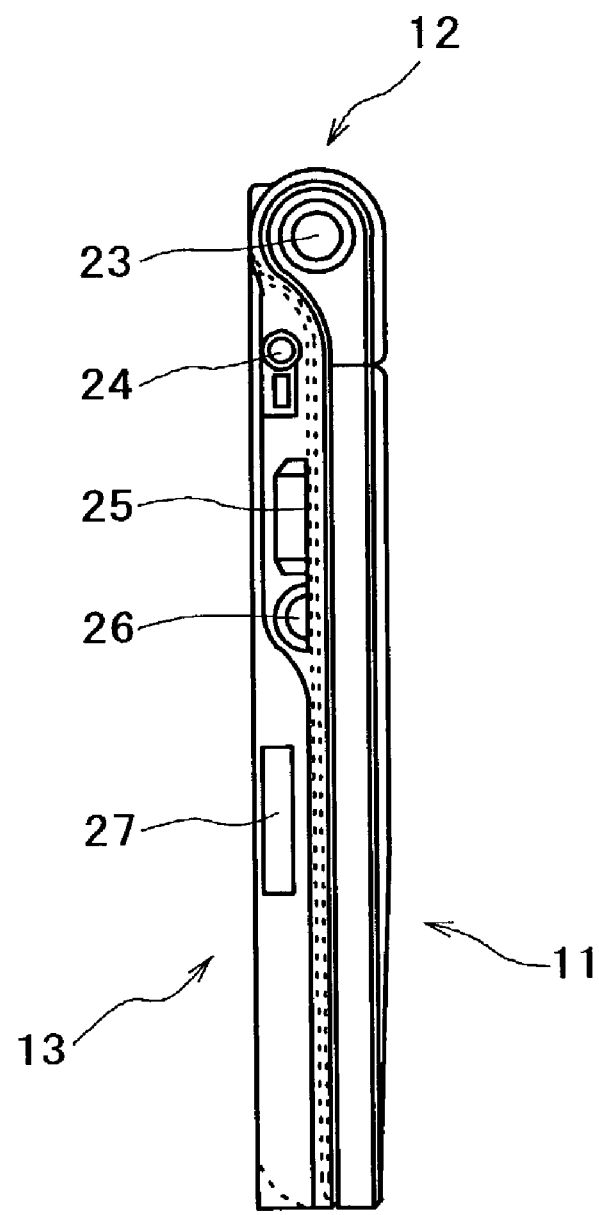
FIG. 11 is a left side elevational view showing an example of the configuration of the PDA in the state of FIG. 8.
Figure 12:
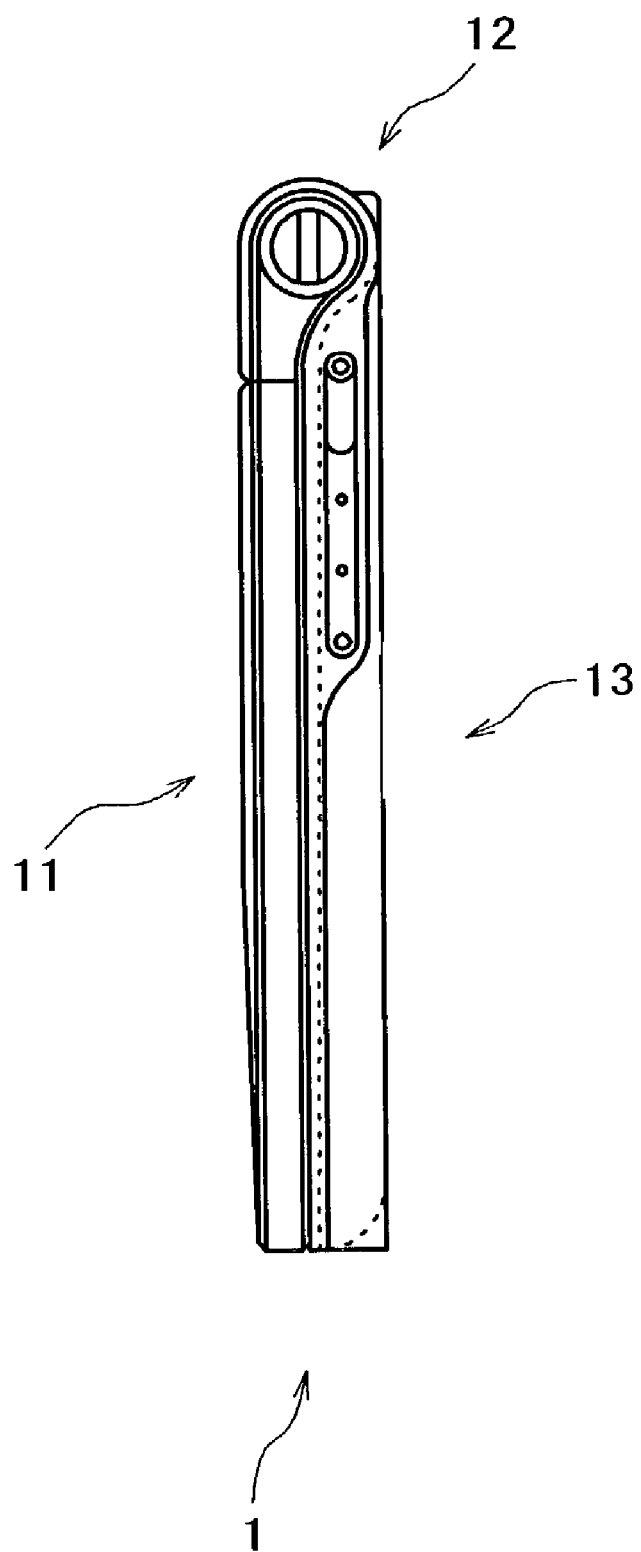
FIG. 12 is a right side elevational view showing an example of the configuration of the PDA in the state of FIG. 8.
Figure 13:
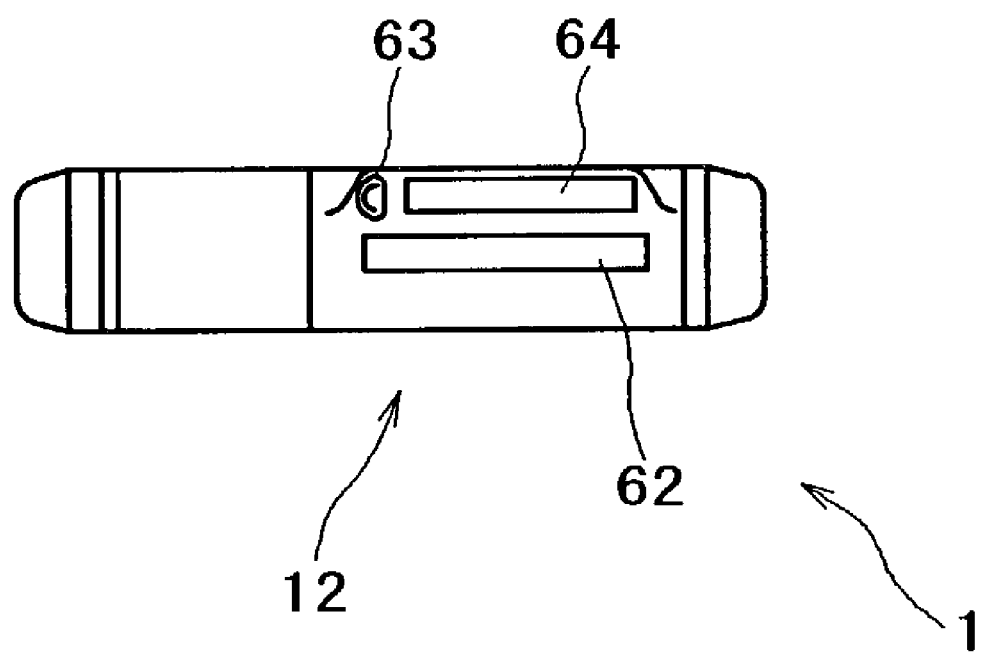
FIG. 13 is a top plan view showing an example of the configuration of the PDA in the state of FIG. 8.
Figure 14:
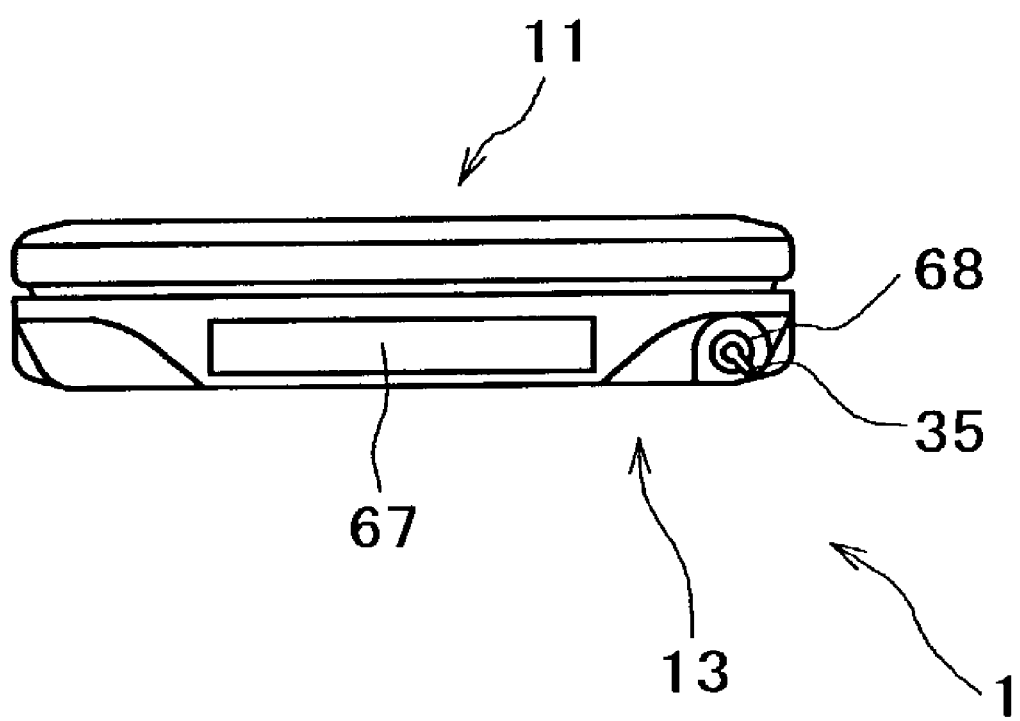
FIG. 14 is a bottom plan view showing an example of the configuration of the PDA in the state of FIG. 8.

It is to be noted that the views of the six faces of the PDA 1 shown in FIG. 8 are shown in FIGS. 9 to 14. In particular, the front elevational view is shown in FIG. 9; the rear elevational view in FIG. 10; the left side elevational view in FIG. 11; the right side elevational view in FIG. 12; the top plan view in FIG. 13; and the bottom plan view in FIG. 14.

A PDA which can be used in both of the states illustrated in FIGS. 1 and 8 is conventionally available. With the conventional PDA, however, if the display section thereof is pivoted, then depending upon the pivoted position, an image is displayed in a direction unnatural to the user as described hereinabove.

In particular, it is assumed here that, for example, such a character "F" as shown in FIG. 6 is displayed on the LCD unit 28. In other words, the character "F" is displayed such that the upward direction thereof is the face 11-4 side of the display section (the upward direction in FIG. 6). In this instance, if the conventional PDA is placed in such a state as shown in FIG. 8, and then since the face 11-4 is positioned at a lower portion in FIG. 8, an image of the character "F" which is reversed in the vertical and horizontal directions is displayed on the LCD unit 28 though not shown in FIG. 8.

Therefore, in the PDA 1 to which the present invention is applied, if the display section 11 is pivoted from a predetermined reference position, then a pivotal angle of the display section 11 around the axis 11-6 is detected, and if the pivotal angle is included within a range within which the display section 11 can be pivoted (in the present example, where the pivotal angle where the display section 11 is positioned as seen in FIG. 1 is represented by 0 degree, a range between equal to or more than 0 degree and equal to or less than 180 degrees), in a predetermined range (in the present example, a range between equal to or more than 0 degree and less than 180 degrees), then the character "F" is displayed on the LCD unit 28 such that the upper side of the image (character "F") may be the face 11-4 side.

On the other hand, if the pivotal angle of the display section 11 comes out of the range (in the present example, when the pivotal angle becomes 180 degrees), then the PDA 1 controls the LCD unit 28 to display the character "F" such that the upper side of the character "F" is directed to the end face 11-3 opposite to the end face 11-4. In other words, when the pivotal angle of the display section 11 is outside the predetermined range, the PDA 1 displays on the LCD unit 28 an image reversed in the vertical and horizontal directions with respect to an image displayed when the pivotal angle is included in the predetermined range. Assume that the character "F" whose upper side is directed to the face 11-4 is displayed on the LCD unit 28, when the pivotal angle is included in the predetermined range. In the case, when the pivotal angle is outside the predetermined range, the character "F" is displayed on the LCD unit 28 such that the upper side thereof is directed to the face 11-3 side opposite to the face 11-4.

More particularly, in the state illustrated in FIG. 6, the pivotal angle of the display section 11 is less than 180 degrees (is included in the predetermined angle described hereinabove), and therefore, the character "F" is displayed on the LCD unit 28 such that the upper side thereof is directed to the face 11-4 side (in the upward direction in FIG. 6).

On the other hand, in the state illustrated in FIGS. 7 and 8, since the pivotal angle of the display section 11 is 180 degrees (is outside the predetermined range described above), the character "F" is displayed on the LCD unit 28 such that the upper side thereof is directed to the face 11-3 side (in the downward direction in FIG. 7) opposite to the face 11-4.

In this manner, the PDA 1 can display an image in a direction natural to the user irrespective of the pivoted and opened or closed states of the display section 11.

Also when the camera 22 is pivoted, depending upon the pivoted position, an image is sometimes displayed in a direction unnatural to the user. Therefore, the PDA 1 not only detects the pivotal angle of the display section 11 but detects, when the camera 22 is pivoted from its reference position, the pivotal angle with respect to the reference position of the camera 22. Then, if the detected pivotal angle is outside the predetermined range, then the PDA 1 displays on the LCD unit 28 an image reversed in the vertical direction with respect to an image displayed when the pivotal angle is included within the predetermined range.

In this manner, the PDA 1 controls the displaying direction of an image appropriately by detecting the pivoted and opened or closed states of the display section 11 and the pivotal state of the camera 22 and comprehensively evaluating the detected states.

Figure 15:
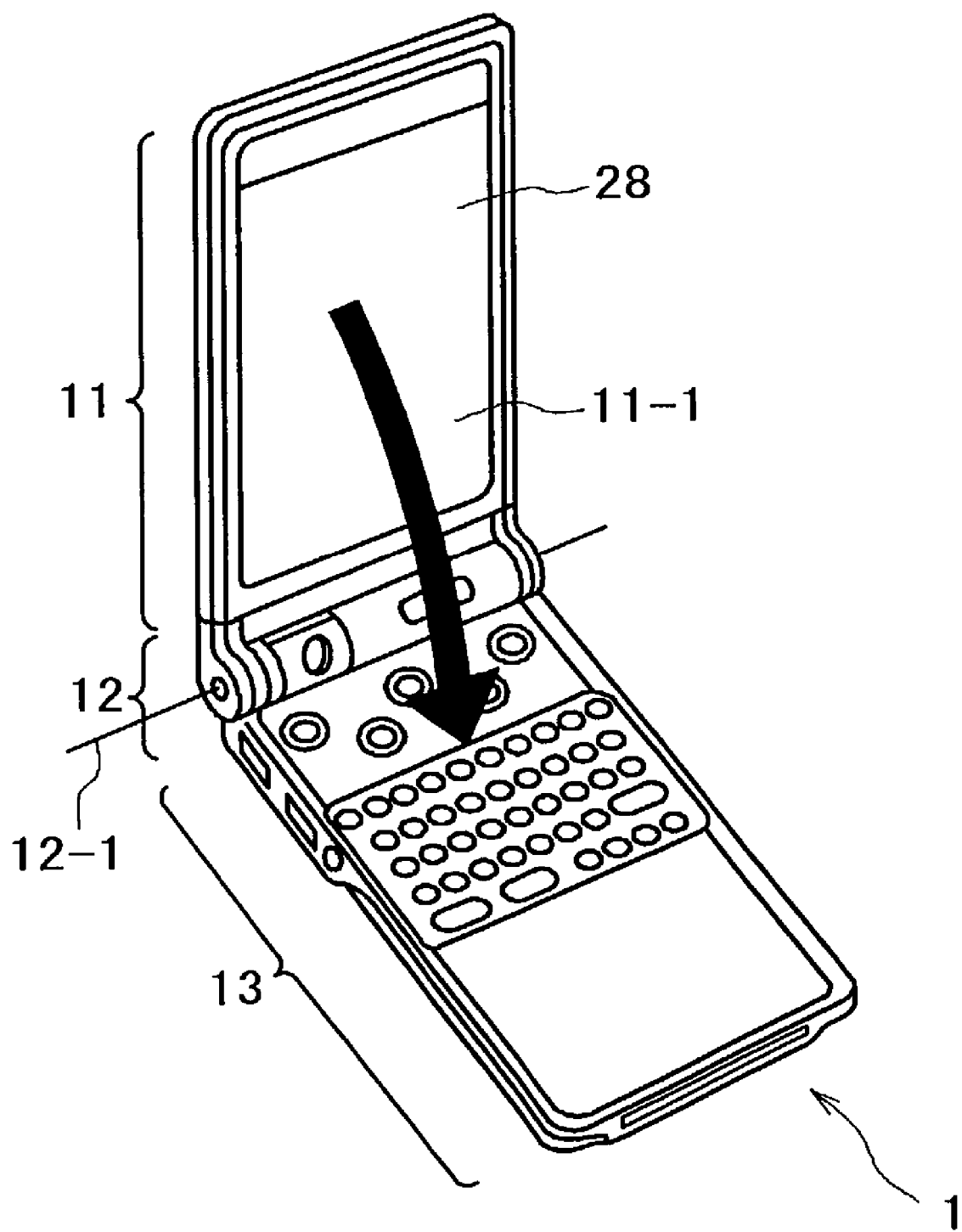
FIGS. 15 and 16 are perspective views illustrating a turning movement and opening and closing movements of the display section of the PDA of FIG. 1.
Figure 16:
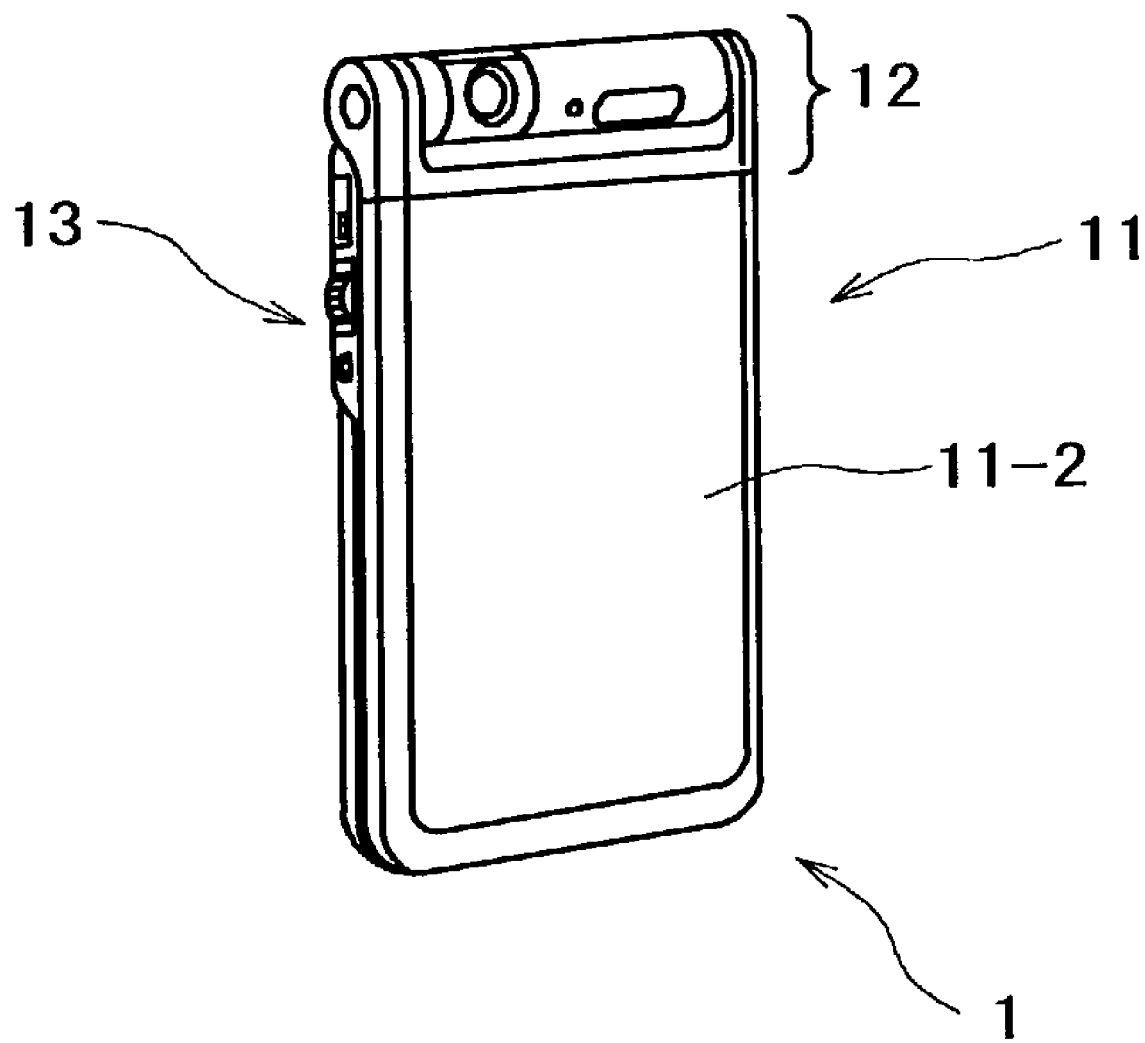

Further, not only when the PDA 1 is in the state illustrated in FIG. 7 but also when the PDA 1 is in the state illustrated in FIG. 15, the user can pivot the display section 11 around the axis 12-1 to close the display section 11 with respect to the body section 13. In particular, when the PDA 1 is to be carried or in a like case, the user can protect the PDA 1, particularly the LCD unit 28, by placing the PDA 1 into such a state as seen in FIG. 16 wherein the LCD unit 28 is opposed to the body section 13 thereby to avoid such a state that the LCD unit 28 is exposed to the outside as seen in FIG. 8.

While the basic configuration of the PDA 1 is described above, various apparatus for implementing such functions as described below are provided for the PDA 1 if necessary.

Figure 17:
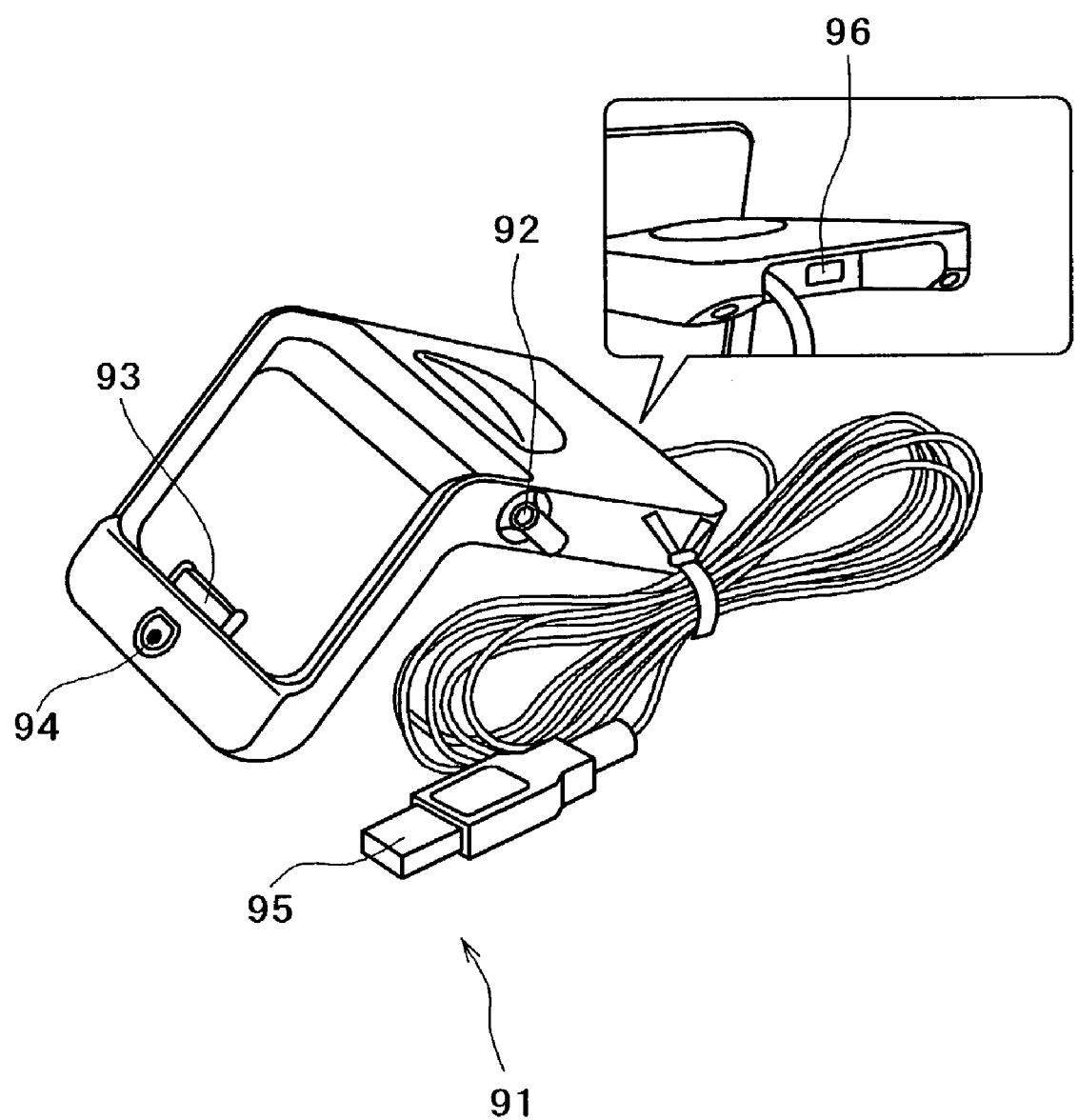
FIG. 17 is a perspective view showing an example of a configuration of a cradle provided in the PDA of FIG. 1.

In particular, when necessary, such a cradle 91 as shown in FIG. 17 is prepared for the PDA 1. Referring to FIG. 17, the cradle 91 shown includes a touch pen holder 92 for accommodating the touch pen 35, a body connector 93 for establishing a connection to the connector 67 of the PDA 1, a USB connector 95 for establishing a connection to a USB port of some other apparatus, a hot sinc button 94 for synchronizing, where some other different apparatus is connected to the USB connector 95, between data inside of the PDA 1 and data of the PDA 1 recorded in the different apparatus, and an AC (Alternating Current) adapter connector 96 for establishing a connection to an AC adapter 97 as shown in FIG. 18.

If the AC adapter 97 connected to a predetermined AC power supply 98 is connected to the adapter connector 96 of the cradle 91 and the PDA 1 is loaded on the cradle 91 (the connector 67 of the PDA 1 is connected to the body connector 93 of the cradle 91), then the cradle 91 automatically starts charging of a battery built in the PDA 1.

Further, if a connection is established between a USB port of some other different apparatus and the USB connector 95, then the PDA 1 can communicate with the different apparatus through the cradle 91. In other words, the PDA 1 can commonly use data through the cradle 91 with an apparatus which has a USB port.

Figure 19:
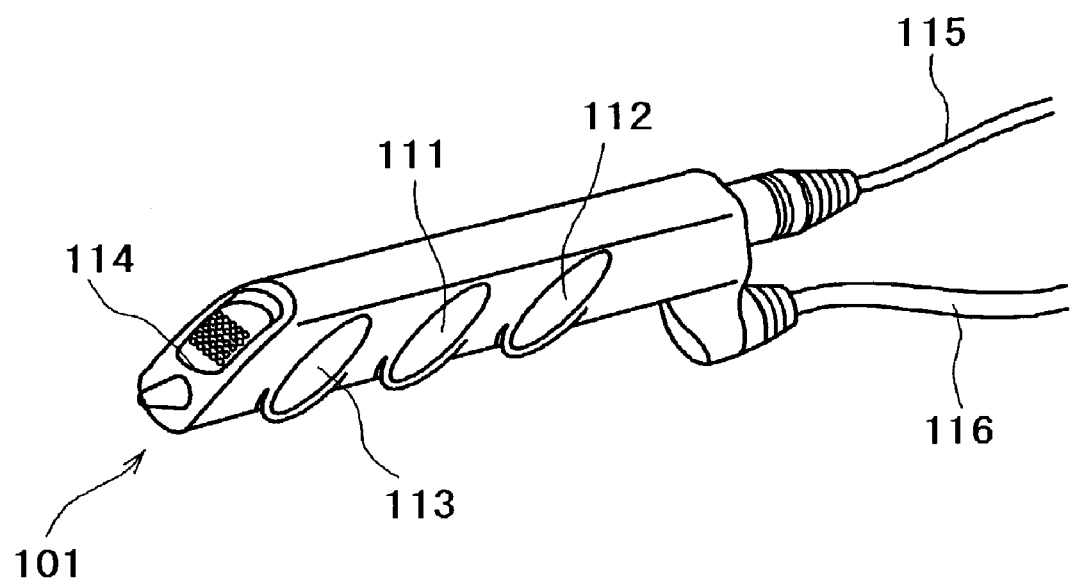
FIG. 19 is a perspective view showing an example of a configuration of a remote controller provided for the PDA of FIG. 1.

Further, when necessary, a remote controller 101 for controlling a reproduction process of sound or moving pictures with sound is prepared for the PDA 1 as seen in FIG. 19. The remote controller 101 includes a button 111 for executing rewinding, fast feeding or the like of sound, moving pictures with sound or the like, a button 112 for adjusting the volume of sound being reproduced, a button 113 for reproducing sound, moving pictures with sound or the like or stopping the reproduction, a button 114 for inhibiting operation corresponding to the other buttons 111, 112 and 113 in order to prevent a malfunction of the remote controller 101, a cable 115 for allowing connection to an external headphone (not shown), and a cable 116 for allowing connection to the headphone jack 24 of the PDA 1.

Thus, the user can utilize the remote controller 101 to perform remote control with regard to reproduction of sound, moving pictures with sound or the like.

Further, when necessary, a function expansion module 121 is loaded into the PDA 1 as seen in FIGS. 20 and 21.

Referring to FIGS. 20 and 21, when a Memory Stick is not loaded in the slot 64, the user can load the function expansion module 121, which is configured so as to be loaded into the slot 64, into the slot 64. Consequently, the function expansion module 121 can execute a predetermined function provided therefor.

While the configuration of the function expansion module 121 is not limited particularly only if it is configured so as to be loaded into the slot 64 as described above, that is, only if it has a connection section of the same configuration as that of a Memory Stick. However, the function expansion module 121 preferably is configured such that, where it is loaded in the slot 64, the display section 11 is permitted to be opened and closed with respect to the body section 13 as seen in FIG. 21.

Further, the function provided for the function expansion module 121 is not limited particularly. For example, if the user loads a function expansion module (GPS module) 121 formed form a GPS (Global Positioning System) reception apparatus or the like for receiving position information of the PDA 1 into the PDA 1, then the user can use the PDA 1 as a navigation system apparatus for receiving position information and displaying the position on a map image.

On the other hand, for example, if the user loads a function expansion module (radio LAN module) 121 formed from a communication apparatus or the like which effects radio communication in accordance with a communication method prescribed in a predetermined radio LAN communication system into the PDA 1, the user can use the PDA 1 as a communication terminal of the radio LAN.

In this manner, the user can use the PDA 1 as an apparatus having various functions by possessing a plurality of function expansion modules 121 having different functions from each other and suitably loading one of the function expansion modules 121 into the PDA 1.

Figure 22:
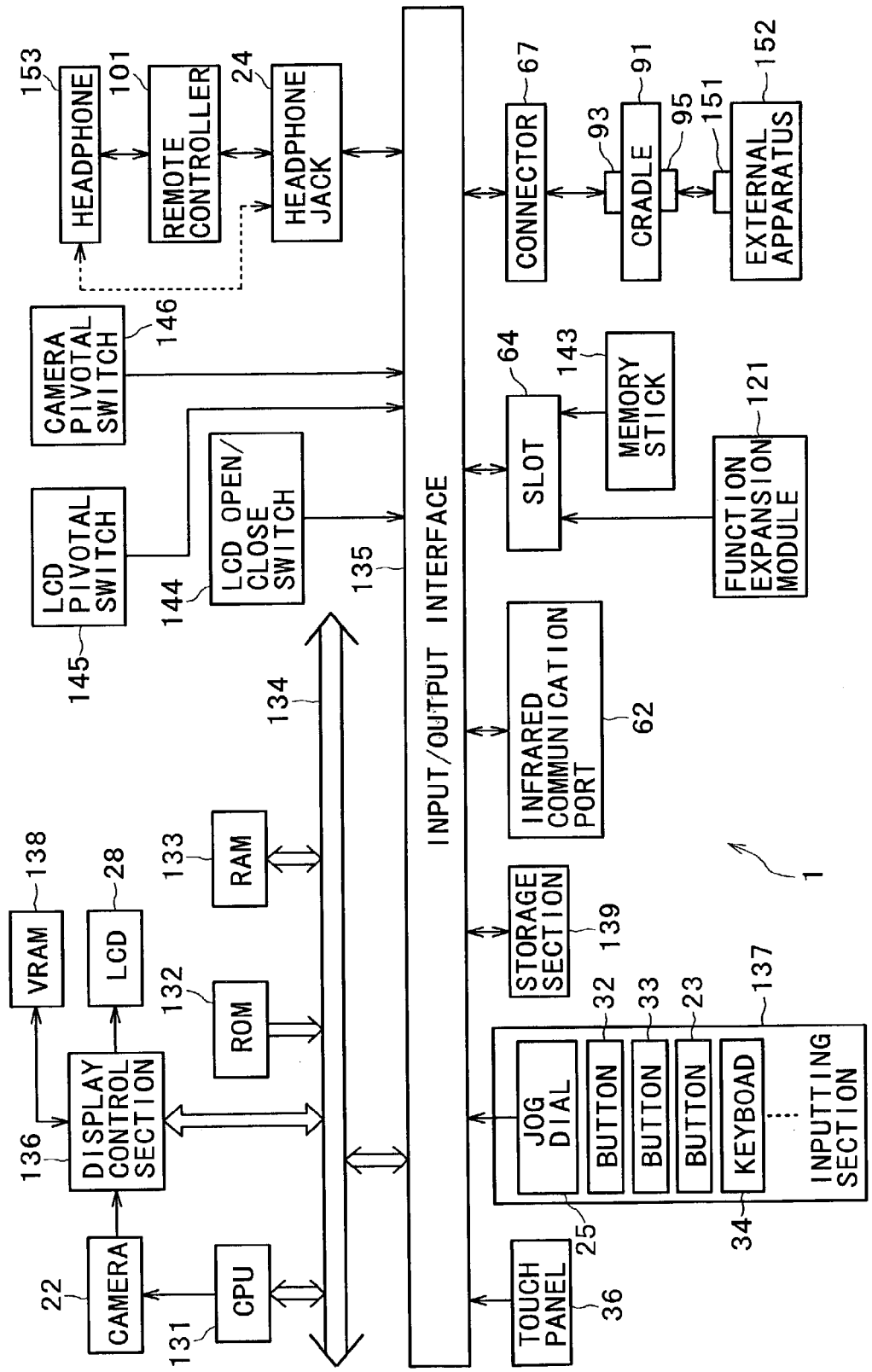
FIG. 22 is a block diagram showing an example of an internal configuration of the PDA of FIG. 1.

FIG. 22 shows an example of an internal configuration of the PDA 1.

Referring to FIG. 22, a CPU (Central Processing Unit) 131 executes various processes in accordance with a program stored in a ROM (Read Only Memory) 132 or a program having been loaded into a RAM (Random Access Memory) 133 from a storage section 139.

Also data necessary for the CPU 131 to execute various processes and so forth are suitably stored into the RAM 133.

The CPU 131, ROM 132 and RAM 133 are connected to each other by a bus 134. Also a display control section 136 for controlling an image to be displayed on the LCD unit 28 is connected to the bus 134.

The camera 22 and the LCD unit 28 described above as well as a VRAM (Video RAM) 138 are connected to and controlled by the display control section 136 under the control of the CPU 131. The display control section 136 stores an image picked up by the camera 22 into the VRAM 138 and displays an image stored in the VRAM 138 or an image stored in some other memory (the RAM 133, the storage section 139, or a Memory Stick 143 connected to the slot 64) on the LCD unit 28.

Figure 23:
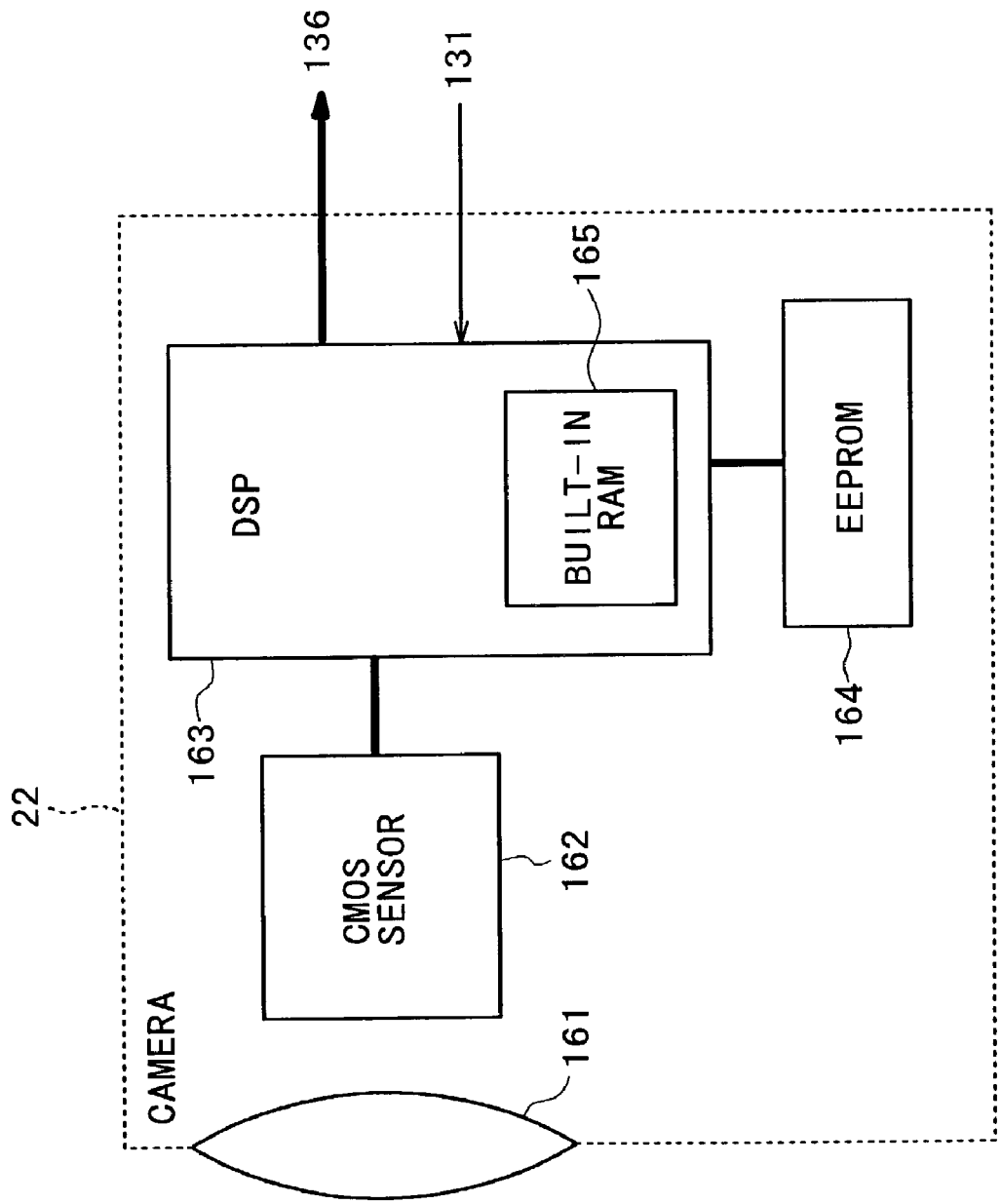
FIG. 23 is a block diagram showing an example of an internal configuration of a camera of the PDA of FIG. 22.

The camera 22 is configured in such a manner as seen in FIG. 23. Referring to FIG. 23, the camera 22 includes a CMOS (Complementary Metal Oxide Semiconductor) sensor 162 serving as an image pickup device for scanning an image of a subject in a predetermined direction to fetch the image through a lens 161, a digital signal processor (DSP) 163 for starting or ending an image pickup operation of the CMOS sensor 162 and suitably controlling the scanning direction and so forth under the control of the CPU 131, and an EEPROM (Electrically Erasable and Programmable Read Only Memory) 164 in which a program for executing a process of the digital signal processor 163 and initial value data are stored.

A built-in RAM 165 is provided in the digital signal processor 163. The digital signal processor 163 stores image data fetched by the CMOS sensor 162 successively into the built-in RAM 165 in the order as scanned by the CMOS sensor 162, and supplies, in response to an instruction of the CPU 131, the image data stored in the built-in RAM 165 for each access unit (a field or a frame) to the display control section 136.

Referring back to FIG. 22, also an input/output interface 135 is connected to the bus 134.

Connected to the input/output interface 135 are an inputting section 137 which includes the keyboard 34, buttons 23, 32 and 33, jog dial 25 and so forth described hereinabove, the touch panel 36, the infrared communication port 62, the slot 64 into which a Memory Stick 143 or a function expansion module 121 is loaded, the connector 67 to which the cradle 91 which charges the battery (not shown) built in the PDA 1 and further serves as a repeating apparatus for communication with some other external apparatus 152 and so forth are connected, and the headphone jack 24 serving as a sound outputting section to which the remote controller 101 or a headphone 153 is connected.

It is to be noted that the coordinates detected by the touch panel 36 are provided to the CPU 131 through the input/output interface 135 and the bus 134, and the CPU 131 acquires predetermined information corresponding to the coordinates provided thereto.

Also a storage section 139 formed from a hard disk or the like is connected to the input/output interface 135 when necessary. A computer program read out from a magnetic disk, an optical disk, a magneto-optical disk, a semiconductor memory or the like suitably loaded in the external apparatus 152 is supplied to the PDA 1 and installed into the storage section 139 when necessary by such means as radio communication through the infrared port 62 or through the radio LAN module (function expansion module) 121, or wire communication through the cradle 91. Alternatively, also a computer program read out from the Memory Stick 143 suitably loaded in the slot 64 is installed into the storage section 139 when necessary.

Further connected to the input/output interface 135 are an LCD open/close switch 144 which exhibits an on state when the display section 11 is in a closed state with respect to the body section 13 but exhibits an off state when the display section 11 is in an open state with respect to the body section 13, an LCD pivotal switch 145 which is placed into an on state when the display section 11 is pivoted by more than a predetermined pivotal angle, and a camera pivotal switch 146 which is placed into an on state when the camera 22 is pivoted by more than a predetermined pivotal angle.

Thus, in the present example, the CPU 131 recognizes an open or closed state of the display section 11 with respect to the body section 13 (the state is hereinafter referred to as LCD open/closed state), a pivoted state of the display section 11 with respect to the body section 13 and a pivoted state of the camera 22 based on on/off states of the LCD open/close switch 144, LCD pivotal switch 145 and camera pivotal switch 146.

Figure 24:
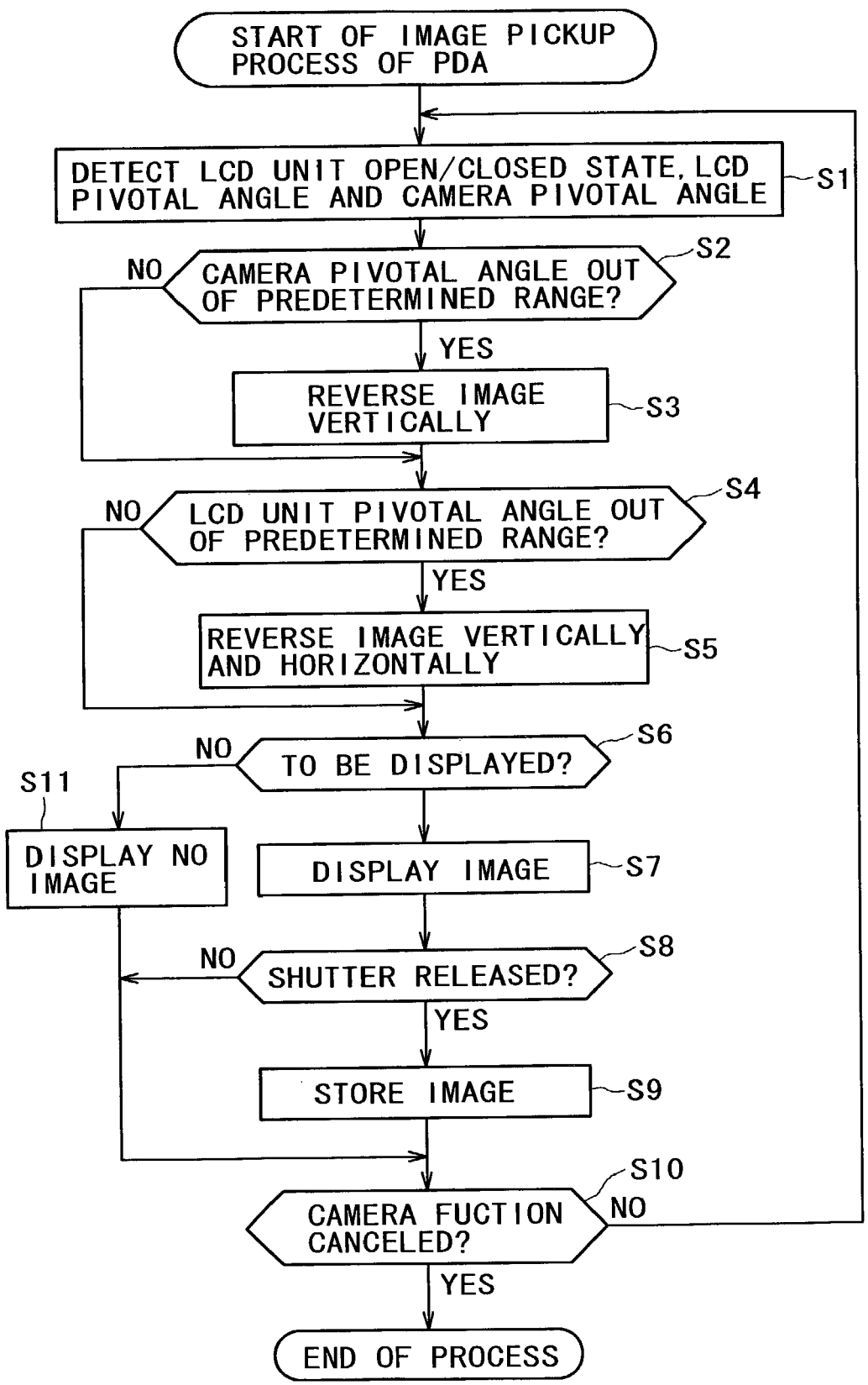
FIG. 24 is a flow chart illustrating an image pickup process of the PDA of FIG. 1.

In the following, an image pickup process corresponding to the above-mentioned camera function from among the various functions of the PDA 1 of FIG. 1 is described with reference to a flow chart of FIG. 24.

It is assumed now that, for example, the user depresses the capture button 23 shown in FIG. 1 while the power supply to the PDA 1 is on.

In response to the depression, the CPU 131 of FIG. 22 starts up application software recorded in the ROM 132 for achieving the camera function to start image pickup by the camera 22 thereby to start the image pickup process.

At step S1, the CPU 131 detects an LCD open/closed state of the display section 11 and a pivotal angle of the display section 11 around the axis 11-6 shown in FIG. 6 (the pivotal angle is hereinafter referred to as LCD pivotal angle) as well as a pivotal angle of the camera 22 around the axis 12-1 shown in FIG. 6 (the pivotal angle is hereinafter referred to as camera pivotal angle).

Figure 25:
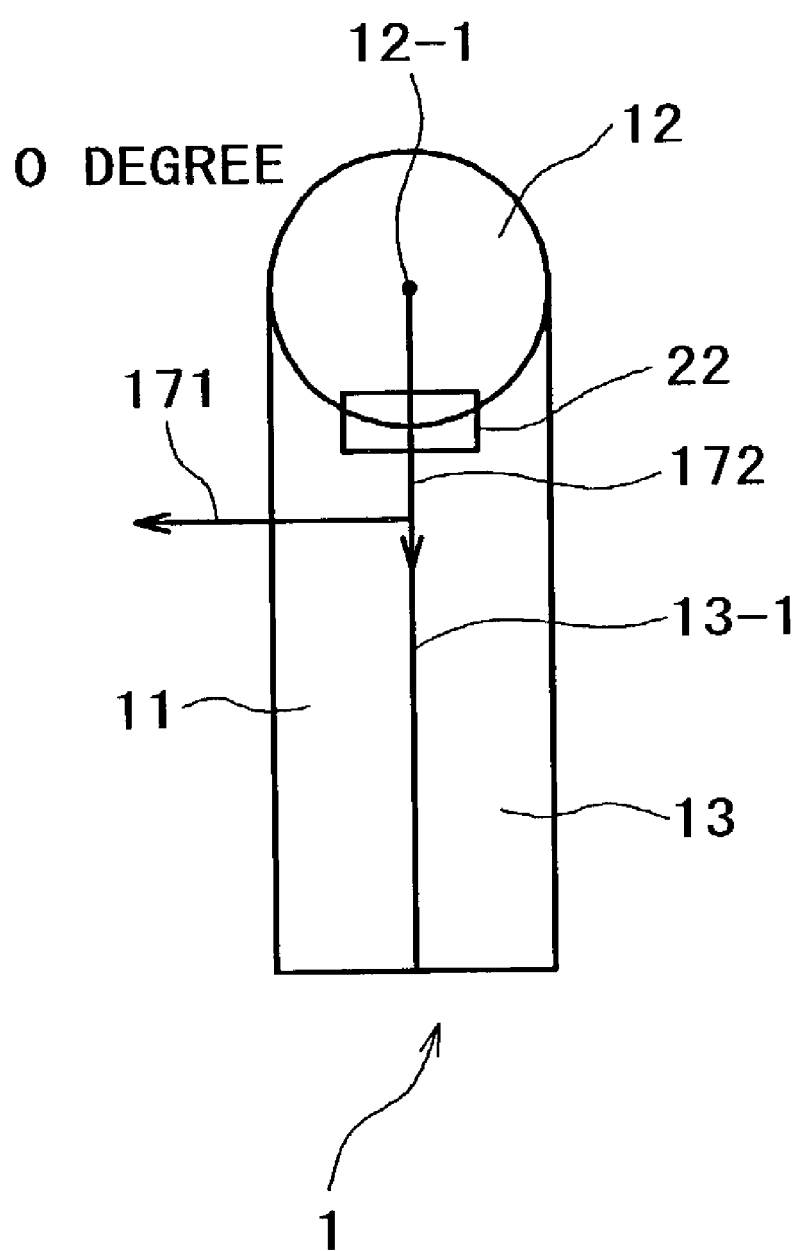
FIGS. 25 to 27 are side elevational views illustrating ranges of a pivotal movement of the camera of the PDA of FIG. 1.

Although the references for the LCD pivotal angle and the camera pivotal angle are not limited specifically, it is assumed that, in the present example, the LCD pivotal angle when the PDA 1 is in such a state as seen in FIG. 25 is determined as substantially 0 degree (the reference position). Further, Assume that the PDA 1 is in such a state as seen in FIG. 25, that is, the display section 11 is in a closed state with respect to the body section 13. When the camera 22 is placed such that a normal 171 to the face 13-1 of the body section 13 opposed to the display section 11, and an image pickup direction 172 of the camera 22 are perpendicular to each other, it is determined that the camera pivotal angle is substantially 0 degree (the reference position).

More particularly, at step S1, the CPU 131 acquires on/off states of the LCD open/close switch 144, LCD pivotal switch 145 and camera pivotal switch 146 through the input/output interface 135 and the bus 134 to detect the LCD open/closed state, LCD pivotal angle and camera pivotal angle, respectively.

It is to be noted that, although the range of the LCD pivotal angle within which the LCD pivotal switch 145 exhibits an on state is not limited particularly, it is assumed that, in the present example, it is equal to or more than substantially 180 degrees. In the present example, however, since the range over which the display section 11 can be pivoted is set to the range from 0 to substantially 180 degrees, the LCD pivotal switch 145 actually exhibits an on state only when the LCD pivotal angle is 180 degrees, that is, only in the state wherein the display section 11 is folded such that the LCD unit 28 is not exposed to the outside.

In particular, when the display section 11 is placed in such a state as seen in FIG. 29, 30, 31, 36 or 37, the LCD pivotal switch 145 exhibits an on state, but when the display section 11 is placed in such a state as seen in FIG. 32, 33, 34 or 35, the LCD pivotal switch 145 exhibits an off state.

Figure 26:
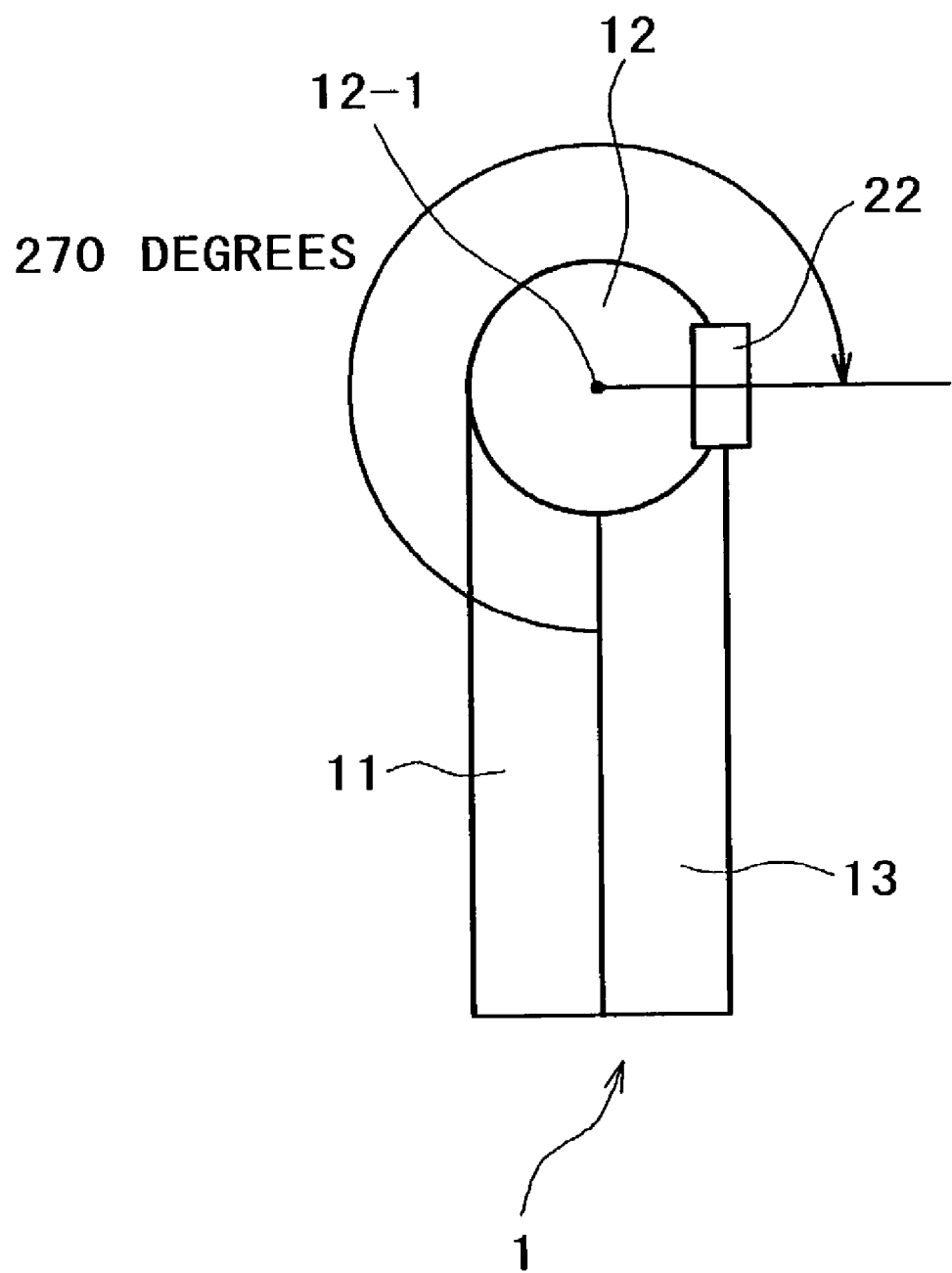
Figure 27:
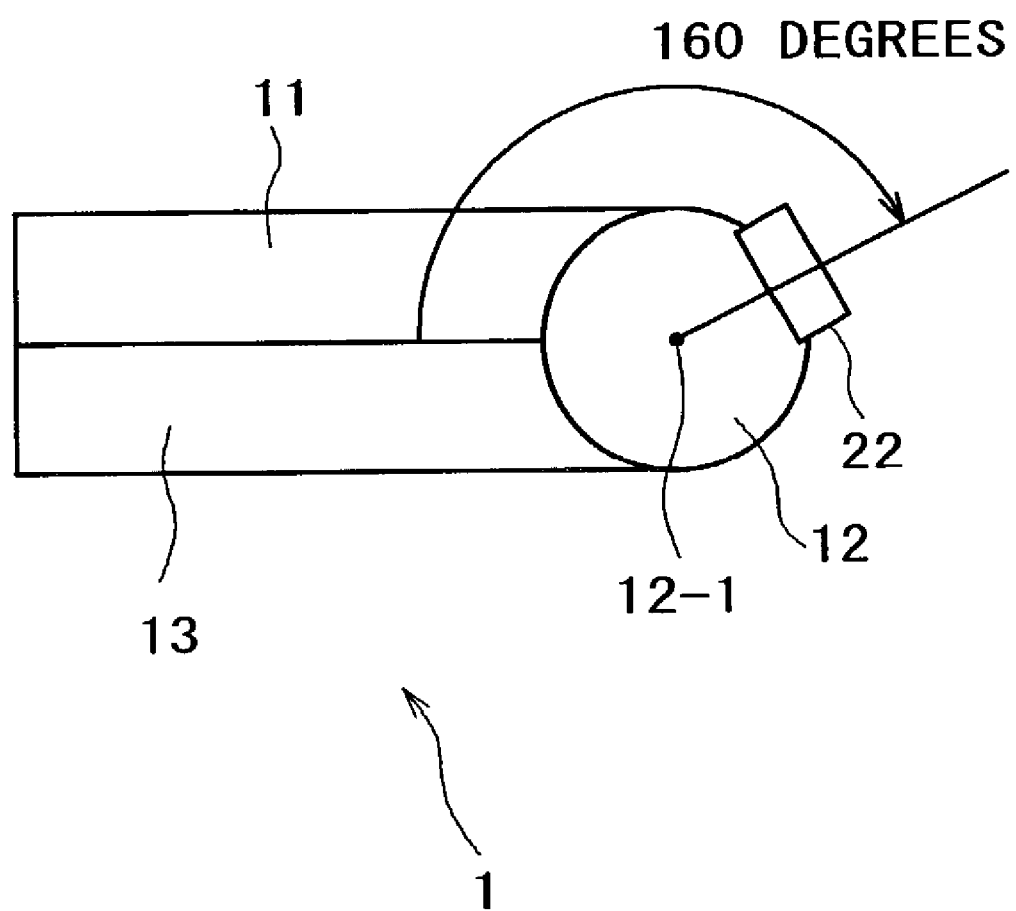
Figure 28:
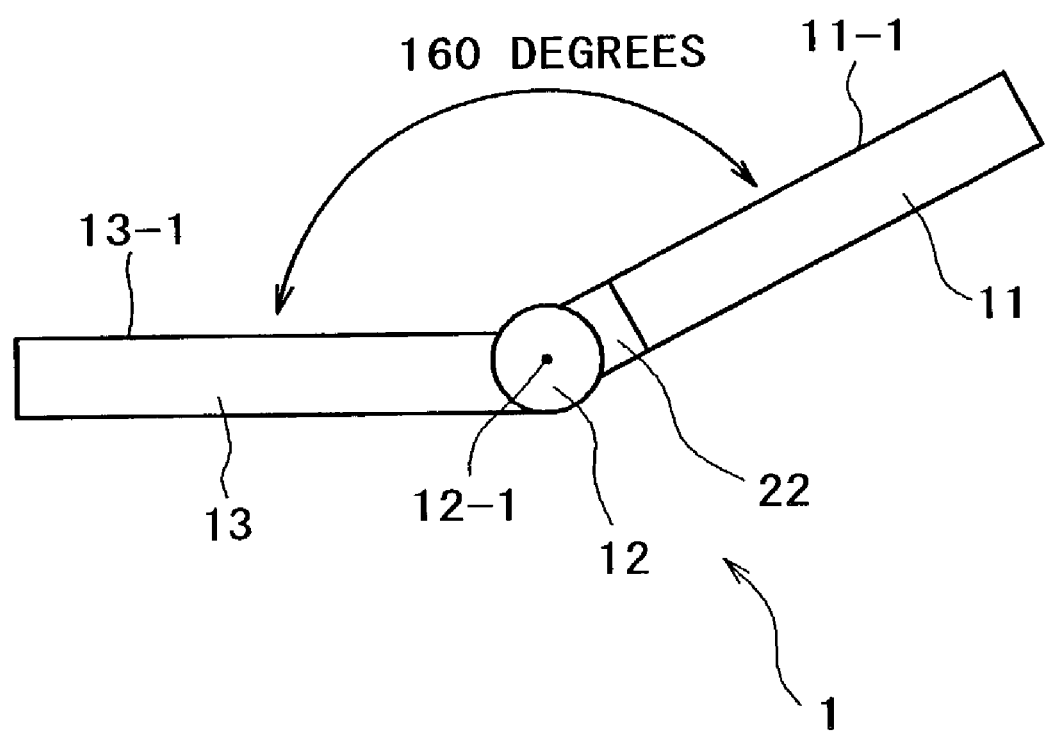
FIG. 28 is a side elevational view illustrating ranges of pivotal movement of the display section of the PDA of FIG. 1.

Although also the pivotal range of the camera 22 is not limited particularly, it is assumed that, in the present example, it is determined to be a range from substantially 0 degree to substantially 270 degrees as seen in FIGS. 25 and 26. Furthermore, although the range of the camera pivotal angle within which the camera pivotal switch 146 exhibits an on state is not limited particularly, it is assumed that it is a range greater than an angle which coincides with the maximum opening angle of the display section 11 with respect to the body section 13 but less than substantially 270 degrees. In particular, when the opening angle of the display section 11 with respect to the body section 13 ranges from substantially 0 degree to substantially 160 degrees as seen in FIG. 28, the camera pivotal switch 146 exhibits an off state, but when the opening angle ranges from substantially 160 degrees to substantially 270 degrees greater than the former range as seen in FIG. 27, the camera pivotal switch 146 exhibits an on state.

Consequently, irrespective of the opening angle of the display section 11 (even if the opening angle is substantially 160 degrees), if the subject is the user him/herself, the camera pivotal switch 146 exhibits an off state without fail.

In particular, when the camera 22 is placed at such a position as seen in FIG. 31, 32, 34 or 36, the camera pivotal switch 146 exhibits an off state, but when the camera 22 is placed at such a position as seen in FIG. 29, 30, 33, 35 or 37, the camera pivotal switch 146 exhibits an on state.

The CPU 131 can estimate in which one of the states shown in FIGS. 29 to 37 the PDA 1 is by recognizing on/off states of the LCD open/close switch 144, LCD pivotal switch 145 and camera pivotal switch 146.

A relationship between the on/off states of the LCD open/close switch 144, LCD pivotal switch 145 and camera pivotal switch 146 and different states of the PDA 1 (the states shown in FIGS. 29 to 37) is indicated in Table 1 below.

TABLE 1

Figure 29:
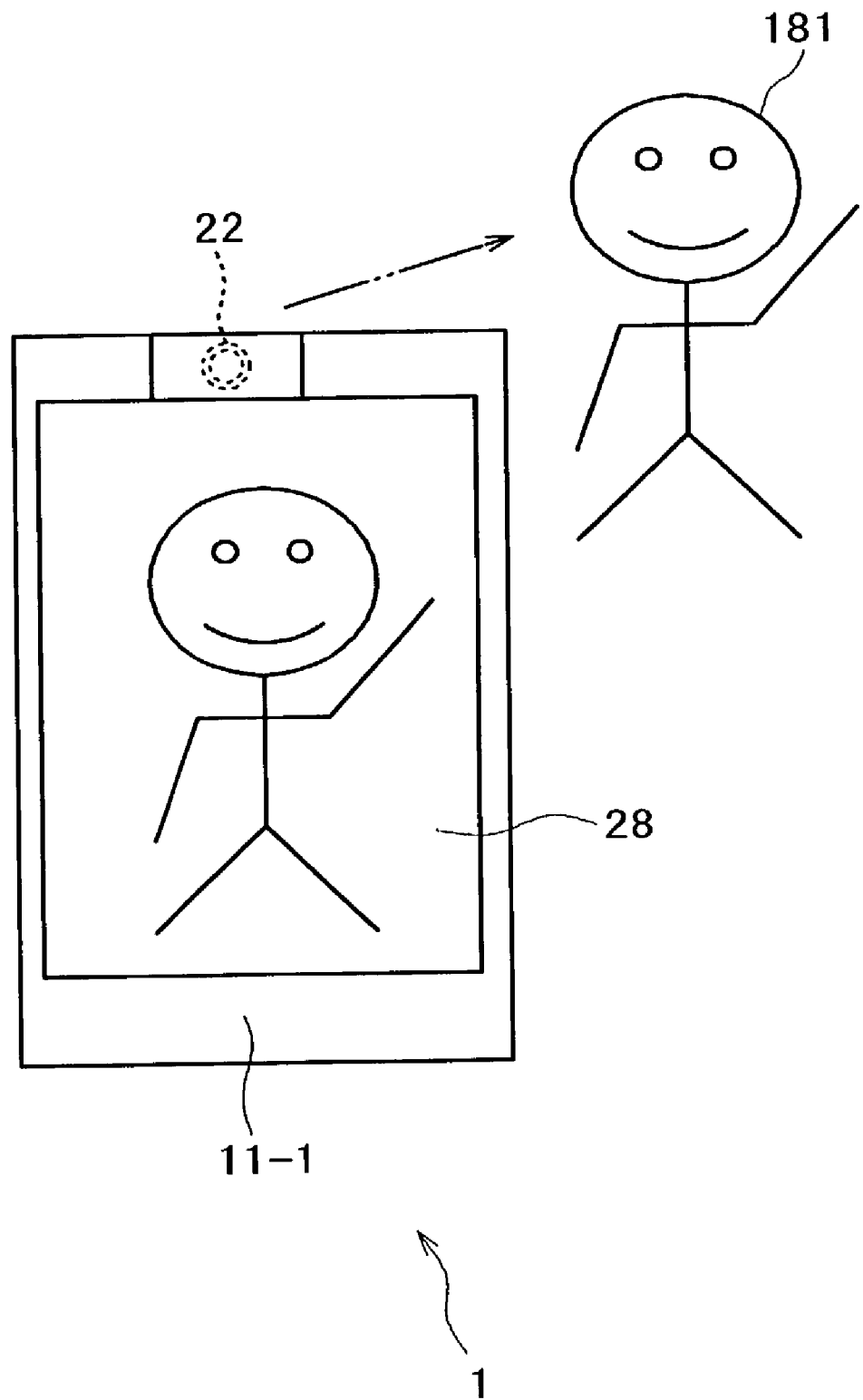
Figure 30:
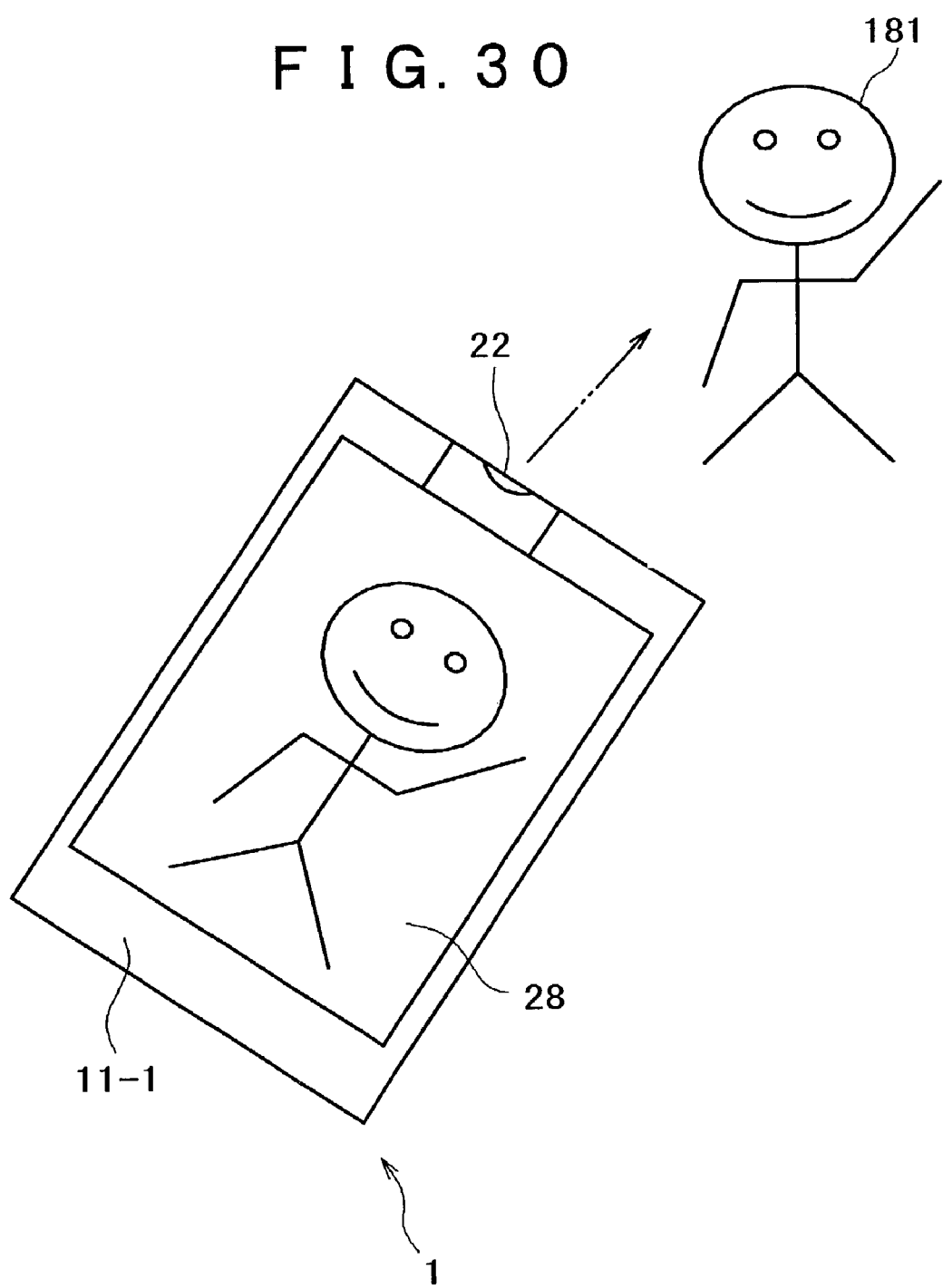
Figure 31:
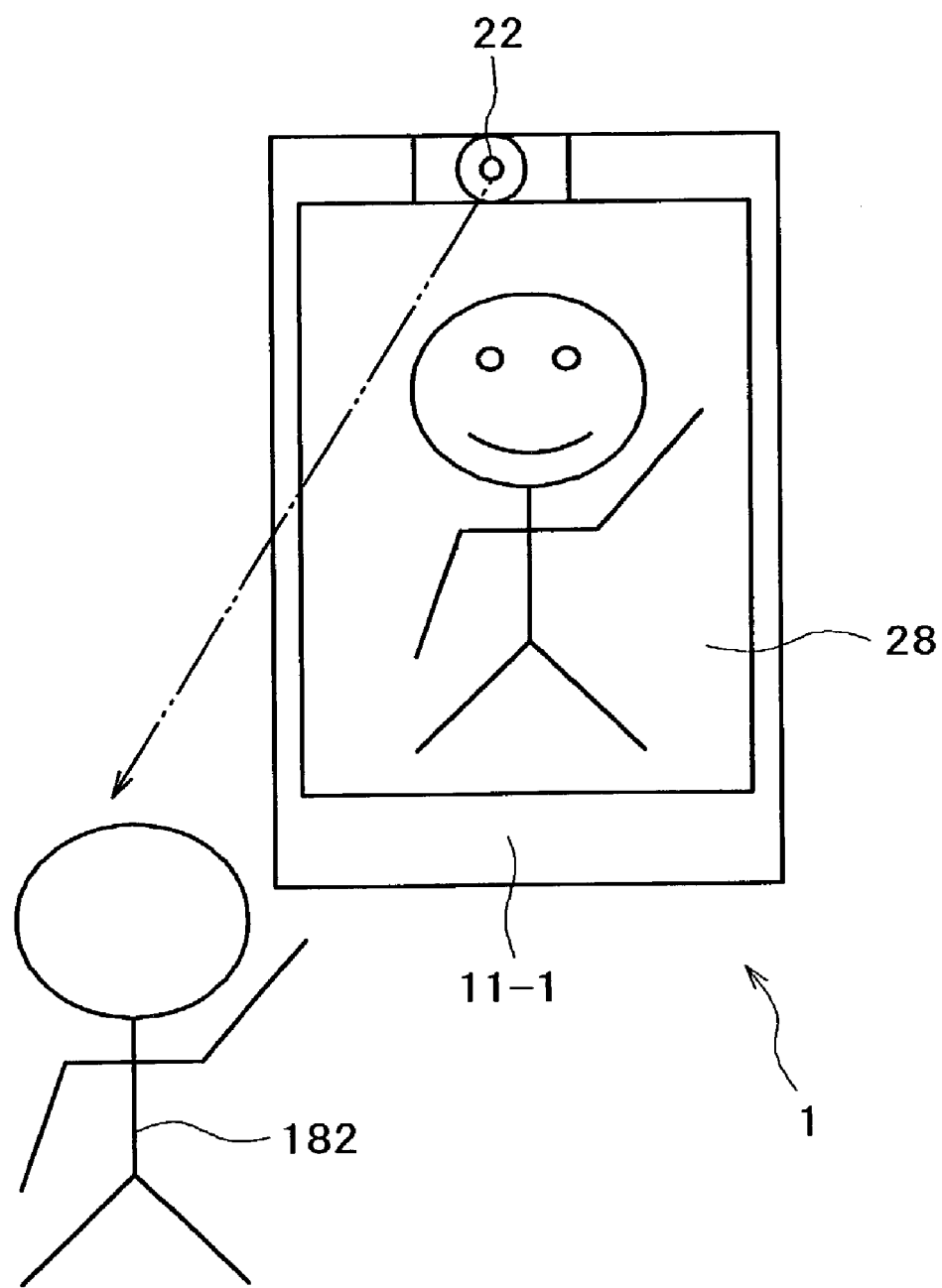
Figure 33:
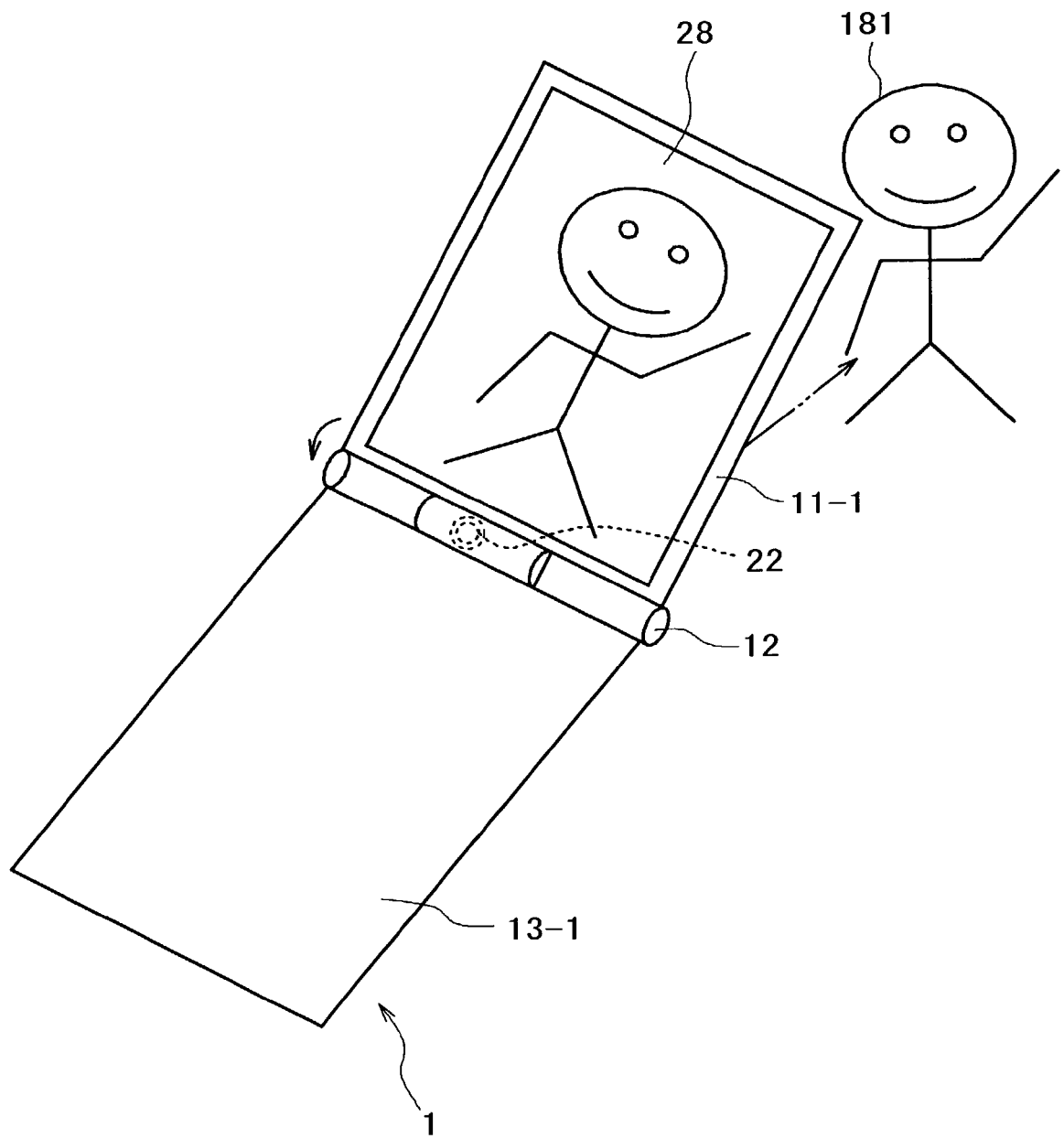
Figure 35:
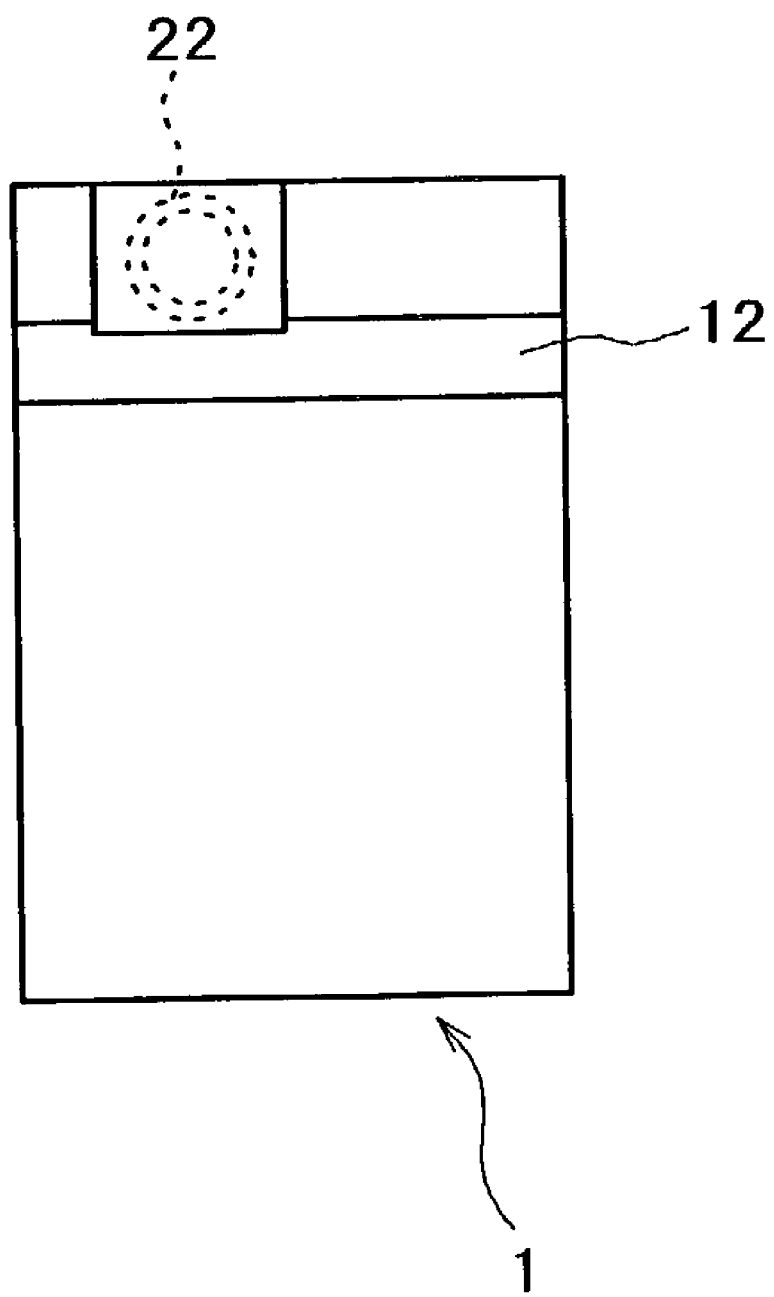
Figure 36:
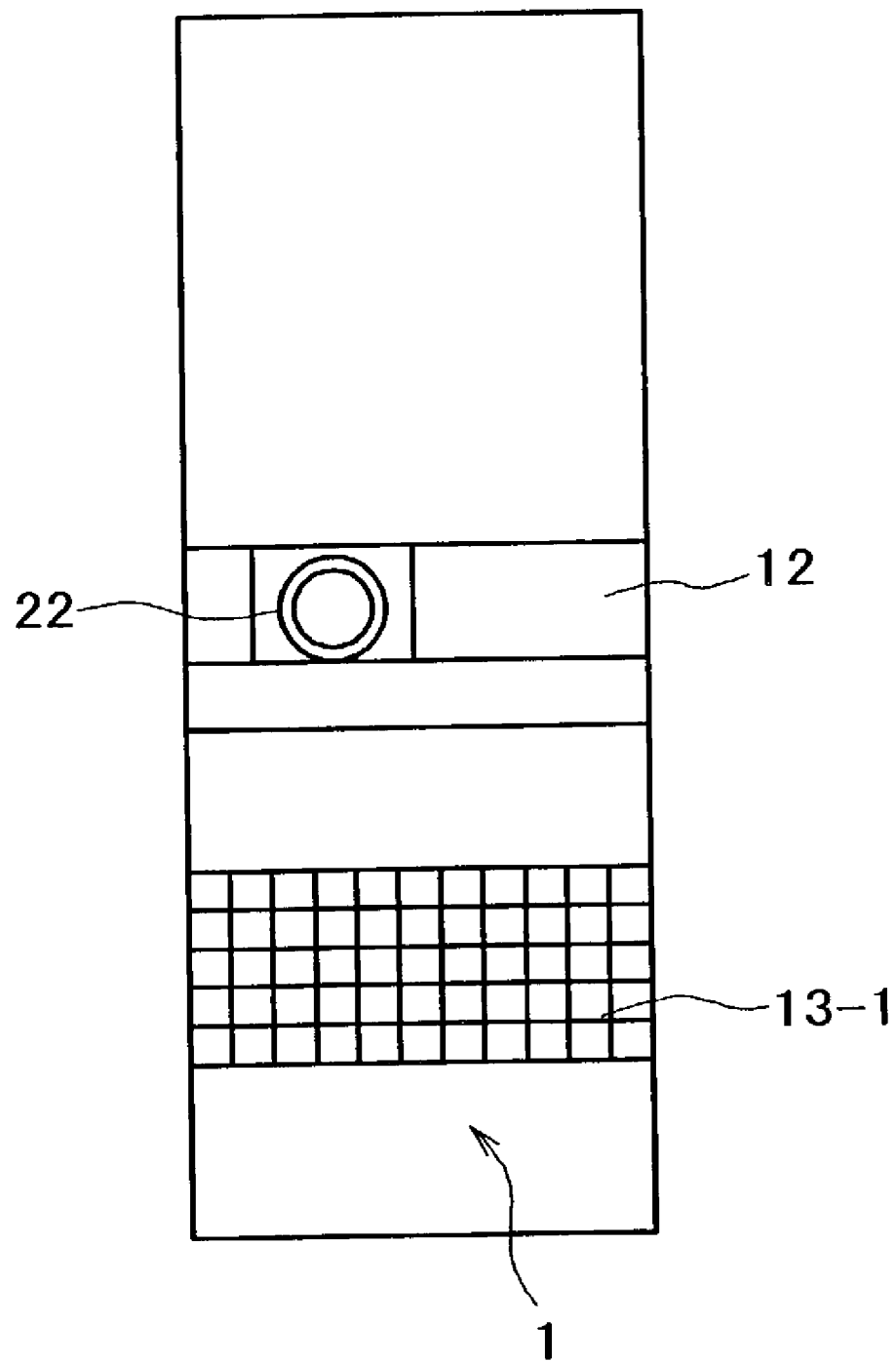
Figure 37:
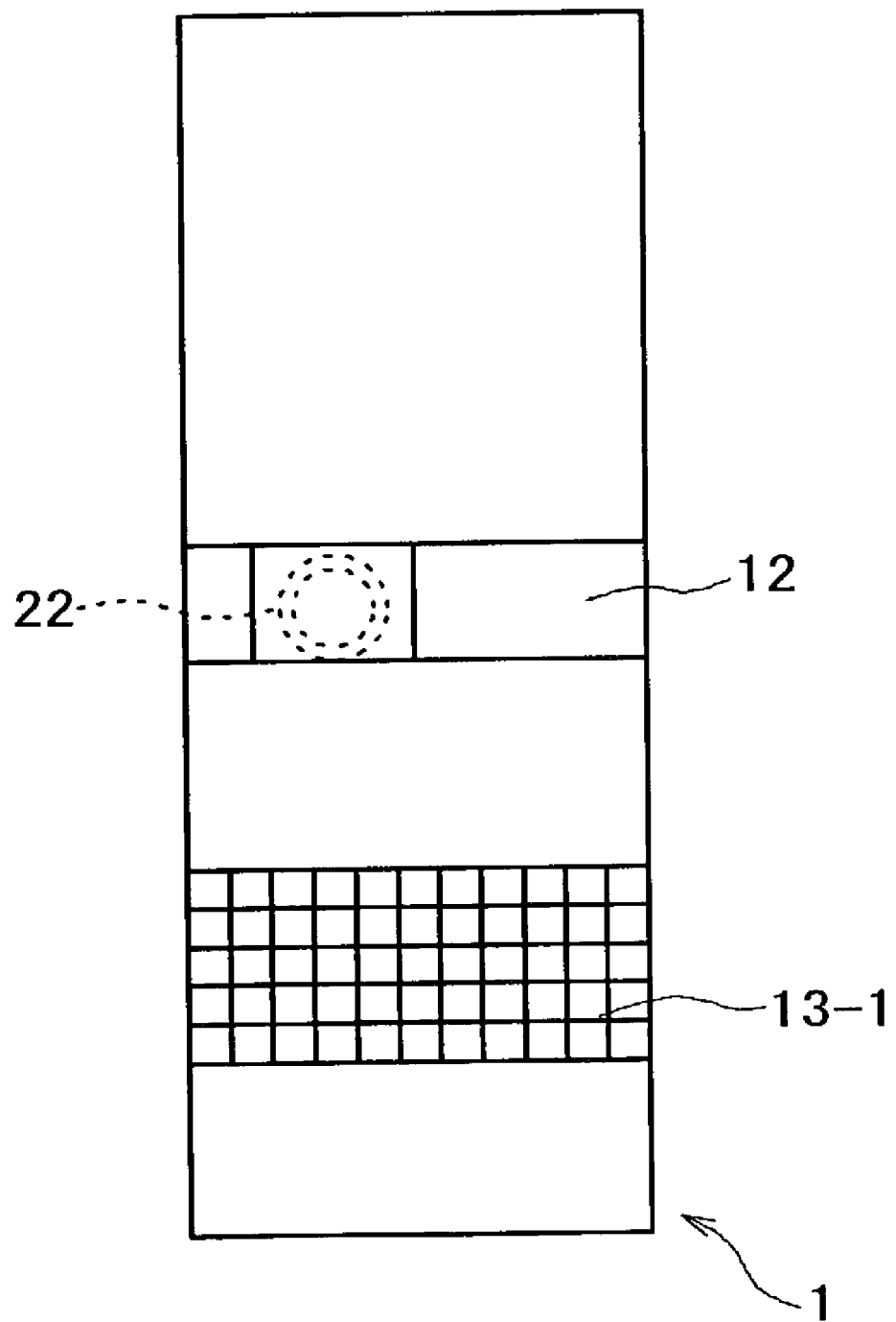

| State of PDA | FIG. 34 | FIG. 31 | FIG. 35 | FIG. 29 FIG. 30 | FIG. 32 (basic) | FIG. 36 | FIG. 33 | FIG. 37 |
|---|---|---|---|---|---|---|---|---|
| LCD open/close SW | ON | ON | ON | ON | OFF | OFF | OFF | OFF |
| LCD pivotal SW | OFF | ON | OFF | ON | OFF | ON | OFF | ON |
| Camera pivotal SW | OFF | OFF | ON | ON | OFF | OFF | ON | ON |
| Display | X | ○ | X | ○ | ○ | ○ | ○ | ○ |
| Reversal | X | X | ○ | ○ | X | X | ○ | ○ |
| Pivotal motion by 180 degrees | X | ○ | X | ○ | X | ○ | X | ○ |

It is to be noted that the items of "Display", "Reversal" and "Turn by 180 degrees" are hereinafter described.

Referring back to FIG. 24, the CPU 131 discriminates at step S2 whether or not the camera pivotal angle detected by the process at step S1 is outside the predetermined range.

In the present example, the state of the PDA 1 shown in FIG. 32 is referred to as a basic state of the PDA 1. In other words, the state of the PDA 1 wherein all of the LCD open/close switch 144, LCD pivotal switch 145 and camera pivotal switch 146 are off is determined a basic state. However, the basic state here is set for the convenience of facilitation of the following description, but otherwise, for example, such a state wherein the PDA 1 is normally utilized as shown in FIG. 29 may be determined a basic state.

More particularly, if the camera pivotal switch 146 is off (when the pivotal angle of the camera 22 is included within the range equal to or more than substantially 0 degree but less than substantially 160 degrees), the CPU 131 discriminates at step S2 that the camera pivotal angle is not outside the predetermined range, and starts a process at step S4 without performing a process at step S3.

For example, when a user 182 picks up an image of the user 182 him/herself as a subject as seen in FIG. 32, the camera 22 scans in the standard direction, that is, in a direction from the head to the feet of the user 182 in FIG. 32, to pick up an image of the user 182. Therefore, even if a special process is not performed for the image thus picked up, the image is displayed normally on the LCD unit 28 by a process at step S7 hereinafter described. Accordingly, in such an instance as just described, the CPU 131 recognizes that there is no necessity to reverse the image and does not execute a reversing process for the image.

On the other hand, if the camera pivotal switch 146 is an off state (when the pivotal angle of the camera 22 is equal to or more than substantially 160 degrees but less than substantially 270 degrees), then the CPU 131 discriminates at step S2 that the camera pivotal angle is outside the predetermined range, and reverses the image in the vertical direction at step S3.

For example, when the user 182 picks up an image of another person 181 as seen in FIG. 33, since the camera 22 is placed such that it is reversed in a substantially vertical direction with respect to the position of FIG. 32, if the camera 22 scans in the standard direction as described above, then it scans in the direction from the feet to the head of another person 181 in FIG. 33 to fetch an image of another person 181. Accordingly, if no process is performed particularly for the image of another person 181 fetched in this manner, then though not shown, the image of another person 181 wherein the head of another person 181 is directed downwardly and the feet are directed upwardly is displayed on the LCD unit 28 by a process at step S7 described hereinbelow. Therefore, in such an instance, the CPU 131 reverses the image in the vertical direction.

More particularly, if the camera pivotal switch 146 changes over from an off state to an on state at step S2, then the CPU 131 detects this, and issues at step S3, an instruction to the digital signal processor 163 of the camera 22 to reverse the image in the vertical direction.

Figure 39:
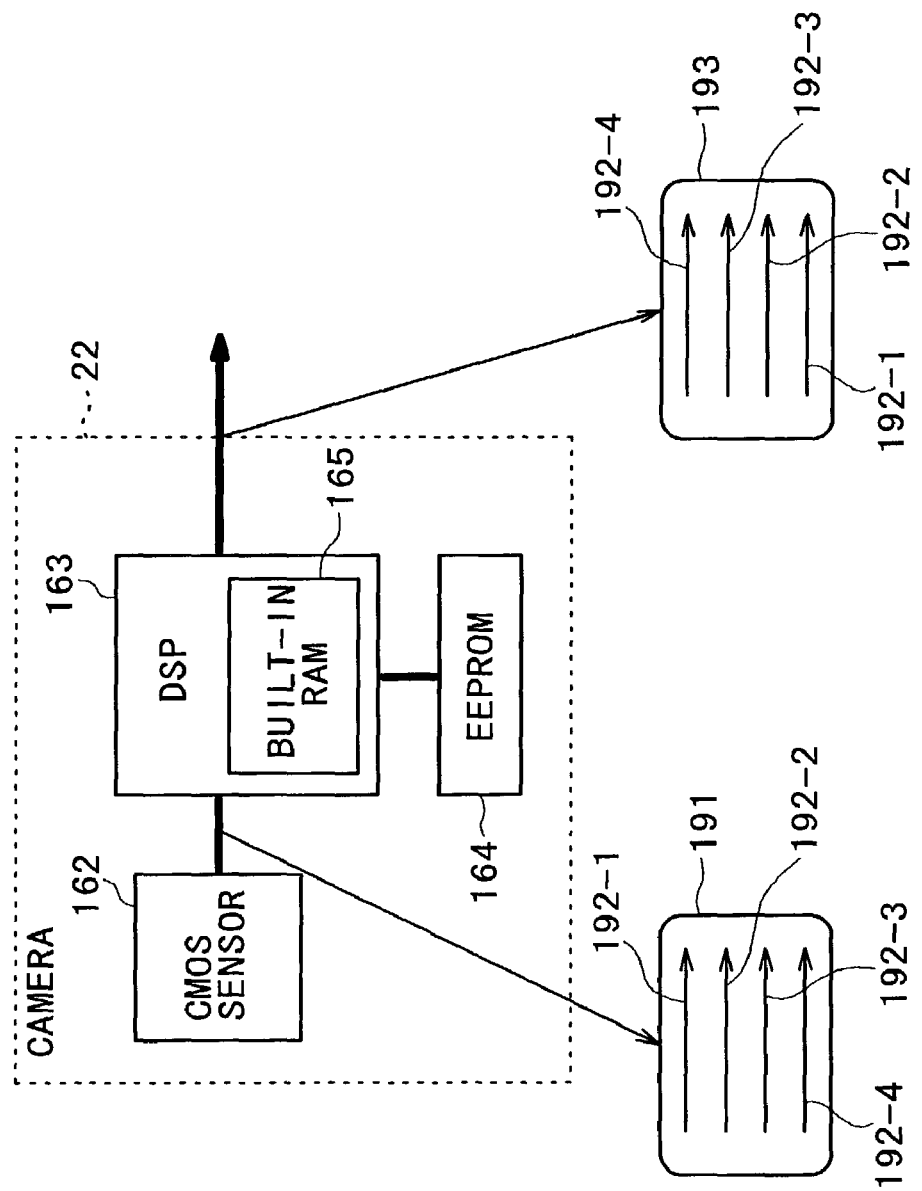
FIG. 39 is a schematic diagrammatic view illustrating a process when an image picked up by the camera of the PDA of FIG. 1 is reversed in the vertical direction.

In this instance, the CMOS sensor 162 successively scans from the left top to the right bottom in FIG. 39 to fetch the image 191 and supplies the image 191 to the digital signal processor 163.

The digital signal processor 163 successively stores image data supplied thereto in the order as scanned into the built-in RAM 165. More particularly, the digital signal processor 163 successively stores scanning lines 192-1 to 192-4 in this order into the built-in RAM 165. If an ordinary readout instruction is received from the CPU 131, then the digital signal processor 163 successively reads out the scanning lines 192-1 to 192-4 in this order from the left top to the right bottom from the built-in RAM 165.

On the other hand, if a readout instruction for vertical reversal (an instruction to reverse an image in the vertical direction) is received, then the digital signal processor 163 reads out the image data in the order of the scanning lines 192-4, 192-3, 192-2 and 192-1 from the left bottom to the right top from the built-in RAM 165 and successively supplies the image data to the display control section 136.

The display control section 136 stores the scanning lines 192-4 to 192-1 supplied in this order as an image 193 into the VRAM 138. Then, by a process at step S7 hereinafter described, the display control section 136 reads out the image 193 in the standard order from the VRAM 138 under the control of the CPU 131 so that the image 193 is displayed on the LCD unit 28. Consequently, the image 193 reversed vertically with respect to the fetched image 191 is displayed on the LCD unit 28.

In this manner, for example, where the PDA 1 is in such a state as seen in FIG. 33 (when an image of another person 181 is to be picked up), since the image is reversed in the vertical direction by the processes at steps S2 and S3, the upward direction of the image displayed by a process at step S7 hereinafter described substantially coincides with the actual upward direction (upward direction of the user 182 who observes the LCD unit 28) as seen in FIG. 33.

Referring back to FIG. 24, the CPU 131 discriminates at step S4 whether or not the LCD pivotal angle detected by the process at step S1 is outside the predetermined range.

More particularly, when the LCD pivotal switch 145 is in an off state (when the LCD pivotal angle is equal to or more than substantially 0 degree but less than 180 degrees), the CPU 131 discriminates at step S4 that the LCD pivotal angle is not outside the predetermined range, and starts a process at step S6 without executing the process at step S5.

For example, when the PDA 1 is in such a state as seen in FIG. 32, the picked up image of the user 182 is displayed normally on the LCD unit 28 by a process at step S7 hereinafter described even if a special process is not performed for the image. Accordingly, in such an instance, the CPU 131 recognizes that there is no necessity to reverse the image and does not execute a reversal process for the image.

On the other hand, if the LCD pivotal switch 145 is in an on state (when the pivotal angle of the display section 11 is substantially 180 degrees), then the CPU 131 discriminates at step S4 that the LCD pivotal angle is outside the predetermined range, and reverses the image in the vertical and horizontal directions at step S5. In other words, the CPU 131 turns the image by substantially 180 degrees with respect to the face 11-1 of the display section 11.

For example, if the user changes the use state of the PDA 1 from the state illustrated in FIG. 32 to the state illustrated in FIG. 31 (when the use state of the PDA 1 is changed from the state illustrated in FIG. 32 to the state shown in FIG. 8 (FIG. 31) past the states illustrates in FIGS. 6 and 7), and if no process is performed, then though not shown, the image wherein the head of the user 182 is directed downwardly and the feet of the user 182 are directed upwardly in FIG. 31 is displayed on the LCD unit 28 by a process at step S7 hereinafter described. Therefore, in such an instance, the CPU 131 reverses the image in the vertical and horizontal directions.

Figure 40:
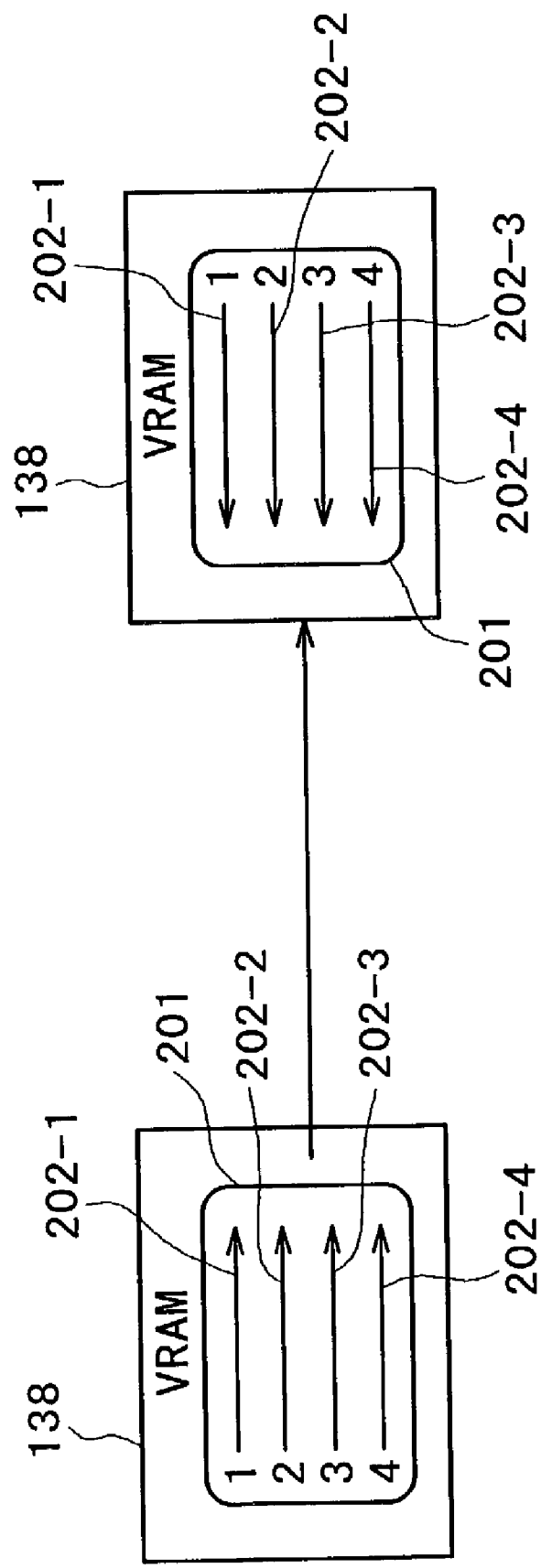
FIG. 40 is a schematic view illustrating a process when an image picked up by the camera of the PDA of FIG. 1 is reversed in the vertical and horizontal directions.

More particularly, if the LCD pivotal switch 145 changes over from an off state to an on state, then the CPU 131 detects this at step S4, and issues at step S5, an instruction to the display control section 136 to read out data of a region 201 stored in the VRAM 138 in the opposite direction (from the right bottom to the left top) to the standard readout direction (from the left top to the right bottom) as seen in FIG. 40.

Consequently, by a process at step S7 hereinafter described, the VRAM 138 reads out the data of the region 201 in the order in accordance with an instruction from the CPU 131 (the order opposite to the standard direction) from the VRAM 138 under the control of the CPU 131. In particular, the VRAM 138 starts readout of the data of the region 201 beginning with pixel data at the right end of the scanning line 202-4 in FIG. 40 and reads out the scanning line 202-4 in the leftward direction from the right in FIG. 40, whereafter it successively reads out the scanning lines 202-3, 202-2 and 202-1 from the right to the left in FIG. 40 in order to display them on the LCD unit 28. Consequently, the image reversed in the vertical and horizontal directions with respect to the fetched image 191 (FIG. 39) is displayed on the LCD unit 28.

In this manner, for example, where the PDA 1 is in such a state as seen in FIG. 31, the image is reversed in the vertical and horizontal directions by the processes at steps S4 and S5, and consequently, the upward direction of the image displayed by a process at step S7 hereinafter described substantially coincides with the actual upper direction as seen in FIG. 31.

It is to be noted that, when it is discriminated whether or not an image should be reversed in the vertical and horizontal directions (when the process at step S4 is executed), only the LCD pivotal angle is referred to as described above, but the LCD open/closed state is not referred to.

Figure 38:
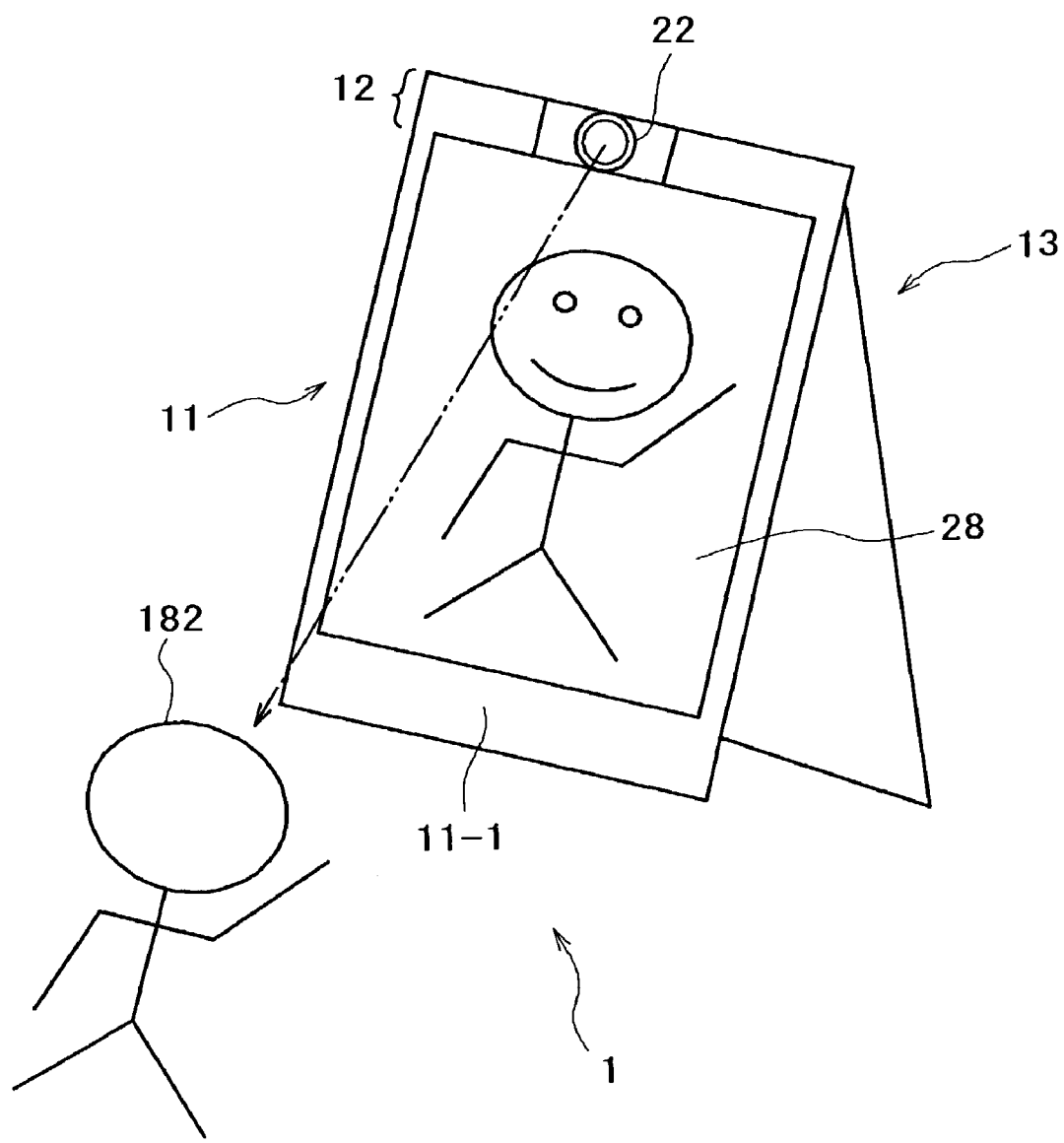

In particular, as described hereinabove, if the user changes the state of the PDA 1 from the state shown in FIG. 6 to the state of FIG. 8 through the state of FIG. 7, then the image (character "F") is reversed in the vertical and horizontal directions not finally when the state of FIG. 8 is reached but when the state of FIG. 7 (the state wherein the display section 11 is not in a closed state although the display section 11 has been pivoted substantially by 180 degrees in a horizontal direction in FIG. 7) is reached. Consequently, for example, when the user 182 picks up an image of the user 182 him/herself while the PDA 1 is not held by the user 182 but is placed leaning as seen in FIG. 38, an image displayed normally can be monitored on the LCD unit 28.

It is to be noted that, where the state of use of the PDA 1 is such as illustrated in FIG. 29 or 30, the image is reversed in the vertical direction by the processes at steps S2 and S3, and is further reversed in the vertical and horizontal directions by the processes at steps S4 and S5.

Figure 41:
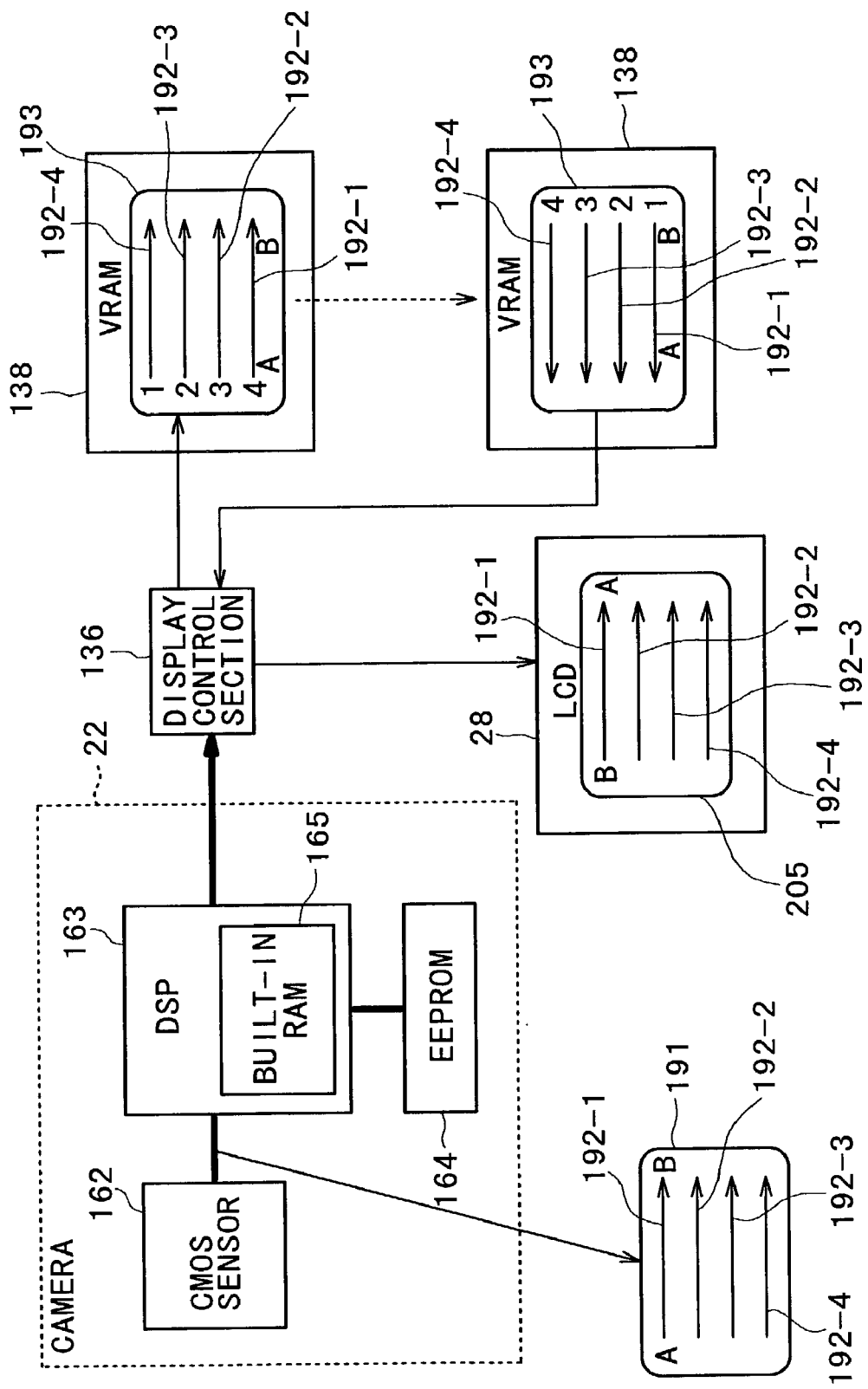
FIG. 41 is a schematic view illustrating a process when an image picked up by the camera of the PDA of FIG. 1 is first reversed in the vertical direction and then reversed in the vertical and horizontal directions.

In particular, it is assumed that, for example, the digital signal processor 163 has stored an image 191, similar to that of FIG. 39 fetched by the CMOS sensor 162, into the built-in RAM 165 as seen in FIG. 41. It is to be noted that reference character A in FIG. 41 denotes image data at the left end of the scanning line 192-1, that is, pixel data fetched first by the CMOS sensor 162, and B denotes image data at the right end of the scanning line 192-1, that is, pixel data fetched last in the scanning line 192-1 by the CMOS sensor 162.

In this instance, where the state of use of the PDA 1 is such as illustrated in FIG. 29 or 30, it is discriminated by the process at step S2 that the camera pivotal angle is outside the predetermined range. Then, by the process at step S3, the digital signal processor 163 reads out the image data in the order of the scanning lines 192-4, 192-3, 192-2 and 192-1 in the direction from the left bottom to the right top from the built-in RAM 165, and successively supplies the image data to the display control section 136. The display control section 136 stores the scanning lines 192-4 to 192-1, supplied in such an order as described above as an image 193, into the VRAM 138.

Then, it is discriminated by the process at step S4 that the LCD pivotal angle is outside the predetermined range, and then by the process at step S5, the CPU 131 issues an instruction to the display control section 136 to read out the data of the image 193 stored in the VRAM 138 in the opposite direction (from the right bottom to the left top) to the standard readout direction (from the left top to the right bottom).

Then, it is discriminated by the process at step S6 that the image should be displayed, and then by a process at step S7 which is hereinafter described, the VRAM 138 reads out the image 193 in the order designated by the instruction from the CPU 131 (the order opposite to the standard order) from the VRAM 138. In particular, the display control section 136 starts readout beginning with pixel data (the pixel data of "B") at the right end in FIG. 41 of the scanning line 192-1 and reads out the scanning line 192-1 in the direction from the right to the left in FIG. 41. Whereafter, the display control section 136 successively reads out the scanning lines 192-2, 192-3 and 192-4 in the direction from the right to the left in FIG. 41 so that they are displayed on the LCD unit 28. After all, an image 205, which is not reversed in the vertical direction but is reversed only in the horizontal direction with respect to the fetched image 191, that is, an image on which the pixel data of "B" is disposed at the left upper corner, is displayed on the LCD unit 28.

Accordingly, the upward direction of the image of another person 181 displayed by a process at step S7 hereinafter described substantially coincides with the actual upward direction as seen in FIG. 29 or 30.

Referring back to FIG. 24, the CPU 131 discriminates at step S6 whether or not the image should be displayed.

More particularly, if the LCD open/close switch 144 is in an on state and the LCD pivotal switch 145 is in an off state, that is, if the PDA 1 is in a state illustrated in FIG. 34 or 35, since the face 11-1 of the display section 11 is not exposed to the user, then the CPU 131 discriminates at step S6 that the image should not be displayed. Then at step S11, the CPU 131 issues an instruction to the display control section 136 not to display the image. Then at step S10, the CPU 131 discriminates whether or not the camera function is canceled. If it is discriminated that the camera function is canceled, then the CPU 131 ends its processing. However, if it is discriminated that the camera function is not canceled, then the processing returns to step S1 so that the processes at the steps beginning with step S1 are repeated.

On the other hand, if the PDA 1 is in a state any other than the states illustrated in FIGS. 34 and 35, that is, if the face 11-1 of the display section 11 is exposed to the outside, then the CPU 131 discriminates at step S6 that the image should be displayed. Then, at step S7, the CPU 131 controls the display control section 136 to display the image picked up by the camera 22 (when necessary, the image reversed by the process at step S3 or step S5) on the LCD unit 28.

More particularly, the display control section 136 stores the image picked up by the camera 22 into the VRAM 138, and if a displaying instruction is issued from the CPU 131, then the display control section 136 reads out the image stored in the VRAM 138 so that the image is displayed on the LCD unit 28.

At step S8, the CPU 131 discriminates whether or not the shutter button (capture button 23) is depressed. If it is discriminated whether or not the shutter button is not depressed, then the CPU 131 discriminates at step S10 whether or not the camera function is canceled, whereafter the processes at the steps beginning with step S10 are repeated. In particular, the CPU 131 controls the LCD unit 28 to normally display the image picked up by the camera 22 (when necessary, the image reversed by the process at step S3 or step S5) until after the camera function is canceled. However, where the PDA 1 is in such a state as shown in FIG. 34 or 35, no image is displayed on the LCD unit 28 as described hereinabove.

Now, it is assumed that the user depresses the capture button 23 of FIG. 1. At this time, the CPU 131 acquires, at step S8, information representing that the capture button 23 (inputting section 137) is depressed, through the input/output interface 135 and the bus 134 and discriminates based on the acquired information that the shutter button is depressed. Then at step S9, the CPU 131 stores the image picked up by the camera 22 (the original image as fetched by the CMOS sensor 162) into a predetermined region of the RAM 133 or the like, and then at step S10, the CPU 131 discriminates whether or not the camera function is canceled, whereafter the processes at the steps beginning with step S10 are repeated.

In this manner, in whichever state the PDA 1 is, the CPU 131 can make the upward direction of an image, to be displayed on the LCD unit 28, normally coincide substantially with the actual upper direction by combining the processes at steps S2 and S3 with the processes at steps S4 and S5.

It is to be noted that, while in the example described above, the processes at steps S2 and S3, the processes at steps S4 and S5 and the process at step S6 are executed in this order, the order of the processes is not limited to the specific order, but the CPU 131 may execute the processes in an arbitrary order. Further, the CPU 131 may execute the processes independently of and in parallel to each other, or may execute the processes at a time as a single process. For example, if the Table 1 described hereinabove is recorded in advance in the ROM 132 or the like, then the CPU 131 can refer to the Table 1 to discriminate at the same time whether or not the image should be reversed in the vertical direction, whether or not the image should be reversed in the vertical and horizontal directions and whether or not the image should be displayed.

It is to be noted that, in the Table 1, "◯" appearing in the item of "Display" signifies that an image is displayed on the LCD unit 28, and "X" signifies that an image is not displayed on the LCD unit 28. Similarly, "◯" appearing in the item of "Reversal" signifies that an image is reversed in the vertical direction, and "X" signifies that an image is not reversed. Further, "◯" appearing in the item of "Pivotal motion by 180 degrees" signifies that an image is reversed in the vertical and horizontal directions, and "X" signifies that an image is not reversed.

Further, while in the present example, the LCD open/close switch 144, LCD pivotal switch 145 and camera pivotal switch 146 are used for detection of the LCD open/closed state, LCD pivotal angle and camera pivotal angle, respectively, the means for such detection are not limited to them, but any means which is incorporated in the PDA 1 and can detect the open/closed state and pivotal state of the display section 11 and the pivotal state of the camera 22 may be used. Further, for detection of the angles here, actual absolute or relative angles may be detected, or alternatively, predetermined angular positions may be detected.

Further, the direction and the range of pivotal motion of the PDA 1 and the direction and the range of pivotal motion of the camera 22 are not limited to those of the embodiment described hereinabove, but may be arbitrary.

Further, while in the present example, if the LCD pivotal switch 145 is in an on state, then the CPU 131 reverses the image in the vertical and horizontal directions, the image may otherwise be reversed only in the vertical direction. Similarly, while, when the camera pivotal switch 146 is in an on state, the CPU 131 reverses the image in the vertical direction, the image may otherwise be reversed in the vertical and horizontal directions. Furthermore, when necessary, the CPU 131 may suitably set an arbitrary angle by which the image should be turned, or may reverse the image in the horizontal direction.

Figure 42:
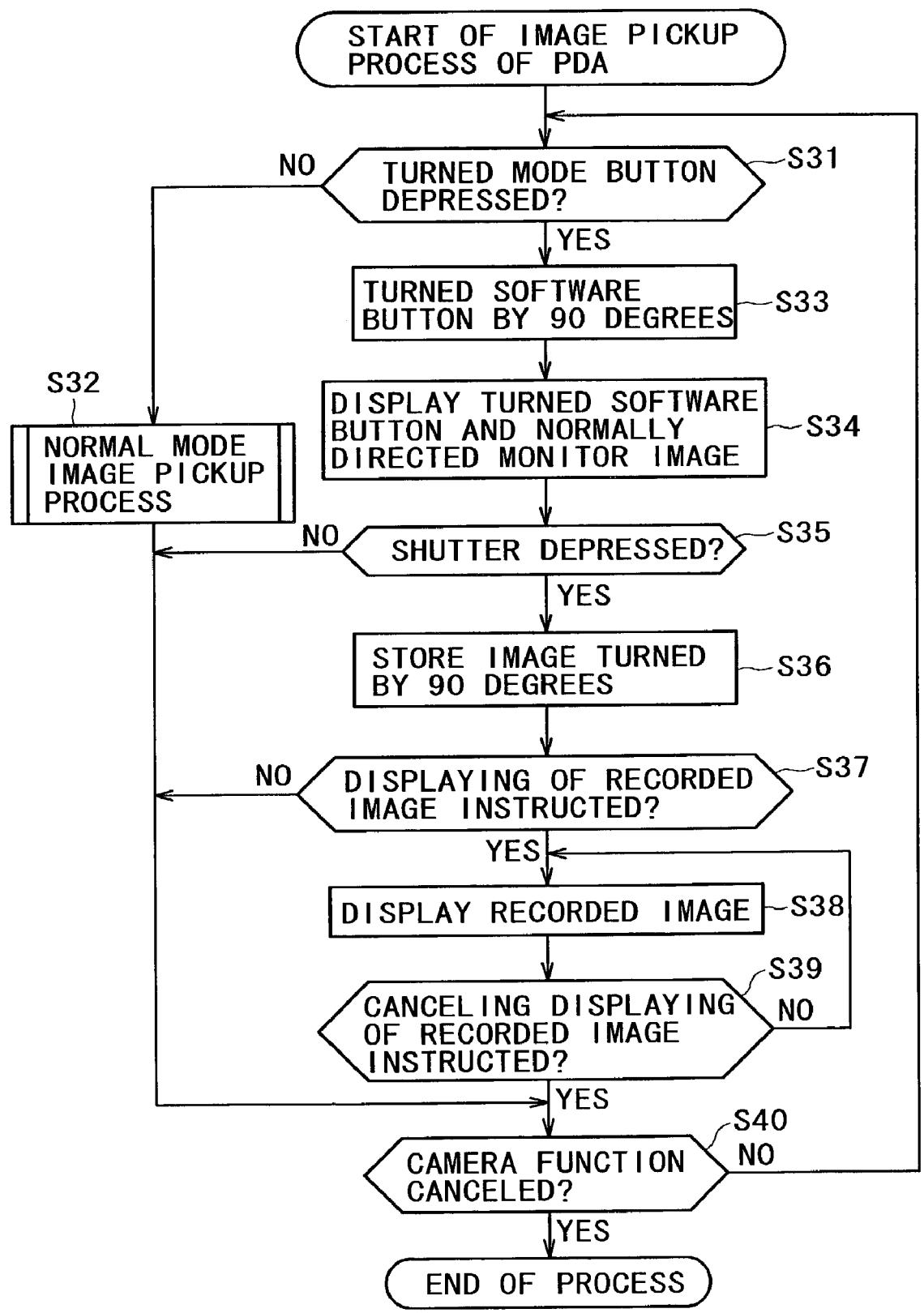
FIG. 42 is a flow chart illustrating a different example of the image pickup process of the PDA of FIG. 1.

Subsequently, another example of the image pickup process corresponding to the camera function from among the various functions of the PDA 1 of FIG. 1 is described with reference to a flow chart of FIG. 42.

Figure 43:
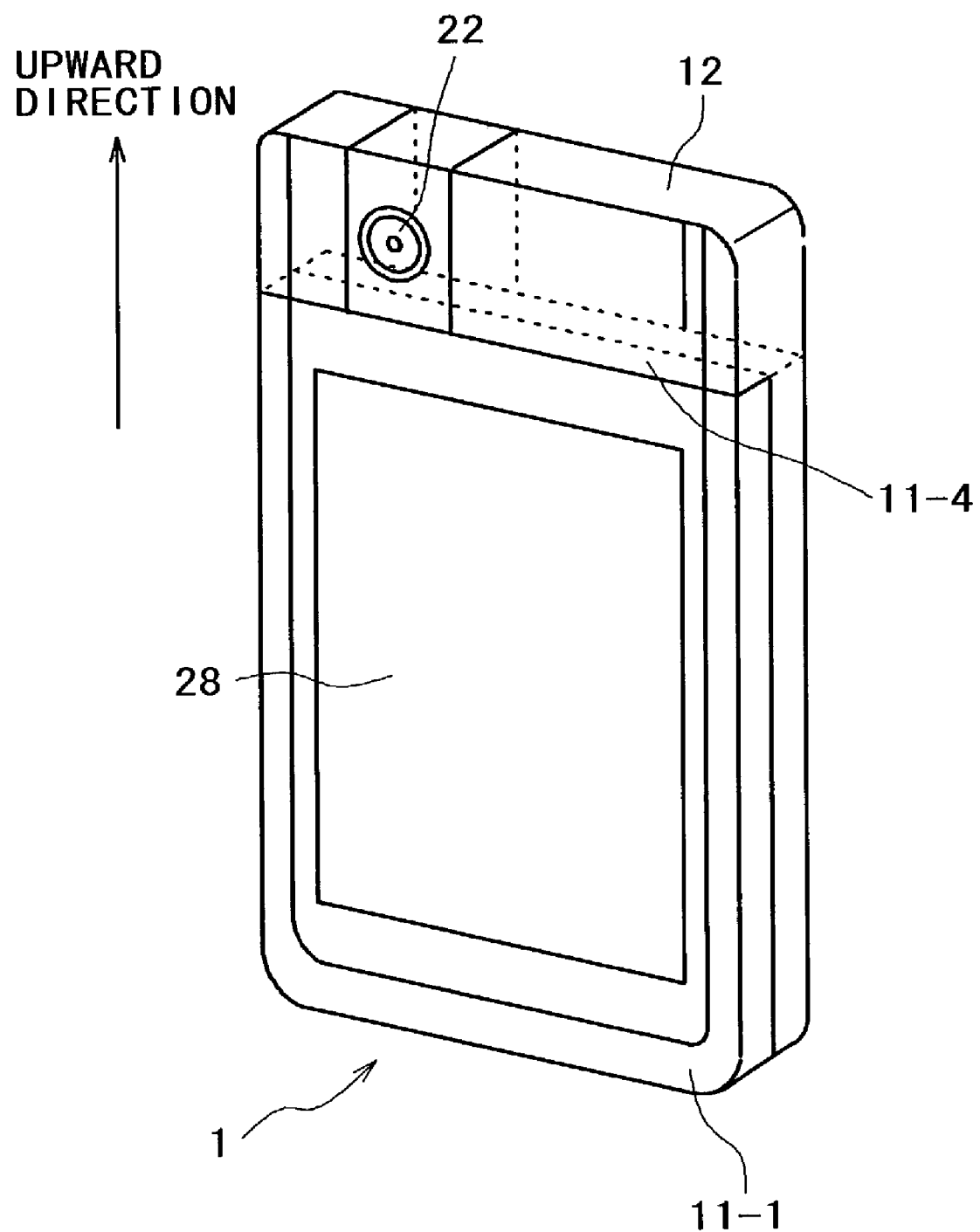
FIG. 43 is a perspective view showing an example of a configuration of the front of the PDA of FIG. 1 when the PDA is placed in a standard position.

It is assumed that, in the present example, the position at which the camera 22 is placed on the upper side as seen in FIG. 43 is defined as the standard use position.

Figure 44:
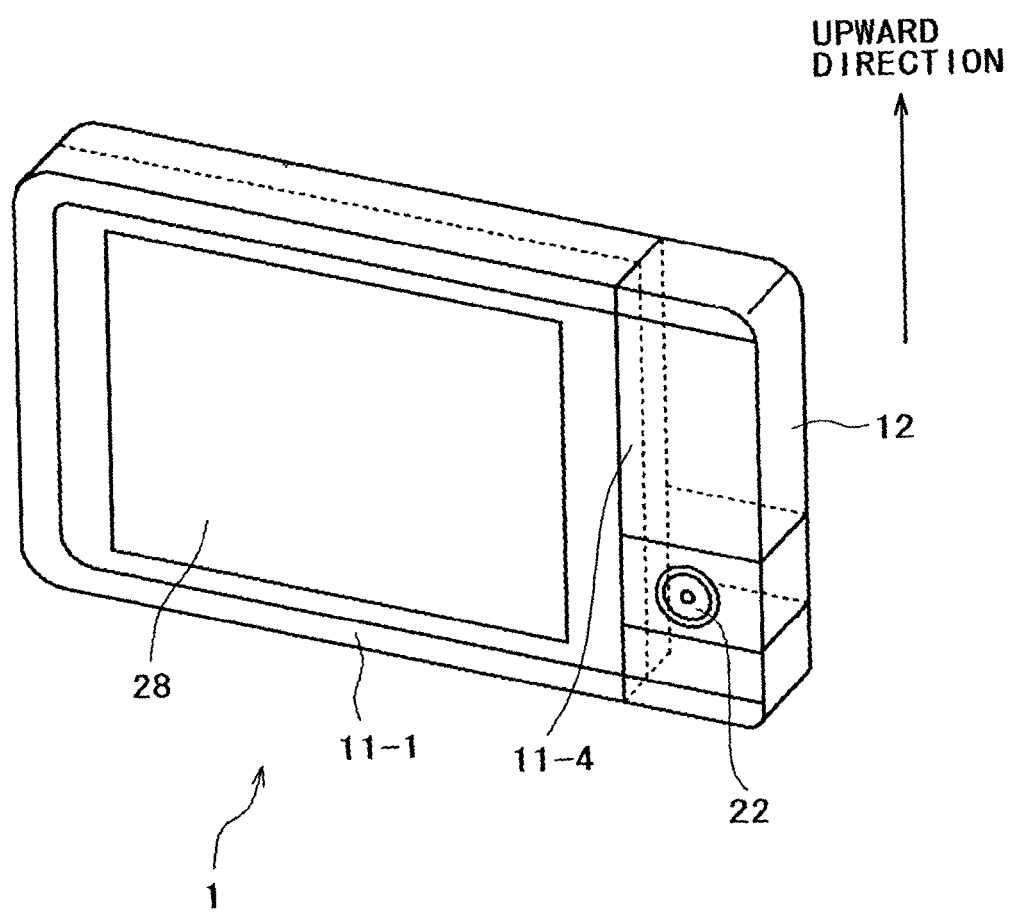
FIG. 44 is a perspective view showing an example of a configuration of the front of the PDA of FIG. 1 when the PDA is disposed in a position turned by 90 degrees from the standard position.

Further, in the present example, the PDA 1 can be utilized not only in the standard use position but also in another state wherein, for example, it is pivoted by substantially 90 degrees in parallel to the face 11-1 as seen in FIG. 44, that is, in a state wherein the camera 22 is disposed on the right or left side.

Figure 45:
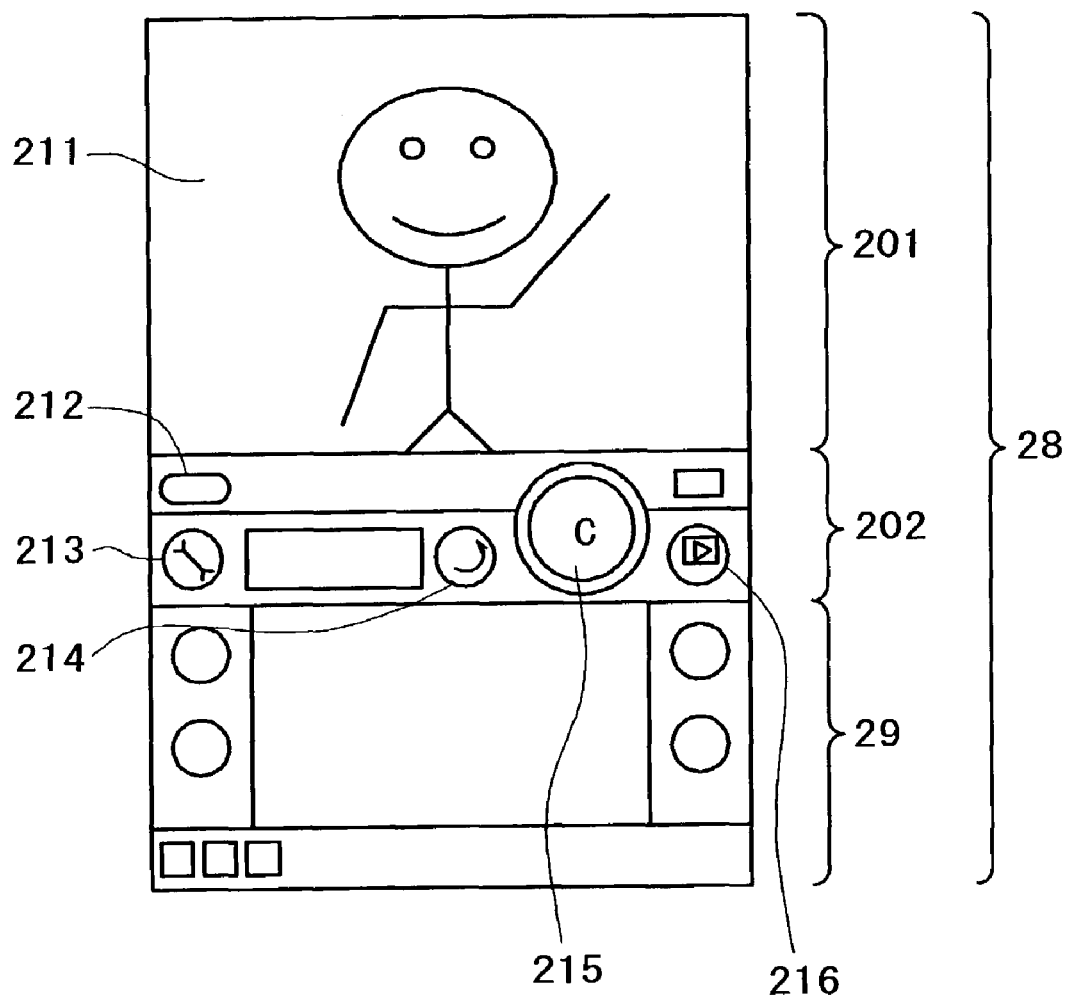
FIGS. 45 to 47 are schematic views illustrating different examples of an image displayed on the LCD section of the PDA of FIG. 1.

When the user uses the PDA 1 not in the standard use position shown in FIG. 43 but in the state wherein it is turned by substantially 90 degrees parallel to the face 11-1 as shown in FIG. 44 (such a state as seen in FIG. 44 is hereinafter referred to as 90-degree turned position), in order to input an instruction of this, in the present example, a software button 212 shown in FIG. 45 is depressed. In response to the depression of the software button 212, the PDA 1 enters a mode in which it is used at the position pivoted by 90 degrees (hereinafter referred to as turned mode) from a mode in which it is used at the standard use position (hereinafter referred to as normal mode).

Since the software button 212 is a button for changing over the mode from the normal mode to the turned mode in this manner, it is hereinafter referred as turned mode button.

It is to be noted that the standard use position is not limited to the specific position in the present example, but a manufacturer or the like may define an arbitrary state of the PDA 1 as a standard use position when the PDA 1 is manufactured.

If it is assumed now that, for example, the user depresses the capture button 23 of FIG. 1 while the power supply to the PDA 1 is on, then the CPU 131 starts up the application software for achieving the camera function recorded in the ROM 132 to start image pickup by the camera 22. An image pickup process is started thereby.

It is assumed that, at this time, for example, such an image as shown in FIG. 45 is displayed on the LCD unit 28. In particular, in the example shown in FIG. 45, an image 211 picked up by the camera 22 is displayed in a region 201, and several software buttons 212 to 216 necessary for executing an image pickup process are displayed in another region 202 below the region 201 while various images are displayed in an image input area 29 below the region 202. It is to be noted, however, that in FIG. 45, the upward directions of the images displayed in the regions 201 and 202 and the character input area 29 are the upward direction in the standard position (the hinge section 12 side of the LCD unit 28).

Further, from among images picked up by the camera 22, that image picked up at the point of time of the image pickup then is hereinafter referred to as monitor image. An image stored into a memory (the RAM 133 or the like) in response to depression of the shutter button by a process at step S36 hereinafter described is hereinafter referred to as recorded image. In particular, the image 211 displayed in the region 201 in FIG. 45 is a monitor image.

Referring back to FIG. 42, the CPU 131 discriminates at step S31 whether or not the turned mode button 212 is depressed. If it is discriminated that the turned mode button 212 is not depressed, then the CPU 131 executes a normal mode image pickup process at step S32, whereafter it discriminates at step S40 whether or not the camera function is canceled. If it is discriminated that the camera function is canceled, then it ends the processing. On the other hand, if it is discriminated that the camera function is not canceled, then the processing returns to step S31, at which the CPU 131 discriminates again whether or not the turned mode button 212 is depressed, whereafter it repeats the processing at the steps following the step S31.

It is to be noted that, in the present example, a process corresponding to the processes at steps S1 to S9 of the flow chart of FIG. 24 described above is hereinafter referred to as "normal mode image pickup process", and it is assumed that, in the "normal mode image pickup process", the user will place (hold) the PDA 1 at the normal use position to utilize the PDA 1.

Figure 46:
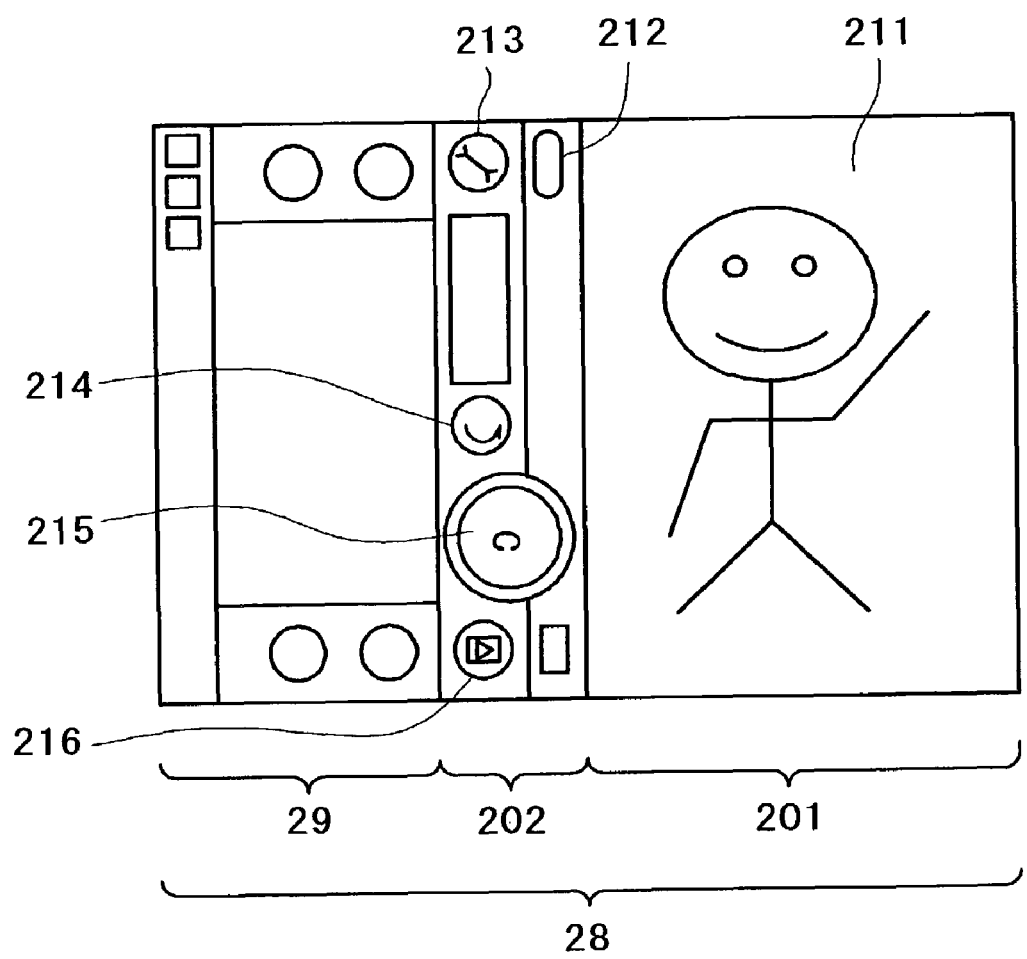

Now, it is assumed that the user places the PDA 1 at the 90-degree turned position as seen in FIG. 44. In this instance, such an image as seen in FIG. 46 is displayed on the LCD unit 28 similarly as in the "normal mode image pickup process". At this time, as seen in FIG. 46, the upward direction of the monitor image 221 picked up by the camera 22 coincides with the actual upward direction, but the upward direction of each of the software buttons 212 to 216 is the actual horizontally rightward direction.

Thus, the user will depress the turned mode button 212 which is operated when the PDA 1 is to be utilized at the 90-degree turned position.

Referring back to FIG. 42, in this instance, the CPU 131 detects at step S31 that the turned mode button 212 is depressed, that is, the CPU 131 discriminates that the turned mode button 212 is depressed. Then at step S33, the CPU 131 turns the software buttons 212 to 216 by substantially 90 degrees in parallel to the face 11-1.

At step S34, the CPU 131 controls the display control section 136 to display the software buttons 212 to 216 turned by the process at step S33 and the monitor image in the normal direction on the LCD unit 28.

Figure 47:
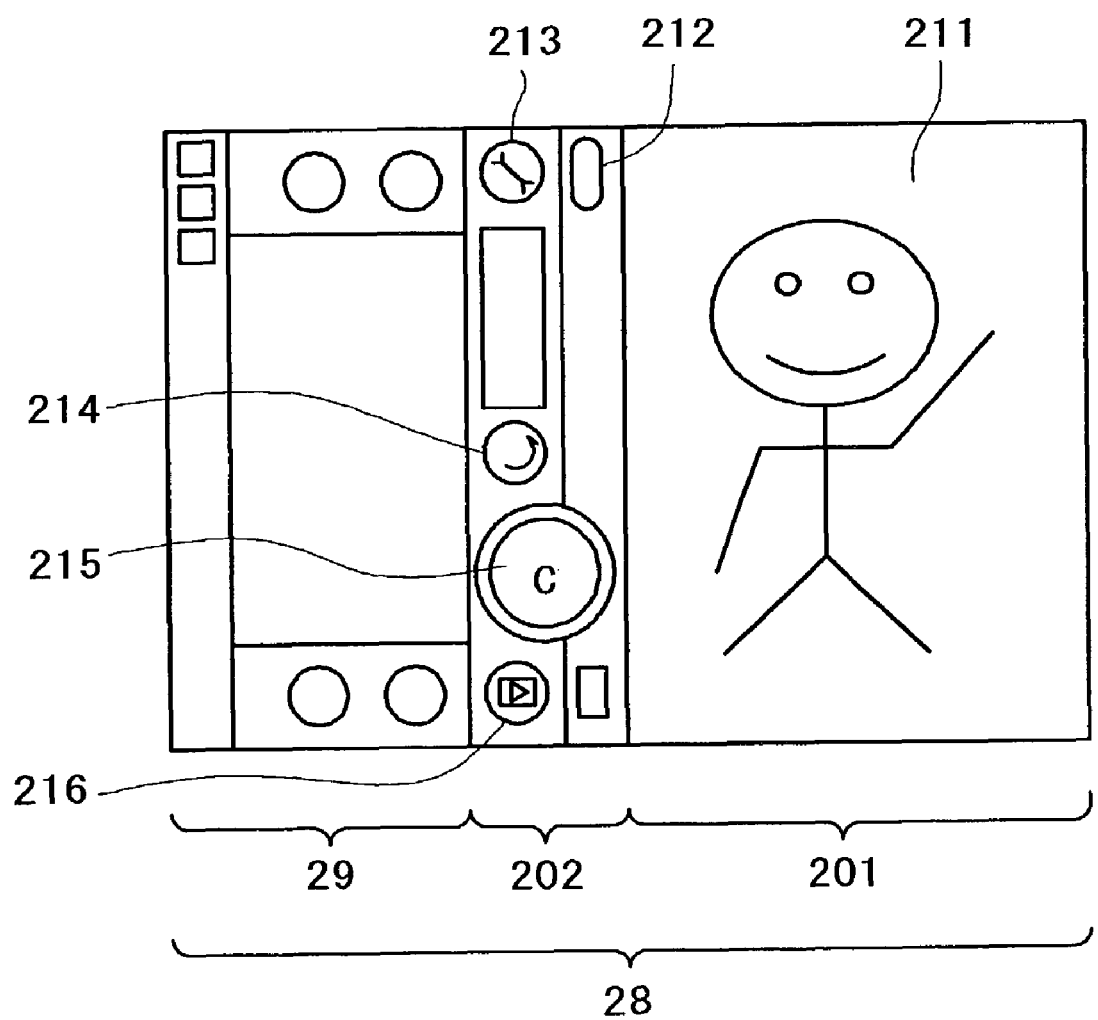
Figure 49:
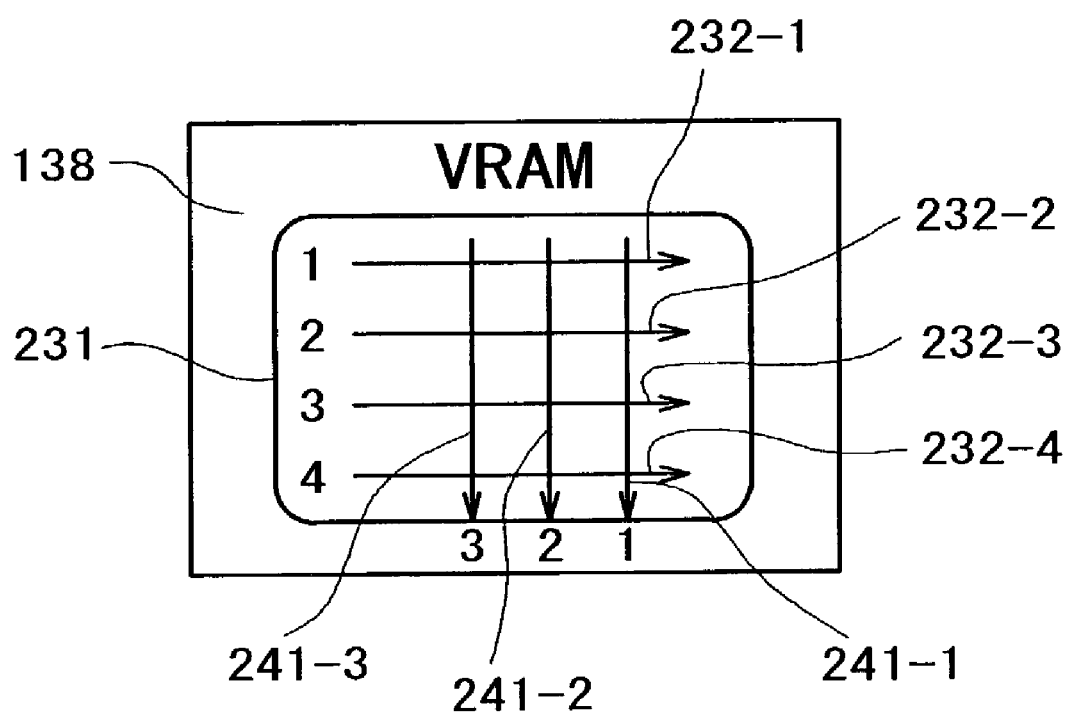

Consequently, such an image as shown in FIG. 47 is displayed. At this time, the upward directions not only of the monitor image 221 but also of the software buttons 212 to 216 coincide with the actual upward direction as seen in FIG. 47.

Referring back to FIG. 42, the CPU 131 discriminates at step S35 whether or not the shutter button (capture button 23 or the software button 215 indicated as "C" in FIG. 47) is depressed. If the shutter button is not depressed, then the CPU 131 discriminates at step S40 whether or not the camera function is canceled. If the camera function is not canceled, then the processing returns to step S31 so that the CPU 131 executes the processes at the steps beginning with step S31. In other words, the CPU 131 controls the LCD unit 28 to normally display a monitor image or a recorded image hereinafter described until after the camera function is canceled.

It is assumed now that the user depresses the capture button 23 of FIG. 1 or the software button 215. At this time, the CPU 131 discriminates at step S35 that the shutter button is depressed, and then turns, at step S36, the image picked up by the camera 22 at the point of time (that is, the image 211 displayed on the LCD unit 28) by substantially 90 degrees and stores the turned image 211 into a predetermined region of the RAM 133 or the like.

More particularly, it is assumed now that, for example, data of such an image 231 as shown in FIG. 48 are stored in the VRAM 138. In other words, the image 231 is displayed as a monitor image on the LCD unit 28.

In this instance, the CPU 131 controls the display control section 136 to successively read out the data of the image 231 stored in the VRAM 138 in order as scanning lines 241-1 to 241-3 and stores the read out data, for example, into the RAM 133 through the bus 134. Alternatively, when necessary, the CPU 131 stores the read out data into the Memory Stick 143 through the bus 134, input/output interface 135 and slot 64.

Figure 50:
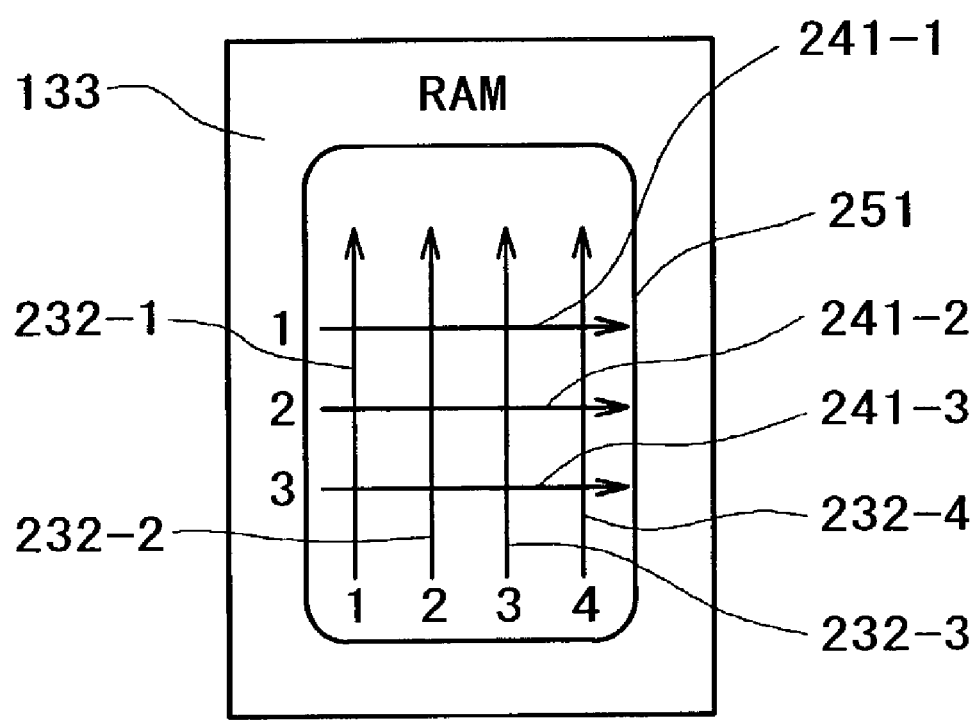

Thus, an image 251 turned substantially by 90 degrees with respect to the image 231 of FIG. 48 as shown in FIG. 50 is stored into the RAM 133 (further, when necessary, into the Memory Stick 143). If the ratio in size between the height and the width of the image 231 is, for example, 240:320, then the image 251 whose size ratio between the height and the width is 320:240 is stored as the recorded image.

Referring back to FIG. 42, the CPU 131 discriminates at step S37 whether or not an instruction to display a recorded image is issued. If it is discriminated that an instruction to display a recorded image is not issued, then the processing advances to step S40 so that the CPU 131 repeats the processes at the steps beginning with step S40.

On the other hand, if the CPU 131 discriminates at step S37 that an instruction to display a recorded image, then it controls, at step S38, the display control section 136 to display the recorded image, stored into the RAM 133 and so forth by the process at step S36, on the LCD unit 28.

More particularly, the CPU 131 successively reads out such data of the recorded image 251 as illustrated in FIG. 50 in order as scanning lines 241-1 to 241-3 and supplies the read out data to the display control section 136. The display control section 136 fetches the scanning lines 241-1 to 241-3 successively supplied thereto into the VRAM 138 and then reads out them from the VRAM 138 under the control of the CPU 131 so that they are displayed on the LCD unit 28.

At step S39, the CPU 131 discriminates whether or not an instruction to cancel the display of the recorded image is issued. If it is discriminated that an instruction to cancel the display of the recorded image is not issued, then the CPU 131 returns its processing to step S38 so that it repeats the processes at the steps beginning with step S38. In other words, the recorded image continues to be displayed on the LCD unit 28.

On the other hand, if it is discriminated at step S39 that an instruction to cancel the display of the recorded image is issued, then the processing advances to step S40 so that the CPU 131 repeats the processes at the steps beginning with step S40. In other words, the display of the recorded image is erased and a monitor image is displayed on the LCD unit 28.

In this manner, in the present example, when the user changes the position of the PDA 1 from the standard use position to the 90-degree turned position to use the PDA 1, it will depress the turned mode button 212. Consequently, information representing that the PDA 1 is in the 90-degree pivoted position, that is, information representing an instruction to place the mode of the PDA 1 into the turned mode, is inputted to the PDA 1, and a predetermined image (in the present example, the software buttons 212 to 216) is displayed in a state turned by substantially 90 degrees in parallel to the face 11-1 on the LCD unit 28. Consequently, the upward directions of the software buttons 212 to 216 coincide with the actual upward direction as described hereinabove.

Further, if the shutter button (capture button 23 of FIG. 1 or software button 215 of FIG. 45) is depressed, then the monitor image is turned by substantially 90 degrees and then stored as a recorded image into the RAM 133 or the like.

In this manner, the user can utilize the PDA 1 not only in the standard use position but also in the 90-degree turned position.

It is to be noted that, while, in the present example, the PDA 1 is positioned in the 90-degree turned position, it may otherwise be utilized in a different state wherein it is turned by an arbitrary angle in parallel to the face 11-1.

Further, while, in the example described above, the two positions including the standard use position and the 90-degree turned position are used as states in which the PDA 1 can be utilized, the PDA 1 may otherwise be utilized in a greater number of states.

It is to be noted, however, that, where two states (for example, the standard use position and the 90-degree turned position) are available, in order to allow the PDA 1 to recognize changeover between the two states, it is only necessary to utilize the turned mode button 212. However, where three or more states are available, inputting means different from the turned mode button 212 is required in order to allow the PDA 1 to recognize changeover among the different states. For example, the character input area 29 described hereinabove may be applied as such inputting means. In this instance, for example, the user can write a turning angle of the PDA 1 in the character input area 29 to input the turning angle. Alternatively, for example, a sensor for actually measuring the pivoted angle of the PDA 1 may be provided as the inputting means on the PDA 1.

Figure 51:
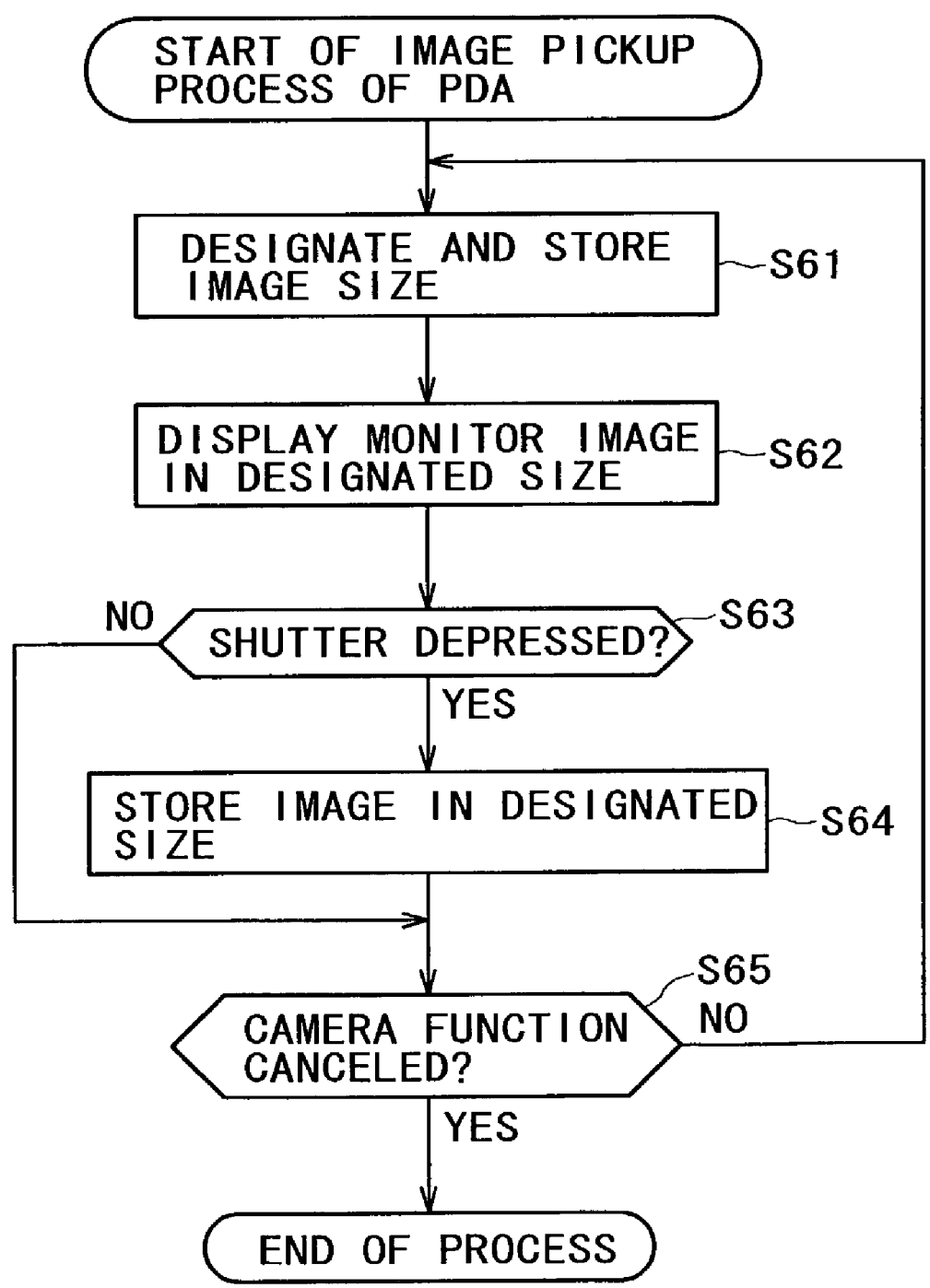
FIG. 51 is a flow chart illustrating a further example of the image pickup process of the PDA of FIG. 1.

Subsequently, a further example of the image pickup process corresponding to the camera function described hereinabove from among the various functions of the PDA 1 of FIG. 1 is described with reference to a flow chart of FIG. 51.

If it is assumed now that the user depresses the capture button 23 of FIG. 1 while the power supply to the PDA 1 is on, then the CPU 131 of FIG. 22 starts up the application software for achieving the camera function stored in the ROM 132 to start image pickup by the camera 22. Consequently, the image pickup process is started.

Figure 52:
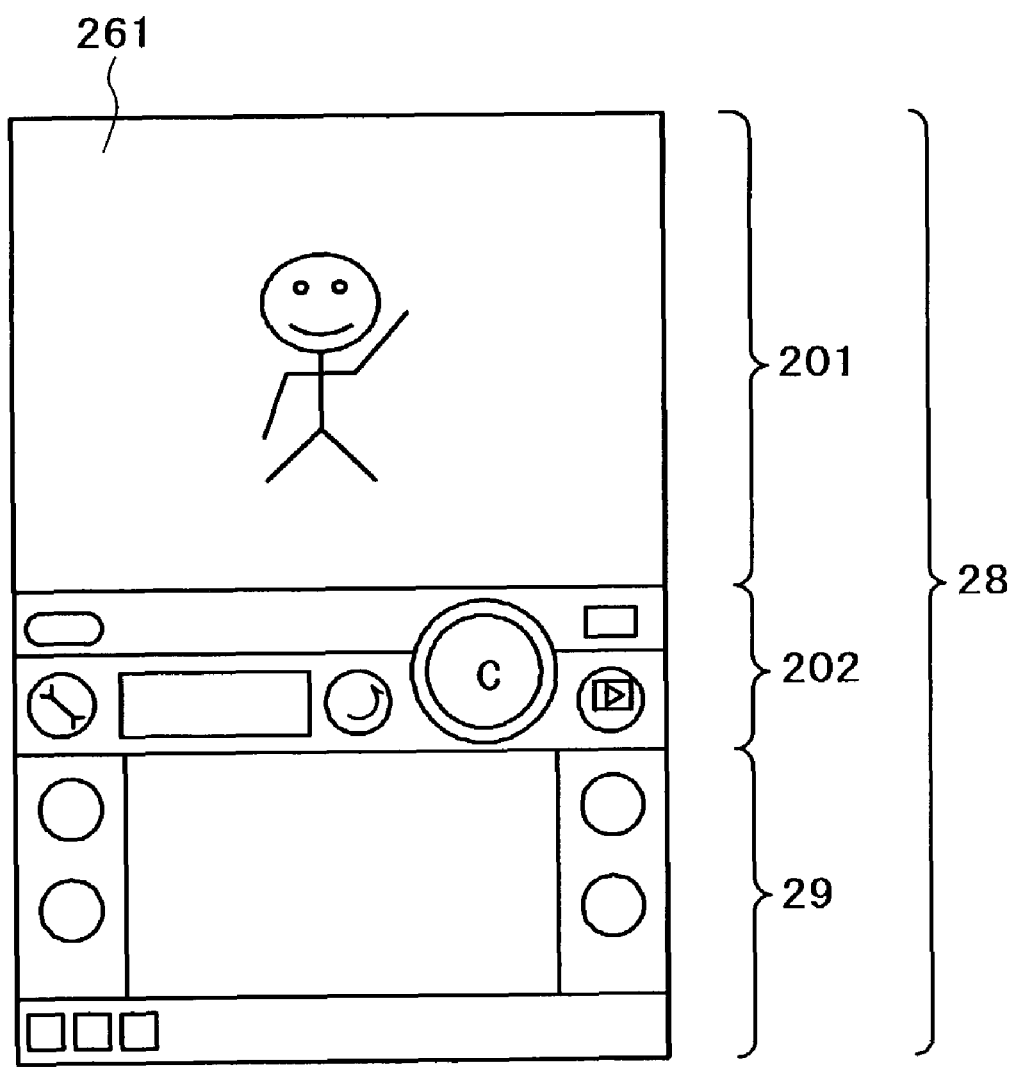
FIGS. 52 to 54 are schematic views showing different examples of an image displayed on the LCD section of the PDA of FIG. 1.

It is assumed that, at this time, for example such an image as shown in FIG. 52 is displayed on the LCD unit 28. In particular, a monitor image picked up by the camera 22 is displayed in a region 201, and various images described above are displayed in another region 202 below the region 201 and an image input area 29 below the region 202. It is to be noted, however, that in the example of FIG. 52, an image of 320×240 pixels corresponding to the image pickup range of the camera 22 is displayed in the region 201.

Referring back to FIG. 51, the CPU 131 designates, at step S61, a predetermined size as the size (size of a recorded image) to be used to store an image into the Memory Stick 143 by a process at step S64 which is hereinafter described and stores the predetermined size into a predetermined region of the Memory Stick 143 through the bus 134 and the slot 64.

It is assumed that, in the present example, a size is arbitrarily selected as the size for a recorded image from among one of three sizes of 320×240 pixels, 160×120 pixels and 88×88 pixels by the user, and the CPU 131 designates the selected size as a size to be used for later processing.

It is to be noted that the size for a recorded image is not limited to the specific examples mentioned hereinabove and is not limited particularly only if it corresponds to the image pickup range of the camera 22 (in the present example, 320× 240 pixels).

At step S62, the CPU 131 controls the display control section 136 to display the monitor image in the size stored into the Memory Stick 143 by the process at step S61 on the LCD unit 28.

For example, if the size of 320×240 pixels is designated, then the monitor image is displayed in a region 261 of a size equal to that of the region 201 (corresponding to 320×240 pixels) within the region 201 of the LCD unit 28 as shown in FIG. 52.

Figure 53:
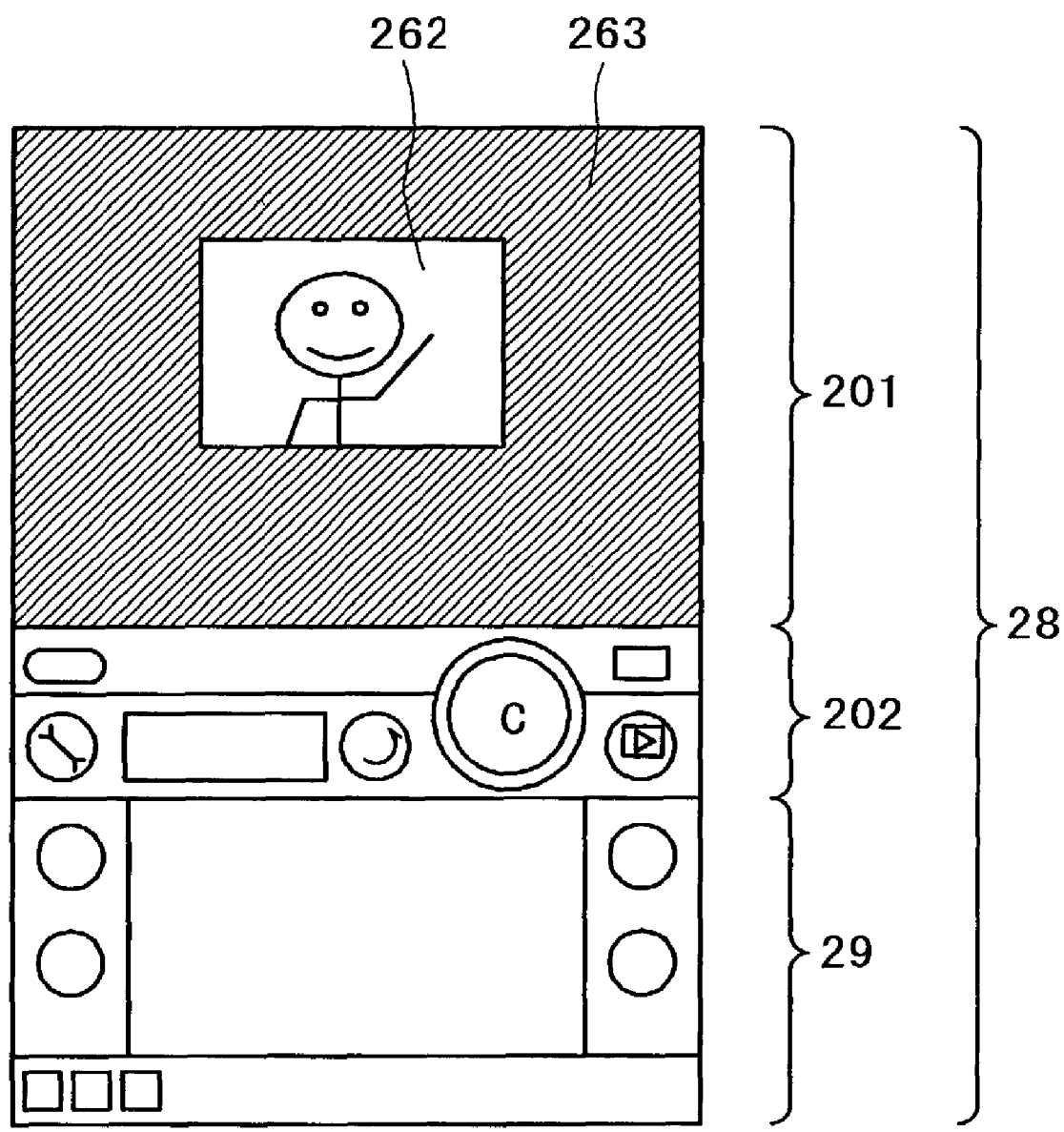

On the other hand, if the size of, for example, 160×120 pixels is designated, then the monitor image is displayed in a region 262 corresponding to 160×120 pixels at a substantially central portion of the region 201 of the LCD unit 28 as shown in FIG. 53 (only a portion of 160×120 pixels within the monitor screen of 320×240 pixels is displayed), and besides, in a surrounding region 263 except the region 262, an image representing that the portion within the range of the region 263 is not recorded as a recorded image (in the present example, a gray mask image having no design pattern) is displayed.

In other words, the CPU 131 controls the LCD unit 28 to display a monitor image picked up by the camera 22 within the range corresponding to the designated size of 160×120 pixels within the region 201 of 320×240 pixels which corresponds to the image pickup range of the camera 22, but inhibit the monitor image picked up by the camera 22 from being displayed in the surrounding region 263 except the region 262.

Figure 54:
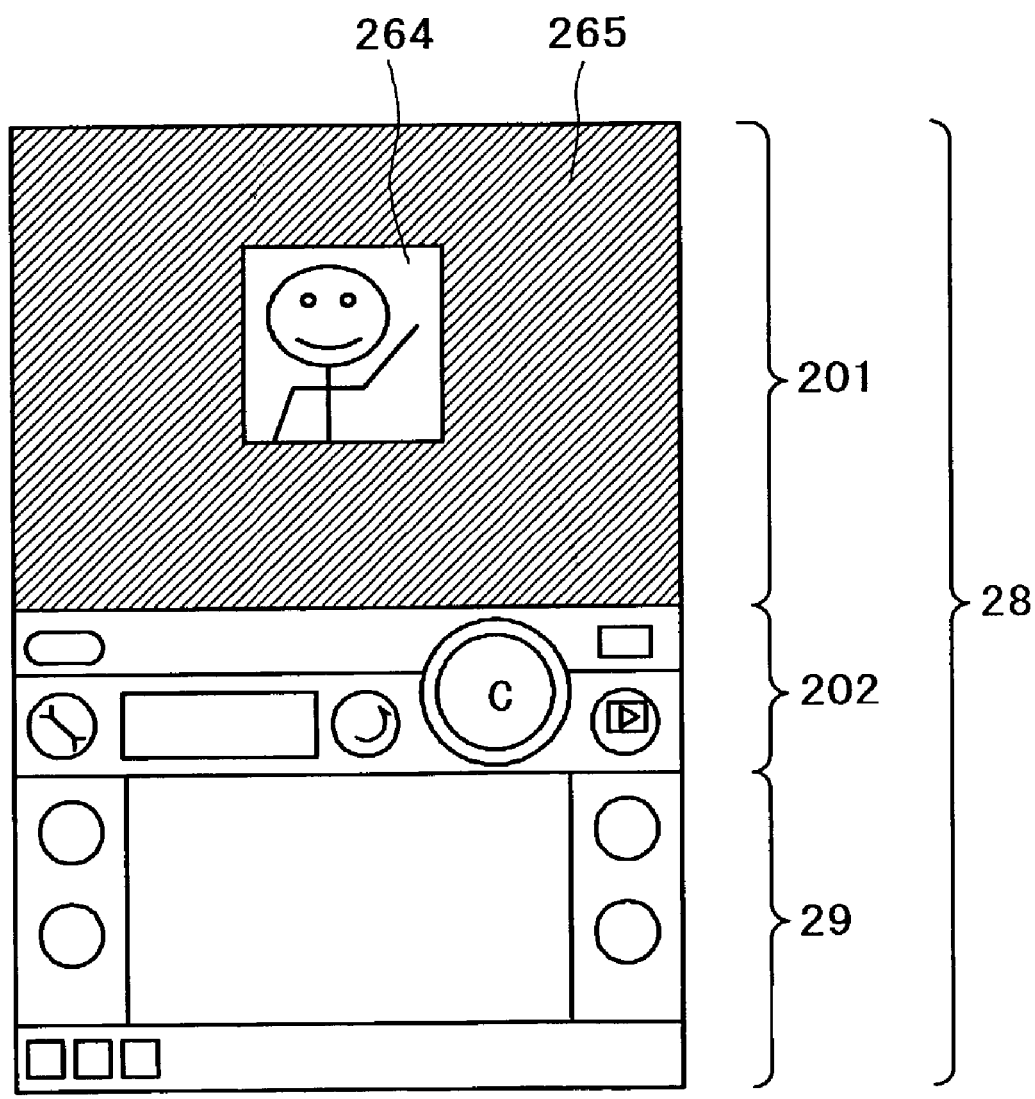

Similarly, if the size of, for example 88×88 pixels is designated, then a monitor image is displayed in a region 264 corresponding to the designated size of 88×88 pixels at a substantially central portion in the region 201 of the LCD unit 28 as shown in FIG. 54 (only a portion within the range of 88×88 pixels within the monitor image of 320×240 pixels), but a gray mask image having no design pattern is displayed in the surrounding region 265 except the region 264.

Referring back to FIG. 51, the CPU 131 discriminates at step S63 whether or not the shutter button is depressed. If the shutter button is not depressed, then the CPU 131 discriminates at step S65 whether or not the camera function is canceled. If it is discriminated that the camera function is canceled, then the CPU 131 ends its processing.

On the other hand, if it is discriminated at step S63 that the camera function is not canceled, then the processing advances to step S61 so that the CPU 131 repeats the processes at the steps beginning with step S61. In other words, the CPU 131 controls the LCD unit 28 to continue to display the monitor image picked up by the camera 22 in the designated size.

It is assumed now that the user depresses the capture button 23 of FIG. 1. At this time, the CPU 131 acquires information representing that the capture button 23 (inputting section 137) is depressed through the input/output interface 135 and the bus 134, and discriminates at step S63 that the shutter button is depressed. Then at step S64, the CPU 131 stores the image displayed on the LCD unit 28 in the size designated by the process at step S61 into the Memory Stick 143 or the like. Thereafter, the processes at the steps beginning with step S65 are repeated.

In this manner, in the present example, if a size for a recorded image is designated, then a monitor image picked up by the camera 22 is displayed in a designated size on the LCD unit 28 and further stored as a recorded image into the Memory Stick 143 or the like.

Accordingly, when the user tries to pick up an image of a subject, it can confirm an image of a size equal to an output size of a recorded image on a preview screen before the shutter button is depressed. Further, the user can change the output size of the recorded image, and in this instance, an image of a size corresponding to the changed size can be displayed on the preview screen. As described above, the PDA 1 can solve the object of the present invention.

It is to be noted that, while, in the example described above, the portable information processing apparatus is a PDA, any portable information processing apparatus can be used only if it has such a configuration as described hereinabove and can execute the series of processes described above. For example, the portable information processing apparatus may be a mobile terminal or a portable telephone set.

Further, the present invention can be applied not only to a portable information processing apparatus but also, for example, to a personal computer of the desk top type or the like with a camera.

Further, while in the example described above, the memory loaded into the slot 64 is a Memory Stick, any recording medium can be used only if it is compatible with the slot 64. For example, though not shown, some other semiconductor memory, a magnetic disk, an optical disk, a magneto-optical disk or the like may be used.

Where the series of processes is executed by software, a program which constructs the software is installed from a network or a recording medium into the PDA 1. However, the recording medium may be loaded directly into the PDA 1 or may be loaded into another apparatus if necessary. In the latter case, another apparatus and the PDA 1 communicate with each other so that the program is installed into the PDA 1.

The recording medium may be formed, as shown in FIG. 22, not only as a semiconductor memory such as the Memory Stick 143 but also as a package medium such as, though not shown, a magnetic disk (including a floppy disk), an optical disk (including a CD-ROM (Compact Disc-Read Only Memory) and a DVD (Digital Versatile Disk)), or a magneto-optical disk (including an MD (Mini-Disk)) which has the program recorded thereon or therein and is distributed in order to provide the program to the user, separately from an apparatus body. Else, the recording medium is formed as a ROM 132 or a storage section 139 in the form of a hard disk in which the program is stored therein and which is supplied to a user in a state wherein it is incorporated in an apparatus body in advance.

It is to be noted that, while, in the foregoing description, the processes illustrated in the flow charts are executed by software by the CPU 131 of FIG. 22, it is otherwise possible to prepare hardware for executing the processes so that the processes may be executed by the hardware.

Further, in the present specification, the steps which describe the program recorded in a recording medium may be but need not necessarily be processed in a time series in the order as described, and include processes which are executed in parallel or individually without being processed in a time series.

While preferred embodiments of the present invention have been described using specific terms, such description is for illustrative purpose only, and it is to be understood that changes and variations may be made without departing from the spirit or scope of the following claims.

What is claimed is:

1. An information processing apparatus, comprising:
   image pickup means for picking up an image of a subject;
   display means for displaying the image of the subject picked up by said image pickup means as a first preview image, the first preview image being provided with the approximately same edge boundaries as the image of the subject picked up by the image pickup means and the display means having a physical screen pixel size corresponding to a maximum physical screen size of the display means;
   storage means for storing the image of the subject picked up by said image pickup means as a still image;
   designation means for designating a still image pixel size of the still image to be stored into said storage means;
   display control means for controlling said display means to only display, for at least a predetermined period, a second preview image of the subject picked up by said image pickup means with approximately the same pixel size and edge boundaries as the still image with the still image pixel size designated by said designation means in response to the designation and before the picked up image is captured and stored as the still image; and
   capture and storage control means for controlling said storage means under the control of said display control means to capture and store an image corresponding to the second preview image displayed on said display means and having the still image pixel size designated by said designation means,
   wherein the information processing apparatus is handheld, fully operates in a hand-held shooting mode, includes at least a cellular phone, and includes the image pickup means,
   the second preview image has different edge boundaries than the image of the subject picked up by the image pickup means only when the still image pixel size of the still image designated by the designation means is different than the physical screen pixel size of the display means, and
   the sum of the pixel size of the first preview image and the pixel size of the second preview image is greater than the physical screen pixel size of the display means.

2. The information processing apparatus according to claim 1, wherein
   said designation means designates one of at least two sizes set in advance as the still image pixel size for the still image to be stored into said storage means;
   said display control means controls said display means to display the second preview image of the subject picked up by said image pickup means within a predetermined first range corresponding to the still image pixel size designated by said designation means within a predetermined display region of said display means in which the second preview image is to be displayed, and to inhibit the second preview image of the subject picked up by said image pickup means from being displayed in a surrounding second range of the predetermined display region different from the first range; and
   said storage control means controls said storage means under the control of said display control means to store the still image of the subject displayed in the first range in the still image pixel size designated by said designation means.

3. An image processing method for a handheld image processing apparatus which fully operates in a hand-held shooting mode, includes at least a cellular phone and includes image pickup means for picking up an image of a subject, display means for displaying the image of the subject picked up by said image pickup means as a first preview image, the first preview image being provided with the approximately same edge boundaries as the image of the subject picked up by the image pickup means and the display means having a physical screen pixel size corresponding to a maximum physical screen size of the display means, and storage means for storing the image of the subject picked up by said image pickup means as a still image, comprising:
   designating a still image pixel size of the still image to be stored into said storage means;
   controlling said display means to only display, for at least a predetermined period, a second preview image of the subject picked up by said image pickup means with approximately the same pixel size and edge boundaries as the still image with the still image pixel size designated by the process at the designating in response to the designating and before the picked up image is captured and stored as the still image; and controlling said storage means under the control of the process at the controlling said display means to capture and store an image corresponding to the second preview image displayed on said display means and having the still image pixel size designated by the process at the designating, the second preview image having different edge boundaries than the image of the subject picked up by the image pickup means only when the still image pixel size of the still image designated by the designation means is different than the physical screen pixel size of the display means, and the sum of the pixel size of the first preview image and the pixel size of the second preview image is greater than the physical screen pixel size of the display means.

4. A non-transitory computer readable medium on which a computer-readable program for a computer for controlling a handheld image processing apparatus which fully operates in a hand-held shooting mode, includes at least a cellular phone and includes image pickup means for picking up an image of a subject, display means for displaying the image of the subject picked up by said image pickup means as a first preview image, the first preview image being provided with the approximately same edge boundaries as the image of the subject picked up by the image pickup means and the display means having a physical screen pixel size corresponding to a maximum physical screen size of the display means, and storage means for storing the image of the subject picked up by said image pickup means as a still image, is recorded, the program comprising:

designating a still image pixel size of the still image to be stored into said storage means;

controlling said display means to only display, for at least a predetermined period, a second preview image of the subject picked up by said image pickup means with approximately the same pixel size and edge boundaries as the still image with the still image pixel size designated by the process at the designating in response to the designating and before the picked up image is captured and stored as the still image; and controlling said storage means under the control of the process at the controlling said display means to capture and store an image corresponding to the second preview image displayed on said display means and having the still image pixel size designated by the process at the designating, the second preview image having different edge boundaries than the image of the subject picked up by the image pickup means only when the still image pixel size of the still image designated by the designation means is different than the physical screen pixel size of the display means, and the sum of the pixel size of the first preview image and the pixel size of the second preview image is greater than the first physical screen pixel size of the display means.

5. An information processing apparatus, comprising:

an image pickup unit configured to pick up an image of a subject;

a display unit configured to display the image of the subject picked up by said image pickup unit as a first preview image, the first preview image being provided with the approximately same edge boundaries as the image of the subject picked up by the image pickup unit and the display means having a physical screen pixel size corresponding to a maximum physical screen size of the display unit;

a storage unit configured to store the image of the subject picked up by said image pickup unit as a still image;

a designation unit configured to designate a still image pixel size of the still image to be stored into said storage unit;

a display control unit configured to control said display unit to only display, for at least a predetermined period, a second preview image of the subject picked up by said image pickup unit with approximately the same pixel size and edge boundaries as the still image with the still image pixel size designated by said designation unit in response to the designation and before the picked up image is captured and stored as the still image; and a capture and storage control unit configured to control said storage unit under the control of said display control unit to capture and store an image corresponding to the second preview image displayed on said display unit and having the still image pixel size designated by said designation unit, wherein the information processing apparatus is handheld, fully operates in a hand-held shooting mode, includes at least a cellular phone, and includes the image pickup unit, the second preview image has different edge boundaries than the image of the subject picked up by the image pickup unit only when the still image pixel size of the still image designated by the designation unit is different than the physical screen pixel size of the display unit, and the sum of the pixel size of the first preview image and the pixel size of the second preview image is greater than the physical screen pixel size of the display unit.

6. The information processing apparatus according to claim 1, wherein the information processing apparatus is a cellular phone.

* * * * *